(12) United States Patent
Nakamura

(10) Patent No.: US 12,111,876 B2
(45) Date of Patent: Oct. 8, 2024

(54) AUTOMATIC HIGH-SPEED DISPLAY CONTROL METHOD FOR WEB CONTENT

(71) Applicant: PRIME STRATEGY CO., LTD., Tokyo (JP)

(72) Inventor: Kengyu Nakamura, Tokyo (JP)

(73) Assignee: PRIME STRATEGY CO., LTD., Tokyo (JP)

( * ) Notice: Subject to any disclaimer, the term of this patent is extended or adjusted under 35 U.S.C. 154(b) by 0 days.

(21) Appl. No.: 17/783,317

(22) PCT Filed: May 20, 2020

(86) PCT No.: PCT/JP2020/020025
§ 371 (c)(1),
(2) Date: Jun. 8, 2022

(87) PCT Pub. No.: WO2021/234882
PCT Pub. Date: Nov. 25, 2021

(65) Prior Publication Data
US 2023/0010433 A1    Jan. 12, 2023

(51) Int. Cl.
*G06F 16/957*    (2019.01)
*G06F 16/958*    (2019.01)

(52) U.S. Cl.
CPC .......... *G06F 16/957* (2019.01); *G06F 16/958* (2019.01)

(58) Field of Classification Search
CPC ....... G06F 16/957; G06F 16/958; G06F 13/00
USPC ...................................................... 715/234
See application file for complete search history.

(56) References Cited

U.S. PATENT DOCUMENTS

| | | | |
|---|---|---|---|
| 8,010,702 B2* | 8/2011 | Farouk | H04L 67/565 709/217 |
| 8,412,812 B1* | 4/2013 | Mayers | H04L 43/0852 709/224 |
| 9,158,656 B1* | 10/2015 | Athale | H04L 67/02 |

(Continued)

FOREIGN PATENT DOCUMENTS

| | | |
|---|---|---|
| EP | 2 263 163 B1 | 12/2016 |
| JP | 2015-072694 A | 4/2015 |

(Continued)

OTHER PUBLICATIONS

Networking Basics: What is a Proxy Server; Nov. 15, 2018; cbtnuggets.com; pp. 1-6.*

(Continued)

*Primary Examiner* — Andrew R Dyer
(74) *Attorney, Agent, or Firm* — Sughrue Mion, PLLC

(57) ABSTRACT

An automatic fast display control method for web content that displays adjusted web content on each user terminal of a user within a period from when a request is transmitted from the user terminal of the user until the web content is ready to accept input on the user terminal of the user. The method includes: a step of a request processing unit of a server detecting a request; a step of an artificial intelligence server devising a strategic plan; a step of generating processed data on the basis of the strategic plan; and a step of displaying web content according to the processed data on a user terminal. The step of devising a strategic plan includes a step of learning an attribute shared by the processed data for displaying the web content more quickly.

10 Claims, 38 Drawing Sheets

(56) References Cited

U.S. PATENT DOCUMENTS

| | | | | |
|---|---|---|---|---|
| 2008/0120689 A1* | 5/2008 | Morris | ............... | G06F 40/143 |
| | | | | 707/E17.014 |
| 2014/0013275 A1* | 1/2014 | Ochi | ................ | G06F 16/958 |
| | | | | 715/810 |
| 2014/0068408 A1* | 3/2014 | Le Chevalier | ......... | G06F 16/93 |
| | | | | 715/234 |
| 2016/0149850 A1* | 5/2016 | Pan | ................ | H04L 67/535 |
| | | | | 709/206 |
| 2016/0205166 A1* | 7/2016 | Kolam | ............... | H04L 67/01 |
| | | | | 709/213 |
| 2017/0012793 A1* | 1/2017 | Morita | ................ | G06F 13/00 |
| 2020/0159866 A1* | 5/2020 | Dong | ................ | G06F 16/958 |
| 2022/0131852 A1* | 4/2022 | Sharma | ............. | H04L 63/0815 |

FOREIGN PATENT DOCUMENTS

| | | |
|---|---|---|
| WO | 2016/112354 A2 | 7/2016 |
| WO | 2019/072201 A1 | 4/2019 |

OTHER PUBLICATIONS

Akamai Technologies, Inc. home page <https://www.akamai.com/us/en/solutions/performance/image-management.isp>; retrieved May 18, 2022.

GULP home page <https://gulpis.com/>; retrieved May 18, 2022.

International Search Report of PCT/JP2020/020025 dated Jun. 30, 2020 [PCT/ISA/210].

* cited by examiner

| IDENTIFICATION INFORMATION | MODEL INFORMATION | OS INFORMATION | BROWSER | DISPLAY ENVIRONMENT INFORMATION |
|---|---|---|---|---|
| 1234567 | SMARTPHONE | abc | X CORP. A1 | 5 inch 750 x 1300 |
| 1234568 | SMARTPHONE | efg | X CORP. A1 | 6 inch 1100 x 2500 |
| 1234569 | TABLET | abc | Y CORP. B1 | 10 inch 800 x 1000 |
| 1234570 | TABLET | hij | Y CORP. B2 | 11 inch 850 x 1200 |
| 1234571 | PC | xyz | Z CORP. C1 | 21 inch 1000 x 1900 |
| 1234572 | PC | xyz | Z CORP. C1 | 27 inch 1000 x e2000 |

FIG. 15

AUTOMATIC HIGH-SPEED DISPLAY CONTROL METHOD FOR WEB CONTENT

CROSS REFERENCE TO RELATED APPLICATIONS

This application is a National Stage of International Application No. PCT/JP2020/020025, filed May 20, 2020.

TECHNICAL FIELD

The present invention relates to an automatic fast display control method for web content.

BACKGROUND ART

A user can use a user terminal such as a personal computer (PC), a smartphone, or a tablet to search for desired information whenever the user likes, and view web content displayed on the user terminal as a search result.

The user ordinarily wants the search result to be displayed on the user terminal quickly. For this reason, improving the speed at which web content is provided to the user is important.

In the related art, standards such as communication standards for causing web content to be displayed on mobile information terminals such as feature phones and data processing standards for the mobile information terminals have followed standards set by each telecommunications carrier.

For this reason, in the case of using mobile information terminals such as feature phones with the same standards on the same telecommunications carrier, the same web content can be displayed without problems. On the other hand, in the case of communicating with a different telecommunications carrier for example, if the user uses a mobile information terminal such as a feature phone that does not comply with the communication data standard, a problem occurs in which web content is not displayed correctly on the user's mobile information terminal.

To address this problem, technology referred to as communication data conversion technology for converting communication data between different telecommunications carriers to suit the communication data standard on the mobile information terminal used by the user has been developed. This communication data conversion technology can be used to achieve display interoperability.

On the other hand, the Akamai Image Manager technology provided by Akamai Technologies, Inc. is known as a method of providing web content to users quickly. According to the technology provided by Akamai Technologies, Inc., individual images to be displayed on a web site can be provided automatically in an optimized combination of size, quality, and file format for a browser and a user terminal (Non-Patent Literature 1).

Also, a method referred to as a content delivery network (CDN) is known as a method of causing data saved in a web server to be displayed on a user terminal of a user (Patent Literature 1).

The operator of a web site can use a CDN method provided by a corporation by entering into a contract with the corporation that provides the CDN. In this case, a domain specified by the operator of the web site rather the domain of the corporation that provides the CDN can be used the domain of the web site published by an administrator. With this arrangement, the operator of the web site is able to provide a powerful CDN method to users while retaining the operator's own domain.

In the case of a CDN, a cluster of a plurality of web servers is prepared, and the same data is saved in each of the web servers. Thereafter, when the user uses the CDN method, data from the web server closest to the user terminal of the user is transmitted to the user terminal of the user.

If many user terminals access a single web server all at once, the load on the web server for processing requests is increased. Since there is a limit to the processing power per unit time of a web server, if accesses to a single web server become concentrated to a certain degree or more, the processing time by the web server tends to be delayed.

According to the CDN method, even if a single web server is accessed in a concentrated way by a large number of user terminals all at once, spare web servers can be recruited through a communication network established among the plurality of web servers in the cluster, thereby making it possible to prevent delays in processing time on the web server and quickly accommodate a large number of data requests from the user terminals of users.

On the other hand, a method referred to as a task runner is known as a technology for keeping web content up-to-date (Non-Patent Literature 2).

In the case of using the method referred to as GULP, which is a type of task runner, the original data for displaying web content is continually monitored, and if an alteration to the original data is detected, the original data is altered automatically, and the web content is immediately updated automatically.

CITATION LIST

Patent Literature

Patent Literature 1: Japanese Patent Laid-Open No. 2015-072694

Non-Patent Literature

Non-Patent Literature 1: Akamai Technologies, Inc. home page (https://www.akamai.com/us/en/solutions/performance/image-management.jsp)

Non-Patent Literature 2: GULP home page (https://gulpjs.com/)

SUMMARY OF INVENTION

Technical Problem

To display web content quickly on the user terminal of a user, the original data forming the web content needs to be adjusted to be displayed quickly on the user terminal of the user.

Examples of such adjustments include methods such as removing elements included in the original data or deferring the processing of elements included in the original data if the original data contains elements that could impede fast display on the user terminal of the user, and methods such as reducing the time it takes to transfer the original data by compressing or reducing the size of the original data to be transferred to the user terminal of the user.

These adjustments are normally performed by an administrator of the web site that provides the web content. With this adjustments, the web content is displayed quickly on the user terminal of a user.

However, the time at which the web content is displayed quickly on the user terminal of a user is a point in time after the above adjustments have been completed. On the other hand, the speed at which the web content is displayed on the user terminal of a user tends to slow down over time after the above adjustments are completed.

This is because the web content is usually updated daily, in the updated content new portions of web content are added in addition to the portions of web content that have already been completely adjusted, and the portion of the web content that has not been completely adjusted increases.

Also, the methods such as removing elements included in the original data, deferring the processing of elements included in the original data, reducing the size of the original data, and compressing the original data described above also have problems that need to be solved. If these methods are simply performed as-is, the web content may not be displayed correctly on each user terminal of a user. If an element necessary for displaying the web content on a user terminal is removed or the like, a situation may occur in which the web content is not displayed correctly on the user terminal.

Also, it is not necessarily the case that the time taken to display the adjusted data will be shorter than the time it takes to display the original data.

In general, different original data needs to be improved in different ways to display web content quickly. Moreover, different improvements are necessary to display web content quickly depending on the type of user terminal.

If the same adjustments are applied indiscriminately to the original data, there is a possibility that defects may occur when displaying the web content on each user terminal.

For this reason, it is necessary to ascertain the content of respective original data individually, and then adopt measures suited to the respective web content according to the type of user terminal.

As a result, the administrator of a web site that provides web content is often under a perpetual demand to carry out multi-step processes for speeding up the display of web content.

Furthermore, these adjustments may take several days or more to complete a single process.

In the case of the communication data conversion technology of the related art described above, if the data transfer capacity per unit time can be increased, a speedup in the display of web content is achieved.

However, even if the data transfer capacity per unit time is increased, there is still a remaining problem in that the above adjustments are laborious and time-consuming.

Similarly, even in the case of using a method of preventing delays in the data processing time by using a CDN, there is still a remaining problem in that the above adjustments are laborious and time-consuming.

Likewise, in the case of using the task runner technology described above, if the original data for displaying the web content is altered, the altered content can be reflected in the web content indiscriminately. However, with the task runner technology, it is difficult to address individual problems such as demanded improvements depending on the original data and demanded improvements depending on the type of user terminal.

An objective of the present invention is to complete the processing of the original data for displaying unadjusted web content for each user terminal of a user in the time from when a request is transmitted from a user terminal of a user to a server until the unadjusted web content is ready to accept input on the user terminal of a user, and display adjusted web content on respective user terminals within a shorter time than the above time.

Solution to Problem

When a user views web content with a user terminal, (1) a step of transmitting a request from the user terminal to one or more communicable servers over a network, (2) a step of transmitting original data for displaying the web content on the user terminal from the server (s) to the user terminal, and (3) a step of enabling the web content to accept input on the user terminal are performed.

As a result of thorough investigation to address the problems described above, the inventor discovered that an automatic fast display control method for web content comprising a step in which, when performing the above steps (1) to (3), rather than transmitting the original data for displaying web content to the user terminal as-is, when a request is transmitted from a user terminal to a request processing unit installed in the server, the original data saved in an application processing unit is processed by a data acquisition and processing unit on the basis of a strategic plan devised by an artificial intelligence unit, and the processed data transmitted to the user terminal, is suited to the objective of the present invention, and thereby completed the present invention.

Namely, the present invention provides

[1] An automatic fast display control method for web content including:

a step of an application processing unit and an artificial intelligence unit receiving a request transmitted from a user terminal to a request processing unit installed in each of one or more communicable servers over a network;

a step of the application processing unit transmitting original data for displaying web content to the data acquisition and processing unit;

a step of the artificial intelligence unit devising a strategic plan for displaying the web content on each user terminal;

a step of the data acquisition and processing unit receiving the original data for displaying the web content on the user terminal;

a step of the data acquisition and processing unit processing the original data on a basis of the strategic plan to generate a plurality of processed data;

a step of selecting processed data for displaying the web content on each user terminal from at least one resource selected from the group consisting of the original data and the plurality of processed data; and a step of transmitting the processed data for displaying the web content on each user terminal to each user terminal, and displaying the web content on each user terminal, the above steps being performed in a period from when a request is transmitted from the user terminal to the one or more servers until the original data for displaying the web content on the user terminal is transmitted to the user terminal from the server and the web content is ready to accept input on the user terminal, wherein the one or more servers include an execution environment of at least one selected from the group consisting of one or more physical machines, one or more virtual machines, and one or more containers, and the step of devising the strategic plan includes:

a step of learning, for each user terminal, an attribute shared by the processed data for displaying the web content more quickly on the user terminal from at least one resource selected from the group consisting of the original data and the plurality of processed data; and a step of the data acquisition and processing unit processing the original data for each user terminal on a basis of the attribute.

Also, one aspect of the present invention provides

[2] The automatic fast display control method for web content according to [1] above, wherein
the resource includes at least one type of data selected from the group consisting of the original data and the plurality of processed data,
the processed data includes an object-replaced program, and
the method includes:
a step of generating the object-replaced program by replacing a resource-referencing portion included in the original data with a program object;
a step of associating the object with each resource together with identification information; and
a step of, when the object-replaced program is executed for each user terminal by a browser installed in the user terminal,
specifying the resource according to the identification information of the object included in the object-replaced program, and executing the resource.

Also, one aspect of the present invention provides

[3] The automatic fast display control method for web content according to [1] or [2] above, wherein
the step of the data acquisition and processing unit processing the original data for each user terminal on a basis of the attribute includes at least one step selected from the group consisting of:
a step of selecting a program to be executed from among programs included in the processed data;
a step of selecting a program to be executed with priority from among programs included in the processed data;
a step of selecting a program for which execution is to be deferred from among programs included in the processed data;
a step of selecting an execution order of a program to be executed from among programs included in the processed data;
a step of selecting an execution timing of a program to be executed from among programs included in the processed data; and
a step of selecting processed data for displaying the web content on each user terminal from at least one resource selected from the group consisting of the original data and the plurality of processed data.

Also, one aspect of the present invention provides

[4] The automatic fast display control method for web content according to any of [1] to [3] above, wherein
the original data includes at least one of program data and binary data,
the program data includes code containing at least one selected from the group consisting of a markup language, a programming language, a style sheet, and a script language,
the binary data includes at least one of an image file, an audio file, and a video file,
the resource includes at least one selected from the group consisting of the original data and the plurality of processed data,
the step of generating the processed data includes at least one step selected from the group consisting of the following (1) to (5), namely:

(1) a step of removing an unnecessary portion for each user terminal display environment from the code containing at least one selected from the group consisting of a markup language, a programming language, a style sheet, and a script language included in the original data;
(2) a step of compressing a necessary portion for each user terminal display environment from the code containing at least one selected from the group consisting of a markup language, a programming language, a style sheet, and a script language included in the original data;
(3) a step of changing an execution order for each user terminal display environment from the code containing at least one selected from the group consisting of a markup language, a programming language, a style sheet, and a script language included in the original data;
(4) a step of changing an execution timing for each user terminal display environment from the code containing at least one selected from the group consisting of a markup language, a programming language, a style sheet, and a script language included in the original data; and
(5) a step of converting at least one selected from the group consisting of a number of display pixels per unit area, an image or sound recording density per unit time, a data size, and a save format from the binary data included in the original data; and the step of displaying the web content on each user terminal includes:
a step of transmitting the request from the user terminal to the request processing unit over the network;
a step of specifying a display environment for each user terminal from the request received by the request processing unit; and
a step of transmitting a resource to each user terminal from at least one of the application processing unit and the data acquisition and processing unit after a request is transmitted from the browser of the user terminal to the request processing unit, and displaying the resource in the browser of each user terminal.

Also, one aspect of the present invention provides

[5] The automatic fast display control method for web content according to any of [1] to [4] above, wherein
the step of generating the plurality of processed data by processing the original data includes:
a step of generating a plurality of processed data for each user terminal on a basis of model information data related to the user terminal saved in a storage area accessible by the data acquisition and processing unit; and
the step of selecting processed data for displaying the web content on each user terminal from at least one resource selected from the group consisting of the original data and the plurality of processed data includes:
a step of specifying, for each user terminal, a display environment of a display screen of the user terminal on a basis of the model information data;
a step of specifying, for each user terminal, a portion of the web content that is displayed first to fit in the display environment of the display screen of the user terminal; and
the step of transmitting the processed data for displaying the web content on each user terminal to each user terminal and displaying the web content on each user terminal includes a step of prioritizing the transmission, to the user terminal, of processed data corresponding to web content to be displayed first in accordance with the display environment of a display screen of the user terminal from among the web content.

Also, one aspect of the present invention provides

[6] The automatic fast display control method for web content according to any of [1] to [5] above, wherein the step of displaying the web content on each user terminal includes:
- a step of transmitting, to the user terminal, data corresponding to a portion of the web content to be displayed first on a screen of the user terminal;
- a step of at least one of the server and the browser detecting at least one of event information indicating that a certain time has elapsed since the portion of the web content corresponding to the portion displayed first on the screen of the user terminal was displayed on the user terminal, and event information indicating that a user has operated the user terminal to perform an action for causing additional information to be displayed on the user terminal; and
- a step of transmitting a resource for displaying some or all of the remaining portion of the web content to the user terminal over the network from at least one of the application processing unit and the data acquisition and processing unit after the event information is detected by at least one of the application processing unit, the artificial intelligence unit, the data acquisition and processing unit, and the browser installed in the user terminal.

Also, one aspect of the present invention provides

[7] The automatic fast display control method for web content according to [6] above, wherein the step of displaying the web content on each user terminal includes:
- a step of transmitting, to the user terminal, a resource for displaying the portion of the web content to be displayed first on the screen of the user terminal; and
- a step of extending or reducing a time until the portion of the web content displayed first on the screen of the user terminal is ready to accept input.

Also, one aspect of the present invention provides

[8] The automatic fast display control method for web content according to [7] above, further including:
a step of calculating an engagement score between a user and the web content on the basis of a user experience of the user viewing the web content; and
a step of extending or reducing the time until the portion of the web content displayed first on the screen of the user terminal is ready to accept input for each user terminal on a basis of the engagement score.

Also, the present invention provides

[9] A program for performing the automatic fast display control method for web content according to any of [1] to [8] above, including:
a means by which an application processing unit and an artificial intelligence unit receive a request transmitted from a user terminal to a request processing unit installed in each of one or more communicable servers over a network;
a means by which the application processing unit transmits original data for displaying web content to the data acquisition and processing unit;
a means by which the artificial intelligence unit devises a strategic plan for displaying the web content on each user terminal;
a means by which the data acquisition and processing unit receives the original data for displaying the web content on the user terminal;
a means by which the data acquisition and processing unit processes the original data on a basis of the strategic plan to generate a plurality of processed data;
a means for selecting processed data for displaying the web content on each user terminal from at least one resource selected from the group consisting of the original data and the plurality of processed data; and
a means for transmitting the processed data for displaying the web content on each user terminal to each user terminal, and displaying the web content on each user terminal, wherein
the operations by the above means are performed in a period from when a request is transmitted from the user terminal to the one or more servers until the original data for displaying the web content on the user terminal is transmitted to the user terminal from the server and the web content is ready to accept input on the user terminal,
the one or more servers include an execution environment of at least one selected from the group consisting of one or more physical machines, one or more virtual machines, and one or more containers, and
the means for devising the strategic plan includes:
- a means for learning, for each user terminal, an attribute shared by the processed data for displaying the web content more quickly on the user terminal from at least one resource selected from the group consisting of the original data and the plurality of processed data; and
- a means by which the data acquisition and processing unit processes the original data for each user terminal on a basis of the attribute.

Also, one aspect of the present invention provides

[10] A storage device storing the automatic fast display control program for web content according to [9] above.

Also, the present invention provides

[11] A system for performing the automatic fast display control method for web content according to any of [1] to [8] above, including:
a means by which an application processing unit and an artificial intelligence unit receive a request transmitted from a user terminal to a request processing unit installed in each of one or more communicable servers over a network;
a means by which the application processing unit transmits original data for displaying web content to the data acquisition and processing unit;
a means by which the artificial intelligence unit devises a strategic plan for displaying the web content on each user terminal;
a means by which the data acquisition and processing unit receives the original data for displaying the web content on the user terminal;
a means by which the data acquisition and processing unit processes the original data on a basis of the strategic plan to generate a plurality of processed data;
a means for selecting processed data for displaying the web content on each user terminal from at least one resource selected from the group consisting of the original data and the plurality of processed data; and a means for transmitting the processed data for displaying the web content on each user terminal to each user terminal, and displaying the web content on each user terminal, wherein the operations by the above means are performed in a period from when a request is transmitted from the user terminal to the one or more servers until the original data for displaying the web content on the user terminal is transmitted to the user terminal from the server and the web content is ready to accept input on the user terminal, the one or more servers include an execution environment of at least one selected from the group consisting of one or more physical machines, one or more virtual machines, and one or more containers, and the means for devising the strategic plan includes:
- a means for learning, for each user terminal, an attribute shared by the processed data for displaying the web content more quickly on the user terminal from at least one resource selected from the group consisting of the original data and the plurality of processed data; and
- a means by which the data acquisition and processing unit processes the original data for each user terminal on a basis of the attribute.

Advantageous Effects of Invention

According to the automatic fast display control method for web content of the present invention, in the time from when a request is transmitted from a user terminal to one or more communicable servers over a network and original data for displaying web content on the user terminal is transmitted from the server (s) to the user terminal until the web content is ready to accept input on the user terminal, the processing of the original data for displaying the web content on each user terminal is completed, processed data is transmitted to each user terminal, and web content is displayed on the user terminal.

Consequently, according to the method according to the present invention, even if the request is a first request from a user terminal that has never transmitted a request to the server (s) before, it is possible from the first time to achieve a state in which web content based on the processed data is ready to accept input on each user terminal in a shorter time than the time until web content based on the original data is ready to accept input on the user terminal.

Also, the original data for displaying web content can be crawled and monitored by a component such as a data acquisition and processing unit. Consequently, in the case where there is a change in the original data, processed data can be generated in correspondence with the change, and web content corresponding to the processed data can be provided from the first time even if there is a request from a user terminal after the change in the original data.

Also, according to the automatic fast display control method for web content of the present invention, before web content based on the original data transmitted from the server (s) is transmitted as-is to the user terminal, the original data is retrieved from an application processing unit to a data acquisition and processing unit through a request processing unit, and the original data is processed on the basis of a strategy devised by an artificial intelligence unit. Thereafter, the processed data is transmitted to each user terminal, and web content based on the processed data is displayed on each user terminal.

For this reason, the automatic fast display of web content is achieved without the need for a human being to visually check and edit the state of the original data or the state of the processed data.

Furthermore, according to the automatic fast display control method for web content of the present invention, data such as original data and processed data can be communicated to the user terminal through a request processing unit and the like.

Consequently, by simply installing the request processing unit in a server and performing at least one of a migration and a DNS change as necessary, the automatic fast display control method for web content according to the present invention can be carried out, and therefore the automatic fast display of web content can be achieved with a simple operation.

BRIEF DESCRIPTION OF DRAWINGS

FIG. 15 is a conceptual diagram illustrating one example of a model information file 126 saved in a settings file storage unit 1523 of a data acquisition and processing unit D used in Embodiment 1 of the present invention.

DESCRIPTION OF EMBODIMENTS

An automatic fast display control system for carrying out an automatic fast display control method for web content according to the present invention includes at least an application processing unit A, an artificial intelligence unit B, a request processing unit C, and a data acquisition and processing unit D.

In the disclosure of the present invention, a plurality of embodiments combining the four units A to D is disclosed first. The configuration of the automatic fast display control system for carrying out an automatic fast display control method for web content according to the present invention is roughly classified into the four types of an all-in-one type (Embodiment 1), a reverse proxy type (Embodiment 2), a nano-agent type (Embodiment 3), and a SaaS type (Embodiment 4) depending on the combination of the four units A to D.

Hereinafter, embodiments will be described with reference to the drawings. Note that the present invention is not limited to the following embodiments.

Embodiment 1: All-In-One Type

Figure 1:
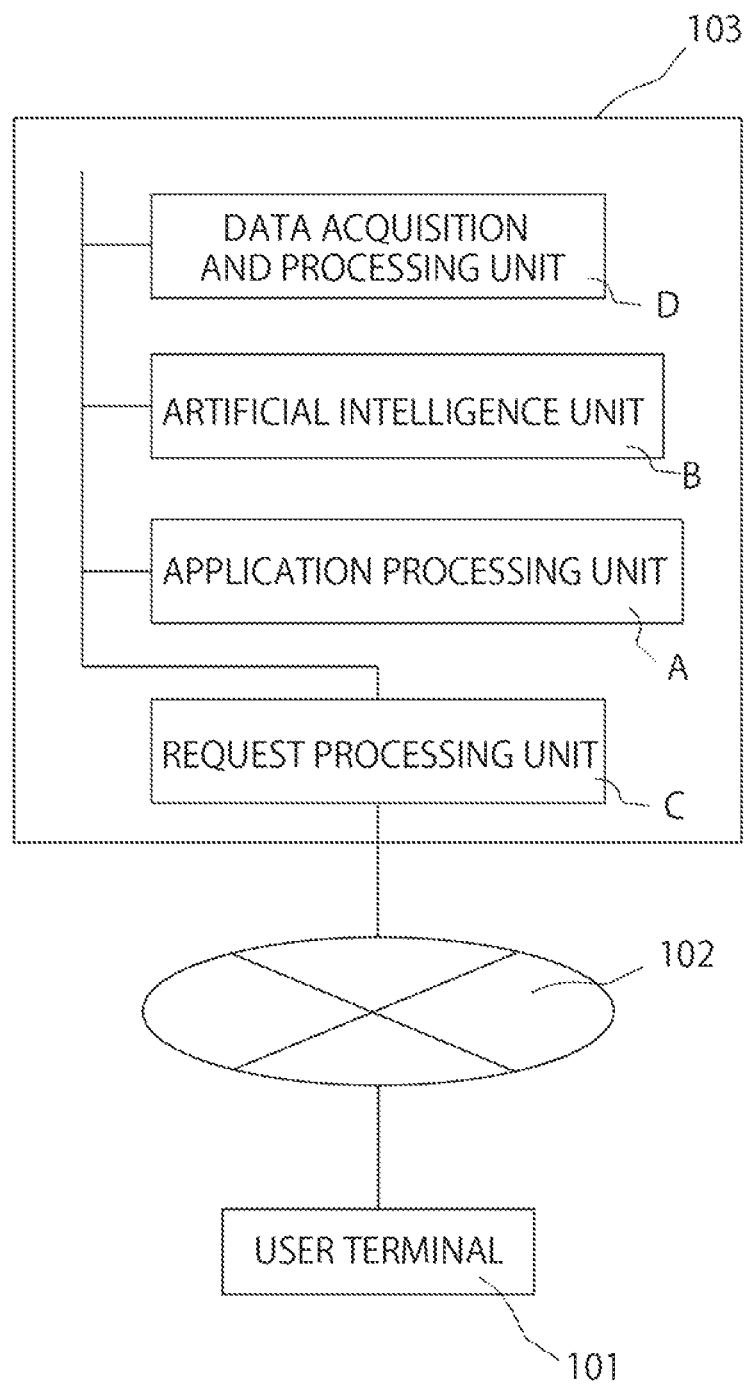
FIG. 1 is a schematic diagram for explaining an automatic fast display control system for carrying out an automatic fast display control method for web content according to Embodiment 1 of the present invention.

FIG. 1 is a schematic diagram for explaining an automatic fast display control system for carrying out an automatic fast display control method for web content according to Embodiment 1 of the present invention. In Embodiment 1 of the present invention, the four units A to D are constructed within a single execution environment as one example.

In the case of Embodiment 1 of the present invention, an application execution server 103 is adopted as one example of the execution environment.

A user can operate a user terminal 101 to communicate with the application execution server 103 over a network 102.

A request is transmitted from the user terminal 101 operated by the user to the request processing unit C over the network 102.

The request requests the application execution server 103 to transmit data for displaying web content in a browser or the like installed in the user terminal 101. The request is transmitted to the request processing unit C initially.

The user terminal 101 used in the present invention is not limited to a single terminal, and two or more terminals may also be used. Also, it is sufficient if the user terminal 101 and the application execution server 103 can communicate with each other over the network 102. The positional relationship between the user terminal 101 and the application execution server 103 is not particularly limited.

In the disclosure of the present invention, the request processing unit C has a function of initially receiving a request transmitted from the user terminal 101. The same applies to each of Embodiments 2 to 6 below.

Original data saved in the application processing unit A is processed on the basis of the request transmitted from the user terminal 101. The original data is data for displaying web content on each user terminal 101.

The original data is processed by the data acquisition and processing unit D on the basis of a strategic plan devised by the artificial intelligence unit B.

First, these four units A to D will be described.

[A. Application Processing Unit]

Figure 2:
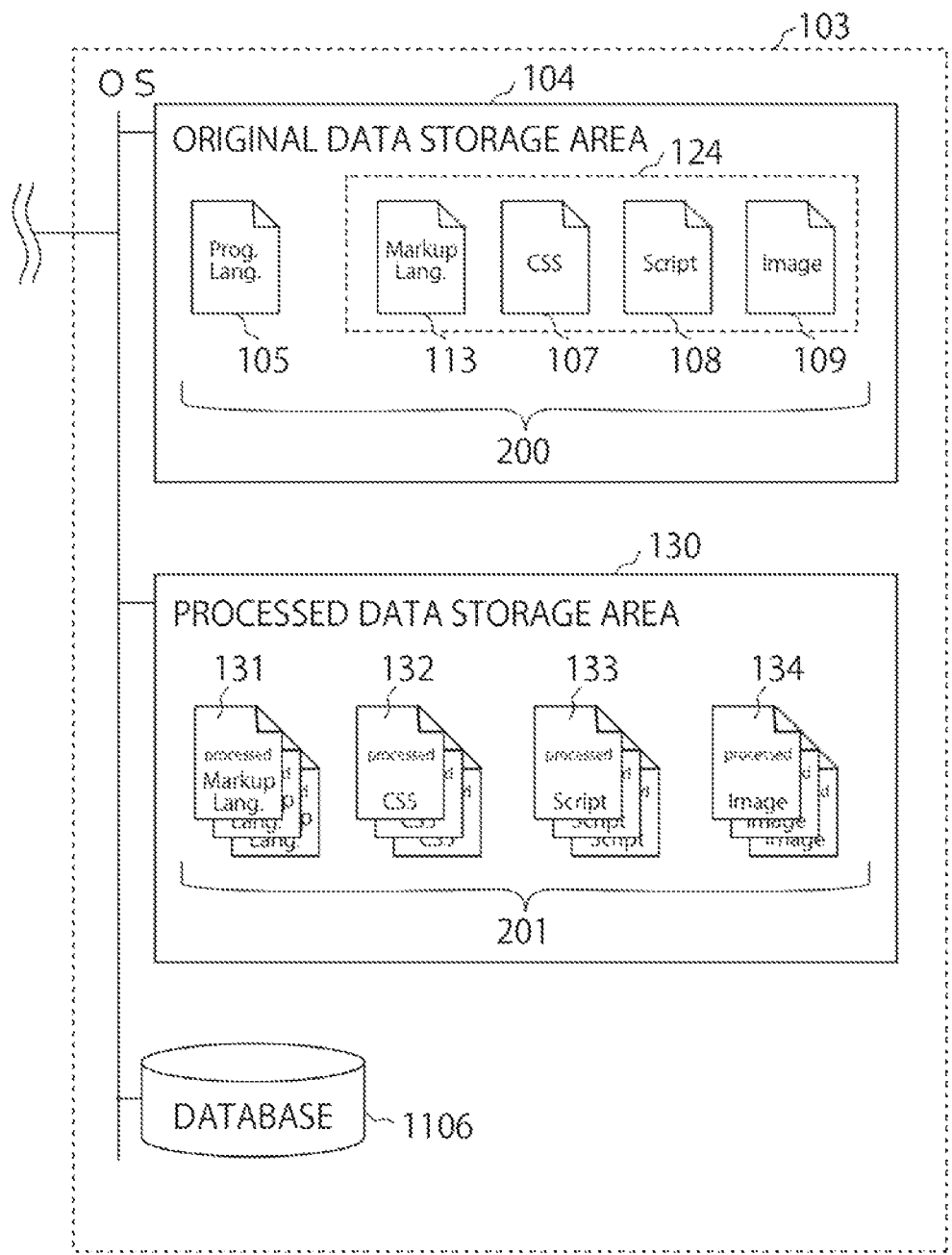
FIG. 2 is a schematic diagram for explaining an application processing unit A used in the present invention.

FIG. 2 is a schematic diagram for explaining the application processing unit A used in the present invention.

The application processing unit A used in the present invention saves information such as original data 200 for displaying web content, and is mainly responsible for a function of transmitting requests from each user terminal 101, resources included in the original data 200, and the like to the user terminal 101 and each unit.

Note that the descriptions of the files in the disclosure of the present invention are illustrative examples, and mean that data can be managed in a file format. By managing the data in a file format, the data can be managed visually by people through a CLI or the like.

FIG. 2 schematically illustrates how data can be managed in a file format.

The original data 200 includes an HTML file 113 necessary for displaying web content on the user terminal 101 and resources or the like associated with the HTML file 113, for example.

The HTML file 113 is generated dynamically or statically by a program such as a PHP file 105 associated with a database 1106, for example.

In addition, resources such as a CSS file 107, a script language file 108, and an image file 109 referenced by the HTML file 113 are saved in the application processing unit A.

These resources can be referenced from the HTML file 113 and executed as appropriate. Also, a CSS style sheet, programs such as JavaScript®, and the like written directly in the HTML file 113 can be executed.

For example, the user terminal 101 receives information such as the HTML file 113 transmitted to the user terminal 101. Additionally, the HTML file 113 or the like received by the user terminal 101 is executed by a browser or the like installed in the user terminal 101. When the HTML file 113 or the like is executed, resources such as the CSS file 107 that acts as a style sheet and the script language file 108 that acts as a program associated with the HTML file 113 or the like are also executed correspondingly. Through the above execution, web content or the like based on the original data 200 or the like can be displayed on the user terminal 101.

[B. Artificial Intelligence Unit]

Figure 3:
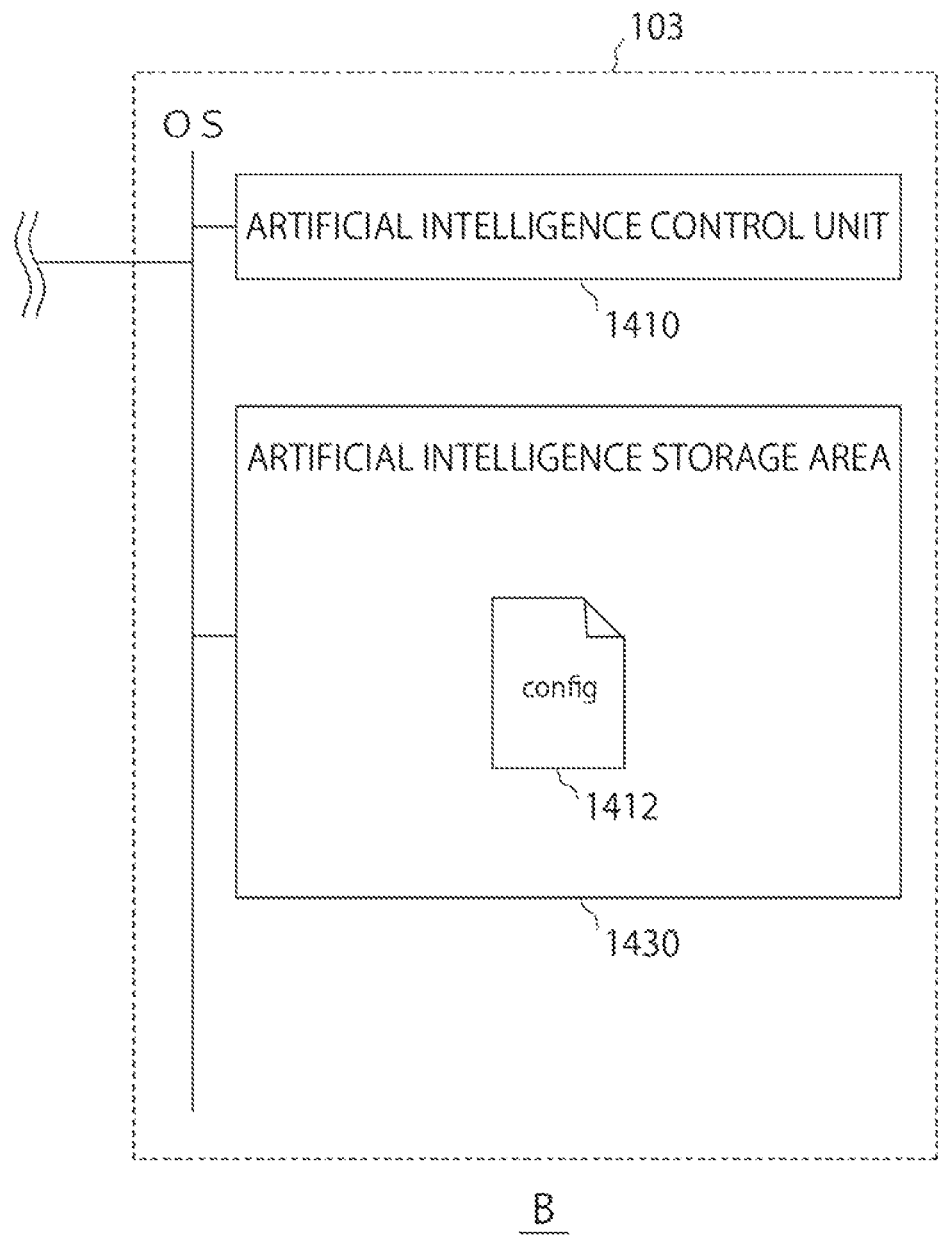
FIG. 3 is a schematic diagram for explaining an artificial intelligence unit used in the present invention.

FIG. 3 is a schematic diagram for explaining an artificial intelligence unit used in the present invention.

The artificial intelligence unit B used in the present invention mainly functions as a control tower that guides the operation of each of the units A to D.

Specifically, for example, the artificial intelligence unit B generates one or more strategic plans for actions such as processing the original data 200 saved in the application processing unit A according to the display environment of each user terminal 101, selecting optimized data for each user terminal 101 from among a plurality of processed data 201, and determining properties such as the execution order and execution timing of programs included in the processed data 201. A strategy file 1412 that acts as the strategic plan is generated in an artificial intelligence storage area 1430 by an artificial intelligence control unit 1410 of the artificial intelligence unit B.

A strategic plan for using the original data 200 to display the web content on the user terminal 101 and displaying the web content on each user terminal 101 by the time the browser or the like of the user terminal 101 is ready to accept input is generated. Thereafter, the original data 200 is processed, selected, delivered, and the like on the basis of the strategic plan. As a result, the original data 200 is used to display web content on the user terminal 101, and processed data is used to display the web content on each user terminal 101 by the time the user terminal 101 is ready to accept input.

The strategic plan may be saved in a storage area usable by the artificial intelligence unit B as the strategy file 1412, for example. The strategy file 1412 is not limited to being saved inside the artificial intelligence unit B, and may also be saved outside the artificial intelligence unit B so as to be usable by the artificial intelligence unit B, for example.

In the case of Embodiment 1 of the present invention, the strategic plan is described as the strategy file 1412 as an example, but the strategic plan is not limited to the case of being saved in a file format. The strategic plan may be saved in any format executable by the artificial intelligence unit B, and may also be saved and utilized in a format such as a database usable by the application execution server 103.

[C. Request Processing Unit]

Figure 4:
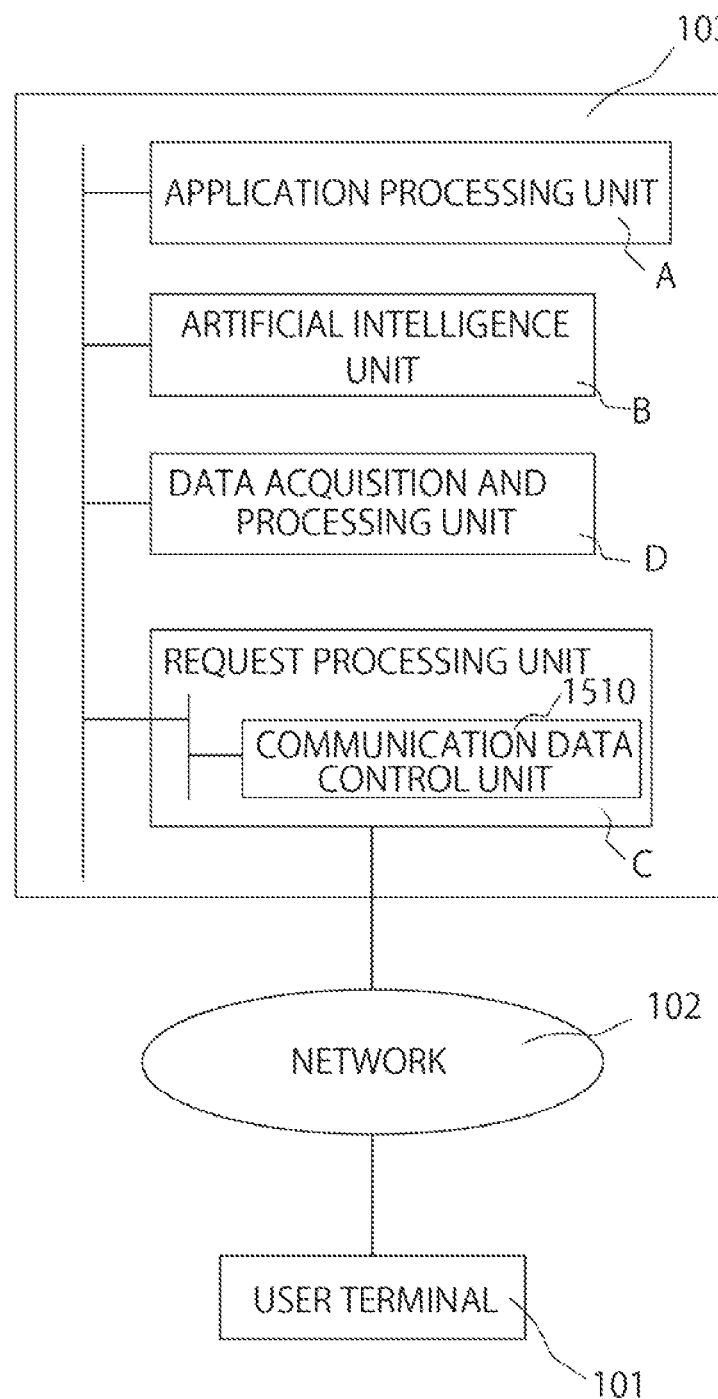
FIG. 4 is a schematic diagram for explaining a request processing unit used in the present invention.

FIG. 4 is a schematic diagram for explaining the request processing unit used in the present invention.

As illustrated by way of example in FIG. 1 referenced above, the request processing unit C used in the present invention mainly functions as what is called a communication gate that initially receives a request transmitted from the browser or the like of the user terminal 101 operated by a user.

As an example, FIG. 4 illustrates a case where the application processing unit A, the artificial intelligence unit B, the request processing unit C, and the data acquisition and processing unit D are disposed in the application execution server 103.

In Embodiment 1 of the present invention, the respective units of the application processing unit A, the artificial intelligence unit B, the request processing unit C, and the data acquisition and processing unit D used in the present invention are implemented in a single execution environment.

In the disclosure of the present invention, an execution environment refers to an environment constructed by at least one selected from the group consisting of one or more physical machines, one or more virtual machines, and one or more containers.

In the case of Embodiment 1 of the present invention, the application execution server 103 which is a single execution environment is used, for example.

The execution environment may be operated as though a single physical machine actually exists, even in the case where the execution environment is formed by a plurality of physical machines, a plurality of virtual machines, or a plurality of containers, for example.

In the disclosure of the present invention, a request is transmitted from the browser or the like of the user terminal 101 operated by a user. The request is received by the application processing unit A, the artificial intelligence unit B, the data acquisition and processing unit D, or the like through the network 102 and the request processing unit C. Thereafter, a response to the request is transmitted from the application processing unit A, the artificial intelligence unit B, the data acquisition and processing unit D, or the like. The response is then received by the user terminal 101 over the network 102.

[D. Data Acquisition and Processing Unit]

Figure 5:
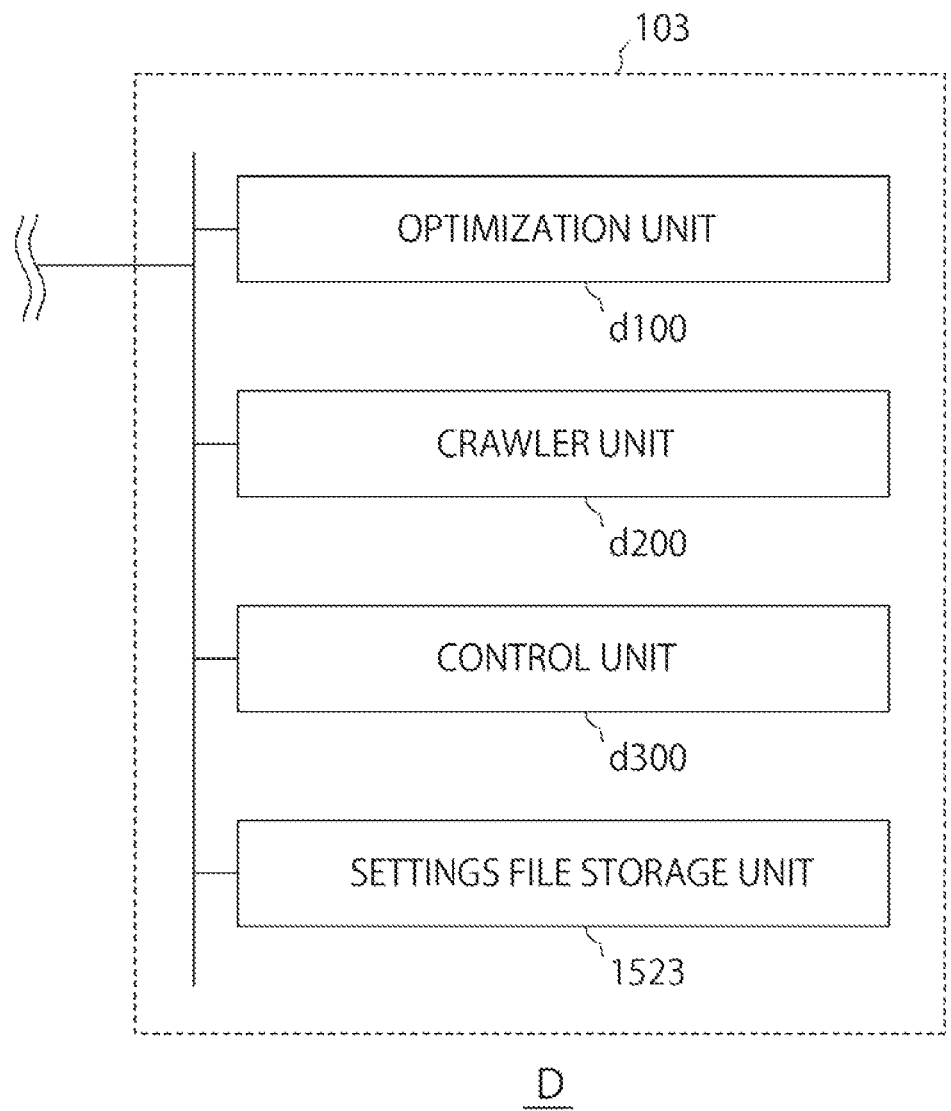
FIG. 5 is a schematic diagram for explaining a data acquisition and processing unit used in the present invention.

FIG. 5 is a schematic diagram for explaining the data acquisition and processing unit used in the present invention.

The data acquisition and processing unit D used in the present invention is mainly responsible for a function of acquiring information such as the original data 200 from the application processing unit A through the request processing unit C, and performing actions such as optimizing resources to suit each user terminal 101.

The data acquisition and processing unit D includes components such as an optimization unit d100, a crawler unit d200, and a control unit d300, for example.

The optimization unit d100 optimizes the HTML file 113 and resources such as the CSS file 107, the script language file 108, and the image file 109 saved in the application processing unit A, for example, on the basis of the strategy file 1412 describing the strategic plan devised by the artificial intelligence unit B.

The crawler unit d200 crawls resources such as the HTML file 113, the CSS file 107, the script language file 108, and the image file 109 saved in the application processing unit A to perform actions such as acquiring, saving, and monitoring data in the resources, for example.

Next, an automatic fast display control system for carrying out the automatic fast display control method for web content according to Embodiment 1 of the present invention will be described on the basis of FIG. 4 referenced above.

In FIG. 4, the user terminal 101 and the application execution server 103 can communicate with each other through a wired or wireless connection over the network 102.

Specific examples of the user terminal 101 include a mobile information terminal such as a smartphone or a feature phone, an information display terminal such as a personal digital assistant (PDA) or a tablet, a wearable communication terminal such as a smartwatch or smart glasses, and a computer such as a personal computer (PC).

In FIG. 4, a single user terminal 101 is illustrated as an example, but in actuality, one or more user terminals 101 may be used.

Examples of the network 102 used in Embodiment 1 of the present invention include one or more from among a virtual private network (VPN), a local area network (LAN), a wide area network (WAN), the public switched telephone network (PSTN), the Internet, an intranet, Ethernet®, a mobile phone network, or a public switched telephone network, for example.

The network 102 is capable of providing an environment enabling the user terminal 101, various execution environments, and the like to communicate with each other through a wired medium using optical fiber, communication wire, or the like, or through a wireless medium using electromagnetic waves such as infrared rays or radio waves.

The application execution server 103 includes a function of providing the user terminal 101 with information such as a web site including program data such as letters, symbols, and numerals in various languages, and binary data such as images, video, and audio.

The configuration of the application execution server 103 is not limited insofar as the application execution server 103 includes a function of causing web content according to original data to be displayed on the user terminal 101 over the network 102.

Additionally, the application execution server 103 is provided with at least the application processing unit A, the artificial intelligence unit B, the request processing unit C, and the data acquisition and processing unit D.

[Hardware Configuration of Each Device Used in Embodiment 1]

Figure 6:
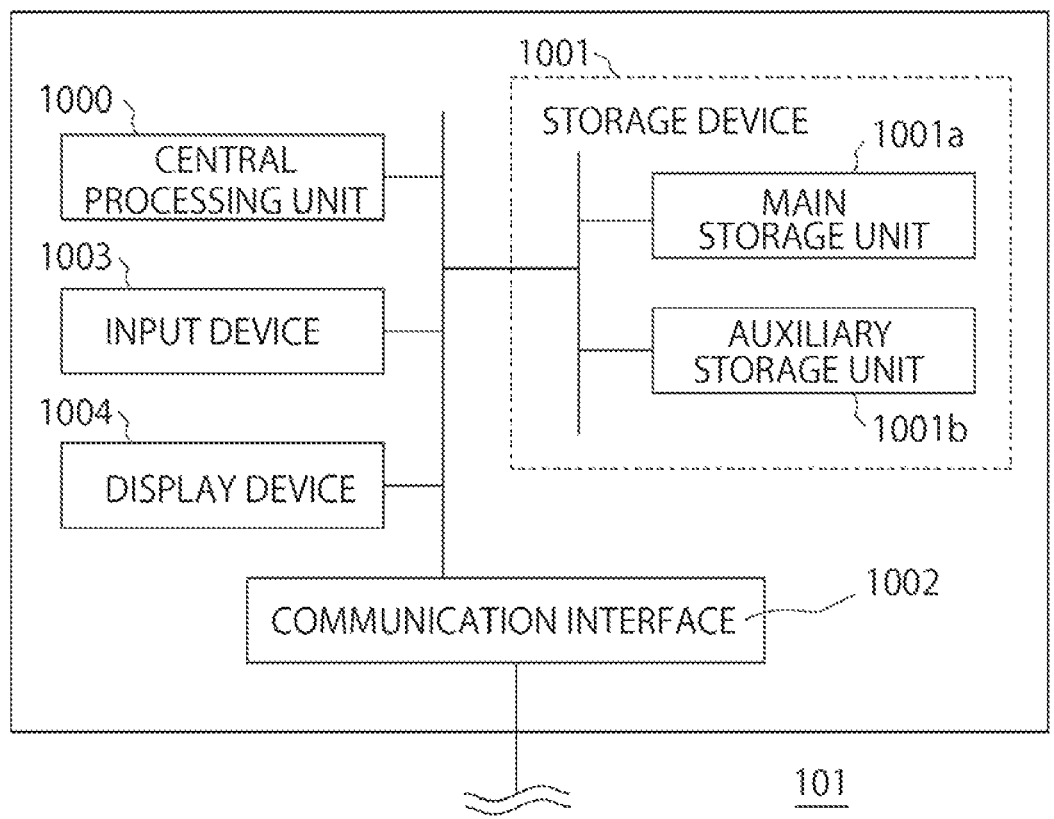
FIG. 6 is a diagram for explaining an example of a hardware configuration of a user terminal 101 used in the automatic fast display control method for web content according to Embodiment 1 of the present invention.

FIG. 6 is a diagram for explaining an example of a hardware configuration of the user terminal 101 used in the automatic fast display control method for web content according to Embodiment 1 of the present invention. [Hardware configuration of user terminal 101]

First, the hardware configuration of the user terminal 101 will be described.

For example, the user terminal 101 is provided with a hardware configuration including components such as a central processing unit (CPU) 1000, a storage device 1001, a communication interface 1002, an input device 1003, and a display device 1004. These hardware components are interconnected and are capable of communicating with each other.

The central processing unit 1000 includes a circuit capable of executing content stated in a program and thereby execute various processes.

The configuration of the central processing unit 1000 is not limited to being provided with a single microprocessor, and may also have a multi-processor configuration provided with two or more processors.

The storage device 1001 can store information such as data and programs necessary for operations by the user terminal 101. The storage device 1001 includes a main storage unit 1001a and an auxiliary storage unit 1001b, for example.

For the main storage unit, volatile memory such as random access memory (RAM) is used, for example. For the auxiliary storage unit, non-volatile memory such as a hard disk, a solid-state disk, or flash memory is used, for example.

Information such as an application program for a browser that can be used in the user terminal 101 is saved in the storage device 1001, for example. The browser can be used to view web content on the user terminal 101.

The communication interface 1002 receives various data transmitted from the request processing unit C and the like over the network 102, and transfers various data to the central processing unit 1000, for example.

Additionally, the communication interface 1002 transmits various data from the user terminal 101 to the request processing unit C and the like over the network 102.

The input device 1003 is a device used to perform various input operations on the user terminal 101. A device integrated with the display device 1004 may be used as the input device 1003, or separate devices for the input device 1003 and the display device 1004 may be used, for example.

The input device 1003 can accept the input of various data from the user. The accepted various types of data are transferred to the central processing unit 1000.

Examples of the input device 1003 include a touch panel, a touchpad, a mouse, a keyboard, a camera, or a microphone.

For example, in the case of a touch panel or a touchpad, the input of various data is accepted according to operations performed by the user's finger, operations performed using a dedicated input tool such as a touch pen, or the like.

In the case of a mouse, for example, the input of various data is accepted according to operations such as moving the mouse, selecting left or right keys installed on the mouse, clicking a certain number of times, tapping, dragging, or dropping.

In the case of a keyboard, the input of various data is accepted according to operations such as selecting any of various keys installed on the keyboard and selecting various keys at the same time, for example.

In the case of a camera, the input of various data is accepted by analyzing an image captured by the camera and converting the image into a signal that can be transferred to the central processing unit 1000, for example.

In the case of a microphone, the input of various data is accepted by analyzing sound captured by the microphone and converting the sound into a signal that can be transferred to the central processing unit 1000, for example.

The display device 1004 can display various data processed by the central processing unit 1000.

The display device 1004 may be a liquid crystal panel, an LED panel, an organic EL panel, a liquid crystal monitor, an LED monitor, or an organic EL monitor, for example. The display device 1004 may also be a touch panel that accepts the input of various data.

[Hardware Configuration of Application Execution Server 103]

Next, the hardware configuration of the application execution server 103 will be described. Note that the configuration of the application execution server 103 is not particularly limited insofar as the application execution server 103 is constructed from a single execution environment overall.

As an example, the case where the hardware configuration of the application execution server 103 is configured by a physical machine is described here. As described above, the configuration of the application execution server 103 is not limited to the case of being configured by a physical machine. Even in the case of selecting at least one execution environment selected from the group consisting of one or more physical machines, one or more virtual machines, and one or more containers, an execution environment similar to the execution environment configured by a single physical machine can be constructed and used in Embodiment 1 of the present invention.

Figure 7:
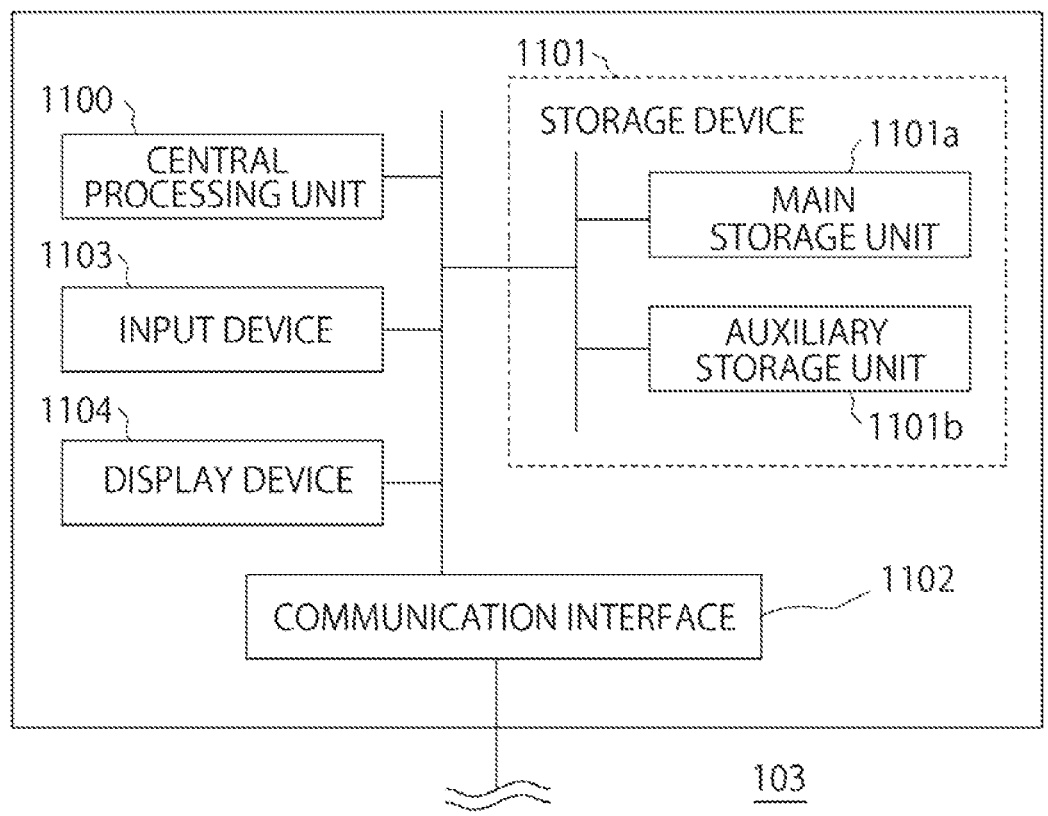
FIG. 7 is a diagram for explaining a hardware configuration of an application execution server used in the automatic fast display control method for web content according to Embodiment 1 of the present invention.

FIG. 7 is a diagram for explaining the hardware configuration of the application execution server used in the automatic fast display control method for web content according to Embodiment 1 of the present invention.

For example, the application execution server 103 is provided with a hardware configuration including components such as a central processing unit (CPU) 1100, a storage device 1101, a communication interface 1102, an input device 1103, and a display device 1104.

These hardware components are interconnected and are capable of communicating with each other.

The central processing unit 1100 includes a circuit capable of executing a program saved in a storage area of the storage device 1101 or the like, and thereby execute various processes, for example.

The configuration of the central processing unit 1100 is not limited to being provided with a single microprocessor, and may also have a multi-processor configuration provided with two or more processors.

The storage device 1101 can store information such as data and programs necessary for operations by the application processing unit A, for example. The storage device 1101 includes a main storage unit 1101*a* and an auxiliary storage unit 1101*b*, for example.

For the main storage unit, volatile memory such as random access memory (RAM) is used, for example. For the auxiliary storage unit, non-volatile memory such as a hard disk, a solid-state disk, or flash memory is used, for example.

In FIG. 7, the units such as the request processing unit C are installed inside the storage device 1101 as an example. The units A to D may also be installed in a single storage device 1101, but may also be installed in a distributed manner in different storage devices insofar as the units A to D are capable of communicating with each other.

The communication interface 1102 receives various data transmitted from the user terminal 101 and the like over the network 102, and transfers various data to the central processing unit 1100 and the like.

Additionally, the communication interface 1102 transmits various data from the request processing unit C to the user terminal 101 over the network 102.

The input device 1103 is a device used to input data into the units A to D and the like. A device integrated with the display device 1104 may be used as the input device 1103, or separate devices for the input device 1103 and the display device 1104 may be used, for example.

The input device 1103 can accept the input of various data from an administrator of the application execution server 103. The accepted various types of data are transferred to the central processing unit 1100.

Examples of the input device 1103 include a touch panel, a touchpad, a mouse, a keyboard, a camera, or a microphone.

The display device 1104 can display various data processed by the central processing unit 1100.

The display device 1104 may be a liquid crystal panel, an LED panel, an organic EL panel, a liquid crystal monitor, an LED monitor, or an organic EL monitor, for example. The display device 1104 may also be a touch panel that accepts the input of various data.

When operating the application execution server 103, for example, the administrator of the application execution server 103 inputs data such as letters, numerals, and symbols for example using the input device 1103 such as a command line interface (CLI) displayed on the display device 1104.

[Details of Hardware Configuration Included in Storage Device 1101 of Application Execution Server 103]

Next, details of the hardware configuration included in the storage device 1101 of the application execution server 103 will be described.

Figure 8:
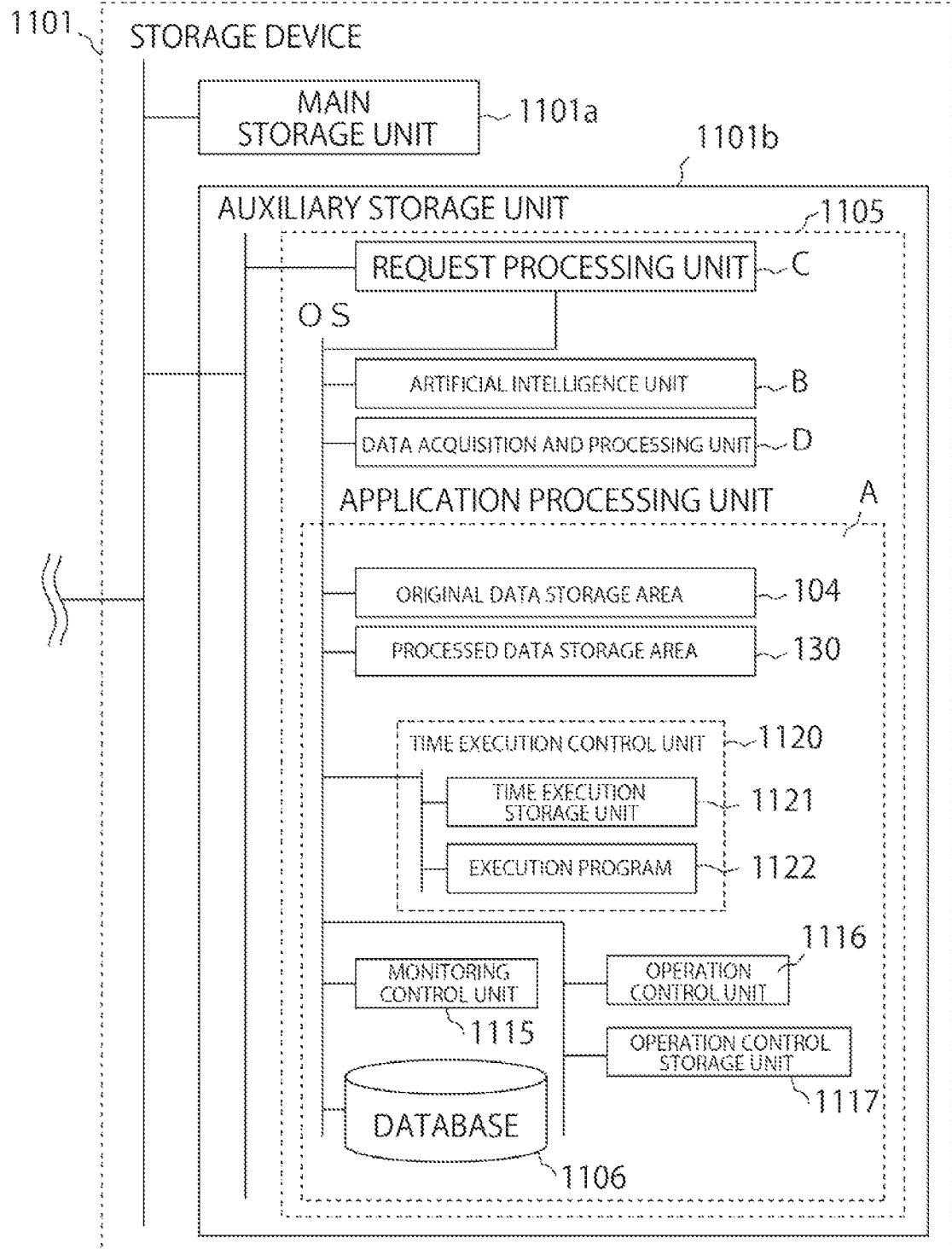
FIG. 8 is a schematic diagram for explaining details of a hardware configuration included in a storage device 1101 of an application execution server 103 used in the automatic fast display control method for web content according to Embodiment 1 of the present invention.

FIG. 8 is a schematic diagram for explaining details of a hardware configuration included in a storage device 1101 of an application execution server 103 used in the automatic fast display control method for web content according to Embodiment 1 of the present invention.

An operating system (OS) 1105 is installed in the storage device 1101 and is capable of controlling the central processing unit 1100, the storage areas and programs in the storage device 1101, and the like.

The OS 1105 may be obtained from the market for a fee or free of charge.

In FIG. 8, the storage device 1101 is provided with an original data storage area 104 and a database 1106. Original data 200 to be displayed on the user terminal 101 is saved in the original data storage area 104.

Additionally, the application processing unit A, the artificial intelligence unit B, the request processing unit C, and the data acquisition and processing unit D are installed in the storage device 1101.

In Embodiment 1 of the present invention, the automatic fast display control method for web content according to Embodiment 1 of the invention is achieved by causing the central processing unit 1100 to run programs included in the units on the OS 1105 included in the execution environment, for example.

[Application Processing Unit a Used in Automatic Fast Display Control Method for Web Content]

As illustrated in FIG. 8, the application execution server 103 is provided with the application processing unit A.

The application processing unit A is provided with a processed data storage area 130 in addition to the original data storage area 104 for saving the original data 200 and the database 1106.

The processed data storage area 130 may also be provided in the data acquisition and processing unit D rather than the application processing unit A, for example.

The application processing unit A installed in the storage device 1101 of the application execution server 103 may also be provided with, for example, a monitoring control unit 1115, an operation control unit 1116, and an operation control storage unit 1117 as necessary.

For example, in the operation control storage unit 1117 of the application processing unit A, data related to properties such as the type of the OS 1105 and the execution environment as well as data necessary for the operation control unit 1116 to operate are saved to enable the application processing unit A to support various applications written in programs.

As another example, in the case where there is an alteration to the original data 200 saved in the original data storage area 104, the monitoring control unit 1115 can detect the alteration automatically.

A signal indicating that the original data 200 has been altered is transmitted to at least one of the artificial intelligence unit B and the data acquisition and processing unit D.

The monitoring control unit 1115 monitors the original data 200 saved in the application processing unit A. For example, in the case of FIG. 2, the monitoring control unit 1115 can detect if there is an alteration such as an addition, relocation, removal, or modification of any resources such as a PHP file 105, an HTML file 113, a CSS file 107, a script language file 108, or an image file 109 included in the original data 200.

In the case where a function that can achieve the monitoring control unit 1115 is installed in the OS 1105 of the application execution server 103, the function can be used to install the monitoring control unit 1115 in the application processing unit A. In the case where a function that can achieve the monitoring control unit 1115 is not installed in the OS 1105 of the application execution server 103, a program having a function that can monitor for changes to the original data 200 may be installed in the application processing unit A to achieve the same effect.

The monitoring control unit 1115 is not particularly limited to being installed in the application processing unit A, and may also be installed in the data acquisition and processing unit D instead of, or in addition to, the application processing unit A. It is sufficient if the monitoring control unit 1115 is installed in at least one of the application processing unit A and the data acquisition and processing unit D.

The application processing unit A installed in the storage device 1101 of the application execution server 103 may also be provided with a time execution control unit 1120, for example.

The time execution control unit 1120 of the application execution server 103 can obtain an accurate current time over the network 102. An execution program 1122 containing information indicating what is to be executed when and at what timing is saved in a time execution storage unit 1521 of the time execution control unit 1120.

The time execution control unit 1120 may also be installed in the data acquisition and processing unit D.

With the time execution control unit 1120, various steps that need to be executed at a predetermined time on a predetermined date can be performed.

[Artificial Intelligence Unit B Used in Automatic Fast Display Control Method for Web Content]

As illustrated by way of example in FIG. 3 referenced above, the artificial intelligence unit B installed in the storage device 1101 of the application execution server 103 is provided with an artificial intelligence control unit 1410.

The artificial intelligence control unit 1410 can execute programs written in a programming language such as Python, C++, or JavaScript® for example in an execution environment including an OS and the like installed in the application execution server 103. The artificial intelligence control unit 1410 can generate a strategy file 1412. The generated strategy file 1412 is saved in the artificial intelligence storage area 1430. The strategy file 1412 may also be saved in association with the database 1106 or the like.

[Request Processing Unit C Used in Automatic Fast Display Control Method for Web Content]

The request processing unit C enables communication with the user terminal 101 and the like over the network 102, and has a function for communicating data among the units.

As illustrated in FIGS. 4 and 8, the request processing unit C installed in the storage device 1101 of the application execution server 103 is provided with a communication data control unit 1510 capable of inputting and outputting data over the network 102 through the communication interface 1102 of the application execution server 103, for example.

The communication data control unit 1510 can process external requests to the application execution server 103, requests from each unit, and also responses to these requests according to a JavaScript® program or the like.

By installing the request processing unit C in the application execution server 103, each of the units such as the application processing unit A, the artificial intelligence unit B, and the data acquisition and processing unit D can maintain a state allowing communication with the request processing unit C and with each other.

[Data Acquisition and Processing Unit D Used in Automatic Fast Display Control Method for Web Content]

As illustrated by way of example in FIG. 5 referenced above, the data acquisition and processing unit D installed in the storage device 1101 of the application execution server 103 may include an optimization unit d100, a crawler unit d200, and a control unit d300, for example.

The optimization unit d100, the crawler unit d200, and the control unit d300 can be executed in an execution environment including an OS installed in the application execution server 103 according to a programming language such as Python, C++, or JavaScript®.

The data processed by the data acquisition and processing unit D may be saved in the database 1106 or the like.

As another example, units such as the optimization unit d100 and the crawler unit d200 are controlled by a program written in the control unit d300 of the data acquisition and processing unit D.

A crawler configured by the program installed in the crawler unit d200 can be used to crawl, acquire, and save data such as the original data 200 saved in the original data storage area 104 of the application processing unit A.

In addition, the original data 200 or the like is monitored, and if there is a change in the original data 200 or the like, resources such as processed data corresponding to the change are generated by a program installed in the optimization unit d100.

As another example, the control unit d300 of the data acquisition and processing unit D can also function as a web worker that can execute processes according to various programs independently in the background, without being affected by the execution of the application execution server 103.

[Original Data 200 Used in Automatic Fast Display Control Method for Web Content]

Next, the original data 200 used in the automatic fast display control method for web content according to Embodiment 1 of the present invention will be described.

The original data 200 used in the present invention is generated dynamically or statically and saved in the original data storage area 104 provided in the application processing unit A.

Note that in the automatic fast display control method for web content according to the present invention, when a request is transmitted from the user terminal 101 to the application execution server 103, the original data 200 for displaying web content on the user terminal 101 may also be transmitted as-is from the application execution server 103 to the user terminal 101, and the web content may be displayed on the user terminal 101.

In the disclosure of the present invention, including the web content according to Embodiment 1 of the present invention, it is possible to switch the delivery of web content back and forth between the case of performing the automatic fast display control method according to the present invention and the case of not performing the automatic fast display control method according to the present invention based on the original data 200.

Examples of the original data 200 used in the disclosure of the present invention include one or more types of data such as program data (1) and binary data (2).

Specifically, examples of the program data (1) include one or more from among a markup language such as HTML or XML, a programming language such as PHP, Perl, Java®, C, or Lua, a style sheet such as CSS or SCSS, or a script language such as JavaScript®, TypeScript®, or the JavaScript® library JQuery®.

Also, examples of the binary data (2) include one or more types of data such as image files, audio files, or video files.

The program data (1) includes numeral data, symbol data, and text data, for example.

The binary data (2) includes data that can be perceived with the five human senses, such as sound data, image data, and video data, for example.

The markup language is HTML, XML, or the like used in a document describing the basic structure of a web site or the like.

Also, the programming language such as PHP, Perl, Java®, C, or Lua is a language which actually can run the application execution server 103 or the like such that web content is displayed on each user terminal 101.

The style sheet such as CSS or SCSS is a program that mainly controls design elements such as the position, size, and type of letters, numerals, symbols, images, and the like that are displayed in the browser or the like of the user terminal 101.

Also, the script language such as JavaScript®, TypeScript®, or the JavaScript® library JQuery® is a program that performs a variety of processes necessary to display web content on the user terminal 101, mainly processes enabling the user to perform operations such as clicking buttons or the like and scrolling a web site or the like displayed on the user terminal 101.

FIG. 2 described above is a schematic diagram for explaining relationships among files saved in the original data storage area 104 and the processed data storage area 130 of the storage device 1101 installed in the application processing unit A used in Embodiment 1 of the present invention.

As one specific example in FIG. 2, a PHP programming language is saved in the original data storage area 104 as the data of a PHP file 105. Also, data necessary for displaying the PHP file 105 is stored in the database 1106.

In the case of Embodiment 1 according to the present invention, as illustrated by way of example in FIG. 2, PHP written in the PHP file 105 is used as one example of the programming language, but the programming language used in the present invention is not limited to PHP, and another programming language such as Lua that can be used to achieve the display of web content may also be selected and used as appropriate.

Also, data of a CSS file 107, a script language file 108, and an image file 109 are saved in the original data storage area 104 as an example of resource 124.

Data necessary for displaying web content in the browser or the like of the user terminal 101 is referenced from the database 1106 by the program written in the PHP file 105 or the like.

In addition, access information to the CSS file 107, the script language file 108, and the image file 109 is written in the PHP file 105 or the like, and web content to be displayed on the user terminal 101 can be generated from the PHP file 105 or the like using the data in the CSS file 107, the script language file 108, and the image file 109.

Variables defined inside the PHP file 105 or the like are saved in the database 1106.

The database 1106 is provided with components such as a data reading means, a data writing means, a data saving means, and a data searching means.

Data corresponding to variables written in the PHP file 105 or the like are written to and saved in the database 1106 in advance.

Additionally, data saved in the database 1106 can be called on the basis of the variables written in the PHP file 105 or the like.

The browser or the like installed in the user terminal 101 operated by a user can execute a program written in the PHP file 105 or the like to generate the HTML file 113, or the application processing unit A can execute a program written in the PHP file 105 or the like to generate the HTML file 113.

The HTML file 113 may be pre-generated statically or generated dynamically either before or immediately after a request from the user terminal 101. In addition, the HTML file 113 may also be generated dynamically every time a program written in the PHP file 105 or the like is executed.

Ordinarily, the HTML file 113 is generated dynamically. The same applies hereinafter.

For example, the CSS file 107 and the script language file 108 referenced by the HTML file 113 or the like may also be pre-generated statically or may be generated dynamically every time the program written in the PHP file 105 is executed before or immediately after a request from the user terminal 101.

[Flow of Processes by All-In-One Type in Response to Request from User]

Figure 9:
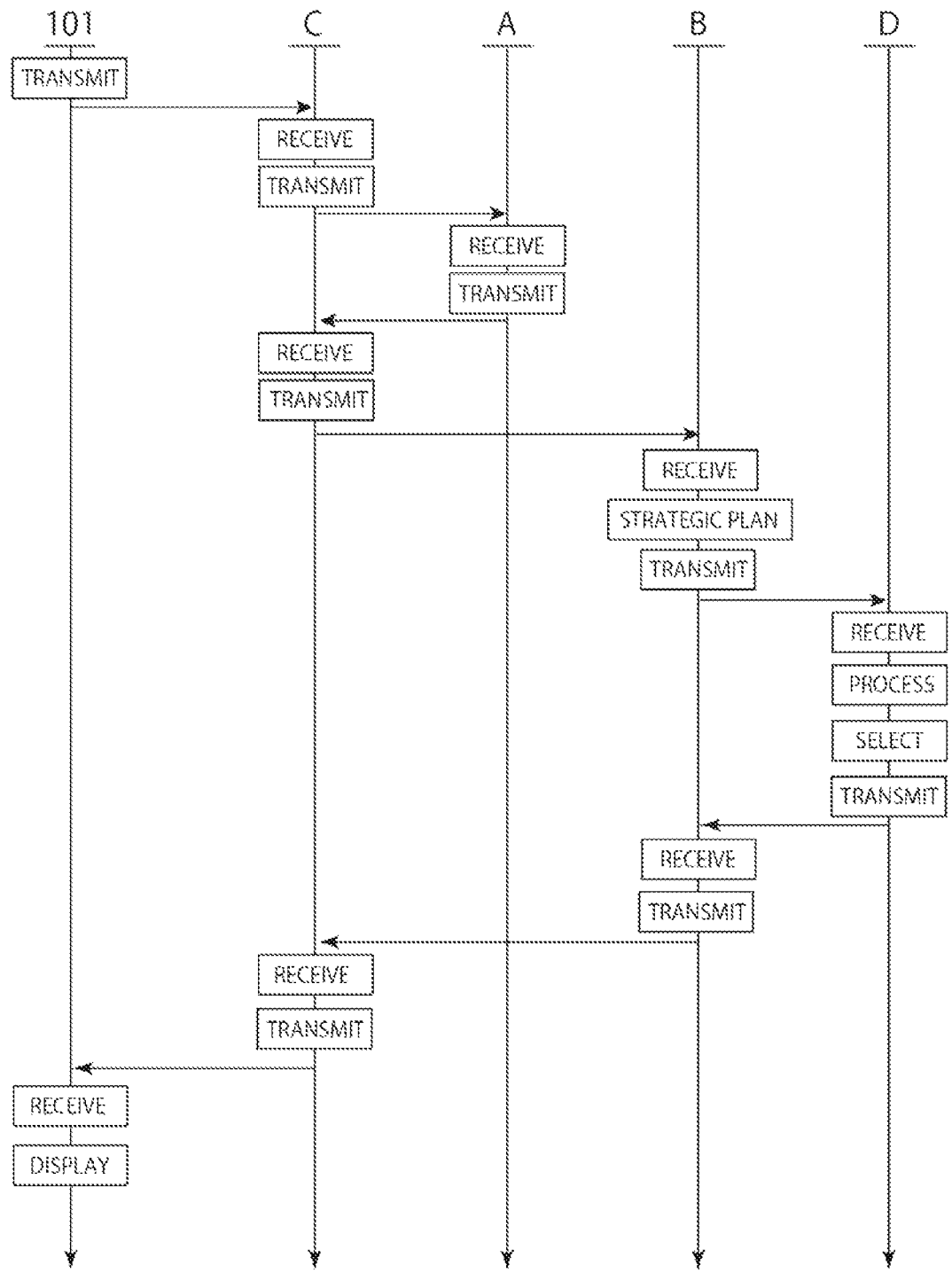
FIG. 9 is a schematic diagram for explaining how a request from a user is processed.
Figure 10:
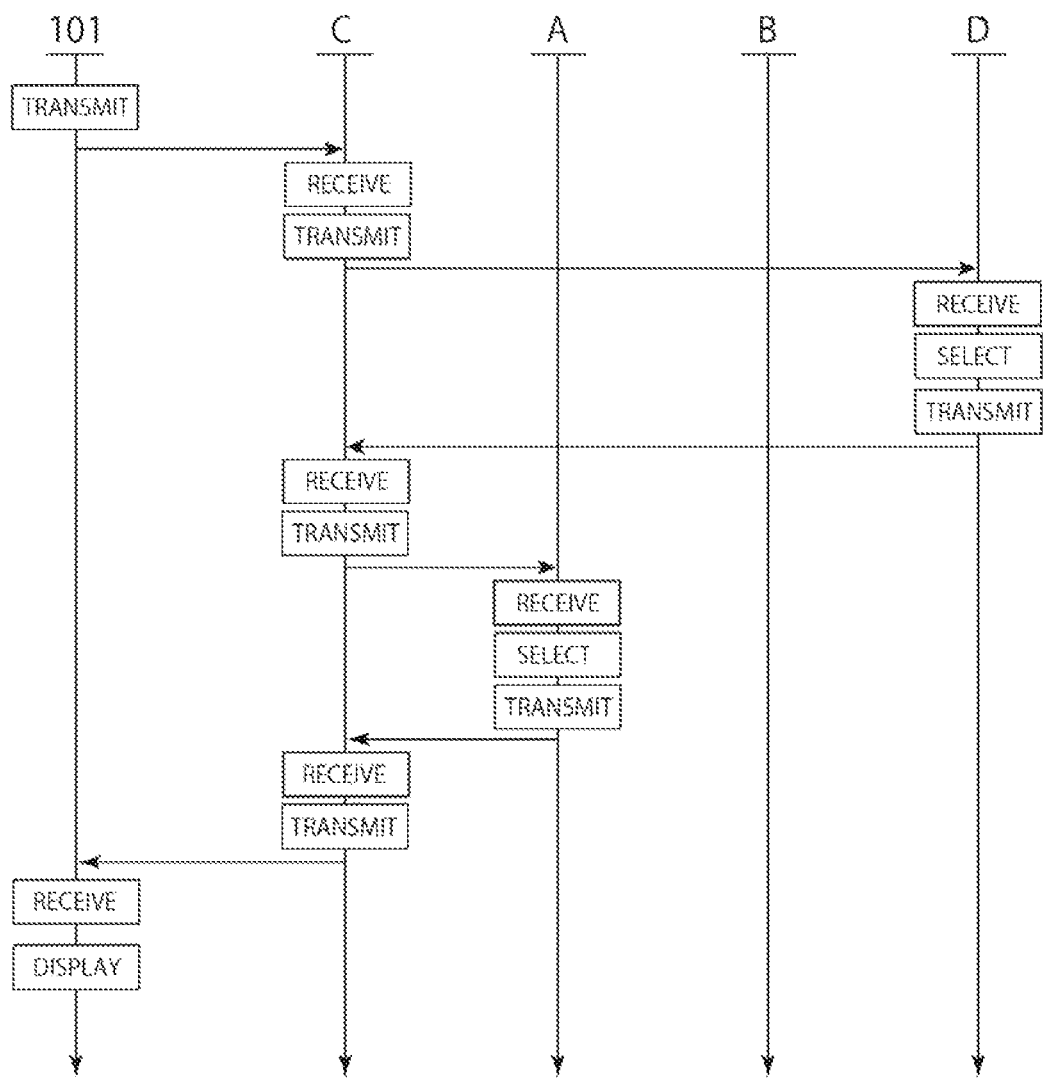
FIG. 10 is a schematic diagram for explaining how a request from a user is processed.
Figure 11:
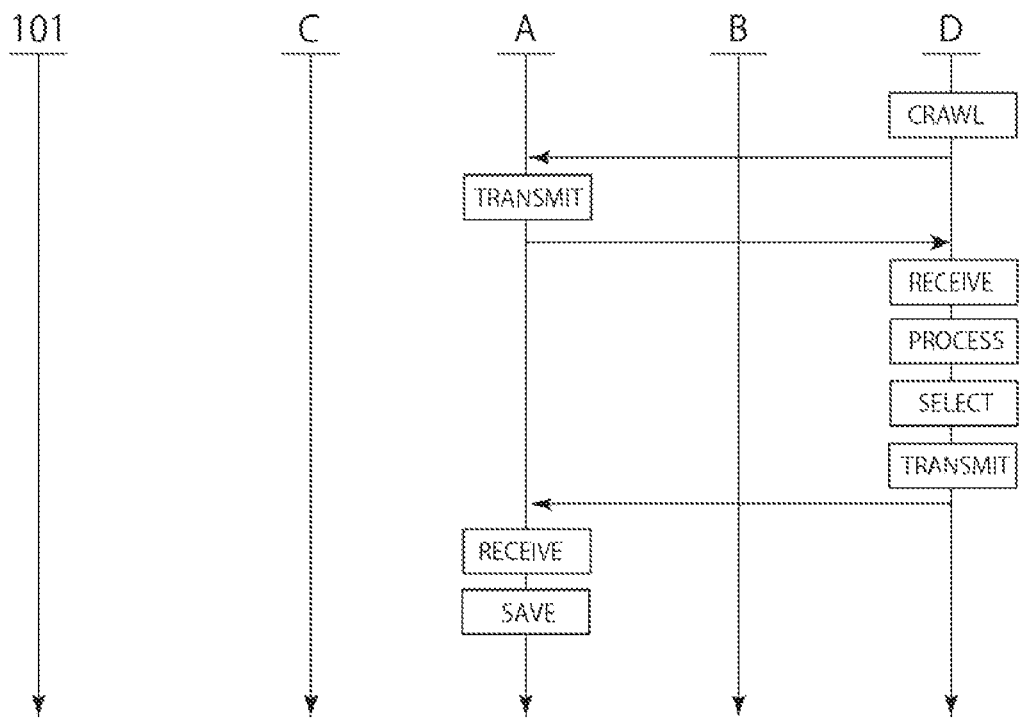
FIG. 11 is a schematic diagram for explaining how a request from a user is processed.

Each of FIGS. 9 to 11 is a schematic diagram for explaining how a request from a user is processed.

In each of FIGS. 9 to 11, the vertical axis represents time and the horizontal axis represents the flow of data.

A request transmitted from the browser or the like of the user terminal 101 operated by a user is transmitted to the request processing unit C over the network 102.

In the case where the automatic fast display control method for web content according to Embodiment 1 of the present invention is not performed, the request processing unit C receiving the request transmits the request to the application processing unit A. The application processing unit A receiving the request transmits the original data 200 for displaying web content on the user terminal 101 of the user to the request processing unit C as a response. Thereafter, the response is transmitted from the request processing unit C to the user terminal 101 over the network 102. The transmitted response is received by the user terminal 101. Additionally, web content based on the original data 200 is displayed on the user terminal 101 by the browser or the like installed in the user terminal 101.

In the case of the automatic fast display control method for web content according to Embodiment 1 of the present invention, after a request transmitted from the browser or the like of the user terminal 101 operated by a user is transmitted to the request processing unit C over the network 102, an operation of processing the original data 200 is performed, and in addition, an operation of processing the processed data is performed.

As illustrated by way of example in FIG. 9, a request transmitted from the browser or the like of the user terminal 101 operated by a user is transmitted to the request processing unit C over the network 102.

The request processing unit C receiving the request transmits the request to the application processing unit A. The application processing unit A receiving the request dynamically generates the HTML file 113 and the like for displaying web content on the user terminal 101 of the user, for example.

The HTML file 113 is an example of original data including a portion that references resources. Examples of original data including a portion that references resources include one or more types of files such as an HTML file, an XML file, and a PHP file.

At this time, an operation for starting the downloading, to the user terminal 101, of resources referenced by the HTML file 113 received by the user terminal 101 may also be performed.

Alternatively, downloading may be put on standby on the basis of a strategic plan devised by the artificial intelligence unit B.

The downloading means that the resources saved in the original data storage area 104 of the application processing unit A and referenced by the HTML file 113 are transmitted to the user terminal 101 over the network 102 through the application processing unit A and the request processing unit C.

The request processing unit C interrupts the process of downloading to the user terminal 101 over the network 102 through the application processing unit A to the request processing unit C as a response, and acquires the data of the HTML file 113 as illustrated in FIG. 9.

Specifically, a request transmitted from the browser or the like of the user terminal 101 is transmitted to the request processing unit C over the network 102. Next, the request is transmitted from the request processing unit C to the application processing unit A.

The application processing unit A receiving the request transmits data such as the HTML file 113 to the request processing unit C as a response, for example.

The acquired data such as the HTML file 113 is successively transmitted from the request processing unit C to the artificial intelligence unit B and the data acquisition and processing unit D. The data acquisition and processing unit D optimizes the HTML file 113 on the basis of a strategic plan devised by the artificial intelligence unit B.

The data for an optimized HTML file 113z is transmitted to the user terminal 101 over the network 102 through the data acquisition and processing unit D, the artificial intelligence unit B, and the request processing unit C.

For example, information about resources referenced by the HTML file 113 for displaying web content in the browser or the like of the user terminal 101 is written in the HTML file 113 that acts as original data including a portion that references resources.

In the data acquisition and processing unit D, the resource-referencing portions included in the HTML file 113 are replaced with program objects to generate the optimized HTML file 113z. Each object is assigned identification information for specifying a corresponding resource. The optimized HTML file 113z is one example of an object-replaced program.

As illustrated in FIG. 10, when the optimized HTML file 113z is executed by the browser or the like installed in each user terminal 101, a request is transmitted from the request processing unit C to the data acquisition and processing unit D over the network 102 on the basis of the objects written in the optimized HTML file 113z. Optimized resources are selected by the data acquisition and processing unit D receiving the request, and the optimized sources are transmitted to the user terminal 101 over the network 102 through the request processing unit C.

Also, in the case where optimized resources do not exist, as illustrated in FIG. 10, the request processing unit C acquires corresponding resources from the original data 200 saved in the application processing unit A. The acquired resources are transmitted from the application processing unit A to the user terminal 101 through the request processing unit C.

In the case where optimized resources do not exist, corresponding resources from the original data 200 are used. On the other hand, the data acquisition and processing unit D proceeds with the generation and selection of optimized resources in the background. When optimized resources are generated, the optimized resources are transmitted from the data acquisition and processing unit D to the user terminal 101 over the network 102 through the request processing unit C. Thereafter, the resources that had been used for each user terminal 101 are replaced by the optimized resources.

Also, as illustrated in FIG. 11, a crawl control unit 1510 of the crawler unit d200 installed in the data acquisition and processing unit D crawls the original data 200 and the like saved in the application execution server 103 at a time when the user terminal 101 and the application execution server 103 are not communicating with each other, such as before a user transmits a request from the browser or the like installed in the user terminal 101 to the application execution server 103, for example.

Optimized resources are generated by a control unit 1610 of the optimization unit d100 installed in the data acquisition and processing unit D on the basis of the crawled original data 200 and the like, and the optimized resources are stored in the database 1106.

The crawler unit d200 installed in the data acquisition and processing unit D periodically crawls the original data 200 saved in the application processing unit A, and a step of automatically generating and storing optimized resources in the database 1106 is performed.

To capture changes in the original data 200, changes in the original data 200 are monitored by a program installed in at least one of the data acquisition and processing unit D and the application processing unit A.

When there is a change in the original data 200, the crawler unit d200 installed in the data acquisition and processing unit D crawls the original data 200, and optimized resources are generated automatically.

The optimized resources generated by crawling, monitoring, and the like are continually downloaded to the user terminal 101 every time there is a request from each user terminal 101, for example.

[Details of Processing of Original Data 200]

Figure 12:
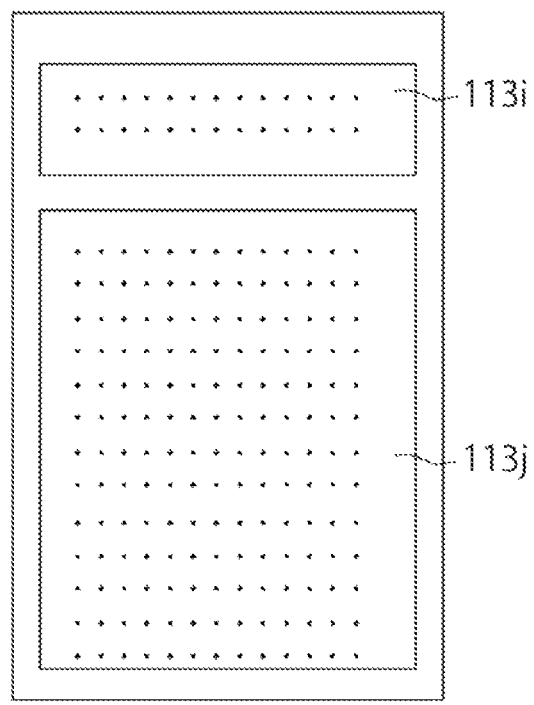
FIG. 12 is a conceptual diagram for explaining how original data 200 is processed.
Figure 13:
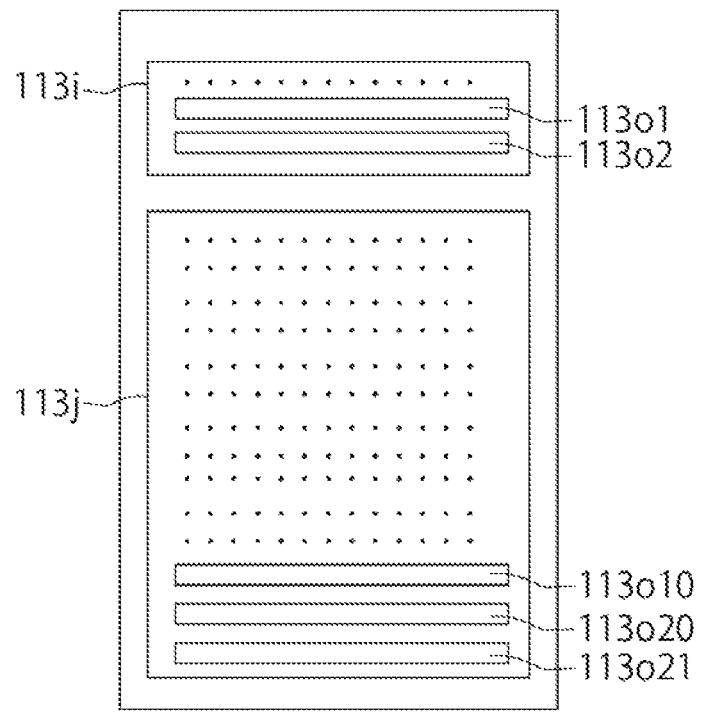
FIG. 13 is a conceptual diagram for explaining how original data 200 is processed.

FIGS. 12 and 13 are conceptual diagrams for explaining how the original data 200 is processed.

The disclosure of the present invention includes a step of generating an object-replaced program by replacing all resource-referencing portions included in program data containing at least one of a markup language and a programming language included in the original data 200 for displaying web content on the user terminal 101 with objects defined by a program, and a step of generating optimized resources by processing the resources corresponding to the resources referenced by the object-replaced program.

[Step of Generating Object-Replaced Program]

Examples of the program data for displaying web content on the user terminal 101 include program data containing at least one of a markup language such as HTML or XML, and a programming language such as PHP, Perl, Java®, C, or Lua.

FIG. 12 illustrates an example of the HTML file 113 as one example of data containing at least one of a markup language and a programming language included in the original data 200 for displaying web content on the user terminal 101.

The HTML file 113 includes a head portion 113$i$ and a body portion 113$j$, for example.

The head portion 113$i$ contains portions referencing data necessary to execute the HTML file 113, such as a style sheet such as CSS or SCSS, or a program written in a script language such as JavaScript®, TypeScript®, or the JavaScript® library JQuery®, for example.

The body portion 113$j$ contains portions referencing information such as program data that is displayed in the browser or the like of the user terminal 101 and read by the user operating the user terminal 101, or binary data such as an image file, an audio file, or a video file, for example.

As another example, the body portion 113$j$ contains portions referencing information such as program data that is displayed in the browser or the like of the user terminal 101 and read by the user operating the user terminal 101, or various programs necessary to control the browser or the like of the user terminal 101.

As one example, FIG. 13 illustrates an optimized HTML file 113$z$ newly generated as object-replaced program data. The object-replaced program data includes data written in a markup language, such as an HTML file or an XML file, and data written in a programming language, such as a PHP file, for example.

FIG. 13 illustrates an example of a situation in which all of the reference portions of the HTML file 113 illustrated by way of example in FIG. 12 have been replaced with objects with identification information.

The HTML file 113 includes reference portions, but the reference portions include reference portions such as a style sheet and a program that are written directly into the HTML file 113 and reference portions such as a style sheet and a program that are written outside the HTML file 113.

Rules to be applied when a reference portion is written in a markup language or the like are determined in advance. It is possible to distinguish which portions of the HTML file 113 correspond to reference portions according to the rules.

For example, the optimization unit d100 installed in the data acquisition and processing unit D replaces all of the respective reference portions with objects with identification information that can be handled by a program.

Note that the identification information is information for establishing a correspondence relationship between a reference portion written in a markup language or the like and an object, and is unique information that can specify a single object with respect to a single reference portion.

Also, an object in the disclosure of the present invention means an entity that can be handled by the execution environment including the user terminal 101 and the units A to D, and refers to one or more types of concepts such as variables, arrays, functions, and programs, for example.

For example, the step of replacing each reference portion written in the HTML file 113 with an object with identification information that can be handled by a program can be performed without a substantial examination regarding the type of content actually included in the reference portion, approximately how much time it takes to execute the content, or the approximate size of the content.

The sections to be replaced can be determined formally according to rules from the written content of the HTML file 113 and the content of the strategy file generated by the artificial intelligence unit B, and by simply replacing each section with identification information and an object, the optimized HTML file 113$z$ can be generated quickly.

As illustrated by way of example in FIG. 13, in the optimized HTML file 113$z$ treated as replaced program data, the reference portions in the HTML file 113 included in the original data have been replaced with respective objects 113$o_1$, 113$o_2$, and so on.

Objects 113$o_1$, 113$o_2$, and so on to be executed initially by the browser or the like of the user terminal 101 operated by the user are inserted by replacement into the head portion 113$i$ of the optimized HTML file 113$z$.

Also, an object 113$o_{10}$ for inserting an object with identification information into the optimized HTML file 113$z$ is written into the body portion 113$j$ of the optimized HTML file 113$z$.

In addition, programs to be executed by the browser or the like of the user terminal 101 are inserted into the body portion of the optimized HTML file 113$z$ as objects 113$o_{20}$, 113$o_{21}$, and so on.

[Step of Generating Optimized Resources]

Next, the step of generating optimized resources used in Embodiment 1 of the present invention will be described.

Examples of optimized resources include resources obtained by processing at least one of (1) the program data and (2) the binary data described above.

In the case of Embodiment 1 according to the present invention, the HTML file 113 is adopted as an example.

For example, the HTML file 113 that is generated statically and saved in the application processing unit A, or generated dynamically and saved in the application processing unit A, contains portions referencing resources for displaying web content on the user terminal 101, such as reference portions to the CSS file 107, the script language file 108, and the image file 109.

When a program written in the HTML file 113 is executed by the browser or the like installed in the user terminal 101, a program written in each of the CSS file 107 and the script language file 108 are also executed.

Web content is generated in accordance with the execution of the program written in the HTML file 113.

Thereafter, the web content received by the user terminal 101 is normally displayed on the user terminal 101.

For example, for web content displayed by program data such as a programming language written in the PHP file 105, the HTML file 113 and binary data such as image data from the image file 109, properties such as the display position, the display size, and the display layout are specified by the CSS file 107, the script language file 108, and the like according to the display environment of the user terminal 101.

With the original data 200 including data such as the PHP file 105, the HTML file 113, the CSS file 107, the script language file 108, and the image file 109 as an example of the data used in Embodiment 1 according to the present invention illustrated by way of example in FIG. 2 described above, web content can be displayed with respect to the display environments of all kinds of user terminals 101 anticipated to access the application processing unit A, but on the other hand, the original data 200 also includes portions that are not needed in the display environments of individual user terminals 101.

For example, the original data 200 necessary in the case where the user terminal 101 is a PC also includes portions of the original data 200 that are not necessary in the case where the user terminal 101 is a smartphone.

Conversely, the original data 200 necessary in the case where the user terminal 101 is a smartphone also includes portions of the original data 200 that are not necessary in the case where the user terminal 101 is a PC, for example.

In addition, in some cases, even in the case where the user terminal 101 is a smartphone, the necessary portions of the original data 200 may be different among a plurality of different smartphones.

Furthermore, in some cases, the necessary portions of the original data 200 may be different depending on the type of browser installed in the user terminal 101.

If the same original data 200 is transmitted indiscriminately from the application processing unit A to the user terminals 101, the result is that the original data 200 will include data that does not need to be displayed on the individual user terminals 101.

To prevent data that does not need to be displayed on the individual user terminals 101 from being transmitted from the application processing unit A to the individual user terminals 101 and shorten the display completion time, the original data 200 is processed by the data acquisition and processing unit D, and a plurality of processed data 201 is generated.

The original data 200 includes at least one of program data and binary data.

The original data 200 includes data written in a markup language.

Also, the information written in a markup language contains directly written reference information such as a style sheet, a programming language, and a script language.

Reference information to information such as an external style sheet, an external script language, or external binary data is also included in the markup language.

Note that the term "external" here means information which is not written directly in the markup language, but which can be utilized as web content by being referenced from within the markup language.

Specifically, for example, the HTML file 113, which is a file written in a markup language, includes reference information such as a plurality of code portions of the HTML file written directly in the HTML file 113, a plurality of code portions in the CSS file 107, and a plurality of code portions in the script language file 108.

In addition, the HTML file 113 includes external file portions of a plurality of referenced CSS files 107, external file portions of a plurality of script language files 108, and the like.

Reference portions related to one or more types of external files such as image files, audio files, and video files are also written in the HTML file 113.

The original data 200 can be transmitted to all user terminals 101 with a specified display environment through the network 102. If the HTML file 113 is executed in the browser or the like of each user terminal 101 receiving the original data 200, web content 211 based on the original data 200 is displayed.

Next, to illustrate an overview of Embodiment 1 according to the present invention, processed data generation and resource optimization will be described.

Figure 14:
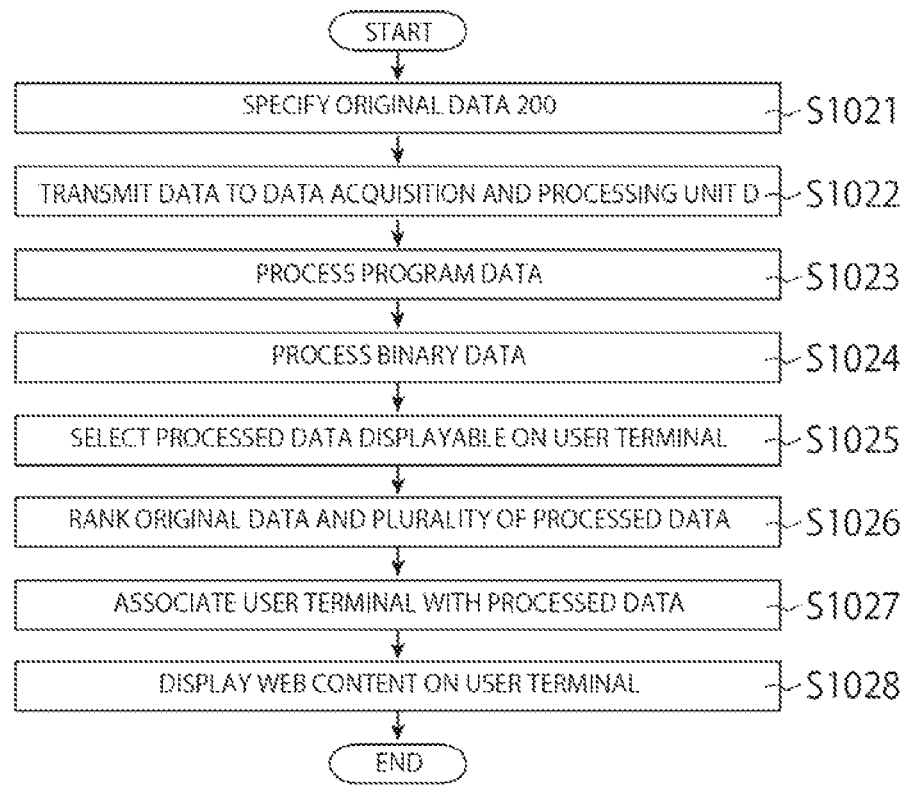
FIG. 14 is a flowchart for explaining the relationship between processed data generation and resource optimization.

FIG. 14 is a flowchart for explaining the relationship between processed data generation and resource optimization.

It is assumed that the original data 200 is normally displayable on the user terminals 101 of all users written in a model information file.

This is because the original data 200 normally is created so that display problems do not occur on the user terminals 101.

In the hypothetical case where the original data 200 has a problem, the problem is detected using an emulator such as a headless browser installed in the data acquisition and processing unit D, for example. Problems can be corrected individually on the basis of information about detected problems.

For example, first, the program data and the binary data included in the original data 200 are processed.

The program data and the binary data included in the original data 200 are successively transmitted to the artificial intelligence unit B and the data acquisition and processing unit D.

The program data and binary data received by the data acquisition and processing unit D may be saved in an original data storage area 1530 of the data acquisition and processing unit D.

As illustrated in FIG. 2 above, the program data includes one or more types of data such as the HTML file 113, the CSS file 107, and the script language file 108, for example.

Also, the binary data includes one or more types of data such as image files, audio files, and video files, for example.

In Embodiment 1 of the present invention, the HTML file 113 is adopted as one example of a file containing a markup language included in the program data.

The web content displayed on the user terminal 101 according to the original data 200 ordinarily includes a plurality of web pages. A plurality of HTML files 113 acting as the program data correspond to each of the web pages, respectively. In the case of FIG. 2, this is indicated by the HTML file 113.

Each HTML file 113 is a unit that can be displayed on the browser of the user terminal 101 without having to perform a reload operation.

Next, the data of some or all of the program data that needs to be processed is transmitted to the data acquisition and processing unit D (steps S1021, S1022).

The data of some or all of the program data that is transmitted to the data acquisition and processing unit D is processed by the data acquisition and processing unit D (step S1023).

Examples of the processing of the data of some or all of the program data by the data acquisition and processing unit D include the removal of a program or the like that can be omitted or the compression of a program or the like included in the program data, rearrangement of the processing order, or changing the processing timing.

The processing of the data of some or all of the program data includes the case of treating resources such as program data and binary data referenced by the HTML file 113 or the like as respective objects. By treating respective portions such as program data referenced by the HTML file 113 and binary data referenced by the HTML file 113 as objects defined within the HTML file 113, processed data can be specified easily.

Similarly, for example, a style sheet, a script language, and the like referenced by the HTML file 113 or the like are also processed by the data acquisition and processing unit D (step S1023).

In addition, for example, data such as binary data referenced by the HTML file 113 or the like is processed (step S1024).

The processes in steps S1023 and S1024 are performed in series, but may also be performed at the same time in parallel.

The process from step S1023 to step S1024 is a process performed on each resource included in the original data 200. In other words, the process is performed on the program data and the binary data included in the original data 200.

The process performed on each resource included in the original data 200 is performed on the same resource once or multiple times.

Processed program data and processed binary data are obtained in correspondence with the number of times the process is performed on each resource.

Next, processed data 210 displayable on the user terminal 101 is selected from among the plurality of processed data (step S1025).

The process in step S1023 and step S1024 above is performed on each resource included in the original data 200.

In contrast, in step S1025, singular processed data 210 is generated by combining processed resources. The singular processed data 210 corresponds to a single web page. A plurality of processed data 210 with different display completion times is generated for each user terminal 101. Each web page is a single unit to be displayed in the browser of the user terminal 101 without performing a reload operation by the browser.

Similarly, respective pluralities of processed data 210 are generated for each web page included in the entire original data 200.

Next, the data that are displayable on one type of user terminal 101 from among the original data 200 and the plurality of processed data 210 are ranked according to the display completion time for the user terminal 101 (step S1026).

Through similar steps, all of the processed data 210 is ranked.

Note that in the disclosure of the present invention, the "display completion time" refers to the time from when a request is transmitted from the user terminal 101 until a web page corresponding to the request is ready to accept input from the user in the browser or the like installed in the user terminal 101.

Also, "ready to accept input" refers to the browser installed in the user terminal 101 being in a responsive state with respect to operations such as tapping, clicking, dragging, and dropping or operations such as inputting text performed by the user.

The display completion time can be estimated through analysis using a preliminary test described later or a trained model obtained by machine learning or the like using data obtained by a preliminary test. The estimate can be used to execute a ranking based on the display completion time.

Through the above steps, processed data 210 corresponding to each user terminal 101 is prepared. The prepared processed data 210 may also be transferred from the data acquisition and processing unit D through the request processing unit C and saved in the processed data storage area 130 inside the application processing unit A.

Next, web content to be displayed on the user terminal 101 is selected according to a request transmitted from the user terminal 101 to the request processing unit C over the network 102 (S1027).

Actually, immediately after the request processing unit C receives the request from the user terminal 101 of a user, the request is successively transmitted to the artificial intelligence unit B and the data acquisition and processing unit D.

The content of the request is analyzed by a control unit 1512 of the data acquisition and processing unit D. The web content to be displayed on each user terminal 101 is selected according to the content of the request.

In the disclosure of the present invention, "immediately after the request processing unit C receives the request" means within 0.2 seconds, or in other words 200 milliseconds, from when the request processing unit C receives the request from the user terminal 101. Preferably, the above time is 100 milliseconds or less.

Also, the time from when the request processing unit C receives the request until the user terminal 101 is ready to accept input is preferably within 200 milliseconds, more preferably within 100 milliseconds.

The time from when a person receives information using the five senses such as the sense of sight or hearing until the person actually starts to act is normally approximately 0.2 seconds. If the request processing unit C and the like respond within 200 milliseconds, it is possible to make the user using the user terminal 101 feel as though the web content is being displayed in the browser or the like of the user terminal 101 in real time.

In actuality, the processed data 210 forming the web content to be displayed on the user terminal 101 is selected according to the request transmitted from the user terminal 101 to the data acquisition and processing unit D through the request processing unit C (S1027).

Identification information and objects are prepared in advance in the optimized HTML file 113z treated as an object-replaced program. By simply associating the processed data 210 with an object on the basis of the identification information, the preparation of the optimized HTML file 113z is completed.

The processed data 210 saved all together or in a distributed manner in at least one of the application processing unit A and the data acquisition and processing unit D is transmitted to the user terminal 101 over the network 102, and downloaded to the user terminal 101 side.

When the optimized HTML file 113z is executed in the browser or the like of the user terminal 101, resources and the like downloaded to each user terminal 101 can be executed.

Moreover, resources and the like that can be referenced over the network 102 from the browser or the like in the user terminal 101 without being downloaded to the user terminal 101 may also be executed in the browser or the like of the user terminal 101.

These resources are managed in the optimized HTML file 113z by the objects described above, and therefore the choosing and adopting of the resources can be performed quickly.

The optimized HTML file 113z is executed in the browser or the like of the user terminal 101, and web content based on the processed data 210 is displayed on each user terminal 101 (S1028).

Through the above steps, the automatic fast display control method for web content according to Embodiment 1 of the present invention can be carried out.

[Step of Generating Processed Data]

Next, the step of generating the processed data 210 from the original data 200 will be described in detail.

The step of generating the processed data 210 is performed at a timing of at least one of before the request processing unit C receives the request from the user terminal 101, immediately after the request processing unit C receives the request from the user terminal 101, and after communication between the application execution server 103 and the user terminal 101 ends, for example.

The markup language included in the program data includes a document containing letters, numerals, symbols, and the like that can be displayed on the user terminal 101 and read directly by the user. The document may also contain information necessary for displaying on the user terminal 101, such as the Document Object Model (DOM) and Node objects forming the tree structure of the DOM.

Node objects include markup, that is, symbols for identifying paragraphs, headings, bullet points, and the like.

By tracking which markup is specified in the programming language, style sheet, script language, and the like among the markup included in the markup language, the control unit 1512 of the data acquisition and processing unit D can automatically detect which portions of the document included in the markup language are controlled by the code portions written in the HTML file, the CSS file, the script language file, and the like, for example.

For example, data other than document data from the markup language, or in other words, each of a plurality of code portions of an HTML file written directly in the HTML file 113 containing a markup language, a plurality of code portions of a style sheet written directly in the HTML file 113 that is one type of markup language, a plurality of code portions of a script language written directly in the HTML file 113 that is one type of markup language, portions referencing an external style sheet written in the HTML file 113 that is one type of markup language, portions referencing an external script language written in the HTML file 113 that is one type of markup language, portions referencing external binary data written in the HTML file 113 that is one type of markup language, and the like are objects with identification information. Additionally, objects handling the above code portions are used inside the optimized HTML file 113z.

These objects are saved together with the identification information in the processed data storage area 130 (see FIG. 8) of the application execution server 103.

Note that in the disclosure of the present invention, JavaScript® is used as the programming language for handling defined objects. The program for handling objects is not particularly limited insofar as the above objective can be achieved.

Also, the optimized HTML file 113z in which the reference portions have been replaced by program objects is generated. Multiple optimized HTML files 113z are generated in correspondence with each of the plurality of web pages forming the web content 211 included in the original data 200.

The multiple generated optimized HTML files 113z may be generated statically or dynamically.

One or more of the multiple generated optimized HTML files 113z exist in correspondence with a single web page displayed in the browser without reloading.

In addition, one or more exist according to the type of user terminal 101.

In the disclosure of the present invention, the objects used in each of the optimized HTML files 113z are assigned respective identification information and saved in the processed data storage area 130 of the data acquisition and processing unit D. The identification information can be used to specify reference portions such as the code portions and the like to be processed.

Also, binary data to be processed such as image files, audio files, and video files included in the original data 200 can be specified from portions referencing external binary data written in the data as objects defined by a program.

In Embodiment 1 of the present invention, at least one resource in the original data 200 and the plurality of processed data 201 includes at least one of program data and binary data.

Also, the program data includes a program written in one or more types of languages such as a markup language, a programming language, a style sheet, or a script language.

On the other hand, the binary data includes one or more types of files such as image files, audio files, and video files.

From these programs and the like, the portions of a program to be executed and the portions of program not to be executed are respectively specified for each display environment of the user terminals 101.

On the other hand, the display environment of the user terminal 101 is the environment displayable on the display device 1104 of the user terminal 101, and is determined for each user terminal 101 according to factors such as the type of user terminal 101, the type of OS, the type of browser, the size of the display device 1104, and the number of display pixels per unit area.

FIG. 15 is a schematic diagram for explaining a model information file 126 saved in a settings file storage unit 1523 of a storage device 1501 of the data acquisition and processing unit D.

Different types of user terminals 101 exist, including a mobile information terminal such as a smartphone or a feature phone, an information display terminal such as a PDA or a tablet, a wearable communication terminal such as a smartwatch or smart glasses, and a computer such as a PC.

Additionally, even among smartphones, for example, there are differences in the display environment, such as differences in the installed OS, differences in the installed browser, different sizes of display screen, and different numbers of pixels in the display screen.

These differences in the display environment are specified by published model information that is obtainable for each user terminal 101.

The display environment specifications of user terminals 101 are published by organizations such as the manufacturer of each user terminal 101. The display environments for the user terminals 101 are organized on the basis of the published information. A plurality of display environments exist for each user terminal 101.

As illustrated in FIG. 15, identification information for specifying the user terminal 101 and corresponding information such as model information indicating whether a certain user terminal 101 is a mobile information terminal, an information display terminal, or a computer, OS information about the type of OS installed in the user terminal 101, browser information about the browser installed in the user terminal 101, and display environment information indicating the number of pixels in the display screen and the size of the display screen of the user terminal 101 are stored in the model information file 126 of the data acquisition and processing unit D.

Note that although the data is expressed schematically in a table format for convenience in FIG. 15, in actuality, the data is saved in any of various file formats such as JSON, CSV, or TSV, a database format, or the like.

Normally, the user terminals 101 are mass-produced and supplied to the market. For this reason, the display environments of the user terminals 101 are standardized for the most part. The information about display environments stored in the model information file 126 in the settings file storage unit 1523 of the data acquisition and processing unit D is not infinite, and can be organized into the model information file 126 in a finite time.

The model information file 126 may include individual information about all user terminals 101 or group information obtained by grouping the information for user terminals 101 belonging to certain categories. The group information is not limited to being expressed in any particular way insofar as the display environment of any one user terminal 101 can be specified from the group information on the basis of the model information file 126 when the user terminal 101 is selected.

The control unit 1512 of the data acquisition and processing unit D respectively specifies the portions of a program to be executed and the portions of a program not to be executed for each display environment of the user terminals 101 from the data such as the programs and files described above on the basis of the display environments of all user terminals 101 written in the model information file 126.

Specific examples of portions of a program to be executed include, for example, portions of a program that contributes to a portion displayed on the display device 1104 of the user terminal 101.

Specific examples of portions of a program not to be executed include, for example, portions of a program that contributes to a portion not displayed on the display device 1104 of the user terminal 101.

For example, the portions of a program used only for smartphones is not used in user terminals 101 other than smartphones, and therefore the portions of program used only for smartphones corresponds to the portions of a program not to be executed for user terminals 101 other than smartphones.

The portions of a program to be executed and the portions of a program not to be executed are usually different for each user terminal 101.

To specify the portions of a program to be executed and the portions of a program not to be executed for each user terminal 101, for example, a preliminary test is actually performed in advance to determine the respective portions for each user terminal 101 on the basis of the information about all user terminals 101 written in the model information file 126. Also, an embodiment of the present invention adopts a method of determination according to a trained model obtained by learning data acquired through a preliminary test or the like.

Data obtained by a preliminary test or an actual embodiment of the present invention can be used to create a model through machine learning or the like performed by the artificial intelligence unit B. Predictions within a risk tolerance obtained from a created trained model can be handled in the same way as a result from a preliminary test.

Repeating the step of at least one of the preliminary test and the model creation reveals a trend that roughly indicates which portions of the original data 200 are the portions of a program that needs to be executed for each user terminal 101.

A determination of the tolerance regarding which portions of the original data 200 correspond to a program that needs to be executed for a user terminal 101 can be verified for all of the user terminals 101 or for freely extracted user terminals 101 by actually performing a preliminary test or the like in advance.

Note that in the disclosure of the present invention, "in advance" means before the user actually transmits a request to the request processing unit C from the user terminal 101.

In the disclosure of the present invention, a similar environment to the browser environment installed in the user terminal 101, referred to as an emulator such as a headless browser, is installed in the control unit 1512 of the data acquisition and processing unit D, for example. For example, the emulator or the like can be used to perform a preliminary test or create a model through machine learning or the like.

If a portion actually corresponds to a portion of a program to be executed but is incorrectly determined to be the portion of a program not to be executed and is removed, a display problem may occur on the user terminal 101.

It is possible to check in advance whether or not a problem will occur by performing a preliminary test using an emulator such as a headless browser corresponding to the user terminal 101 installed in the data acquisition and processing unit D and checking whether or not an error signal is produced, for example. If the control unit 1512 of the data acquisition and processing unit D detects an error signal, the stage at which the problem occurs when selecting a portion of a program not to be executed can be specified.

The preliminary test or the like is used to ascertain, to a certain degree, which portions of the original data 200 are portions of a program not to be executed. However, in situations where preliminary information does not exist, such as when a program has never been executed before, a preliminary test does not provide clear details about which portions of the original data 200 correspond to a program not to be executed.

Accordingly, for example, starting from a state in which no error is occurring in the browser installed in a single user terminal 101, an operation of removing the portions of a program not to be executed one at a time from the program is repeated. Thereafter, when it is first detected that the browser installed in the user terminal 101 has produced an error signal, the portion of a program not to be executed that was last removed is determined to correspond to the portion of a program that should be executed.

The data obtained from the above preliminary test or the like can be used to create a model through machine learning, and the trained model can also be used to verify situations that produce an error in the browser and specify the portion that causes the error to occur.

As another example, an operation of removing the portions of a program not to be executed from the program one at a time, or for each of multiple combinations of related portions, and saving captured screens of the display content on the user terminal 101 reproduced in an emulator as successive image files is repeated.

By comparing a captured screen based on the original data 200 to the subsequently captured screens, the portion of a program not to be executed that was last removed at the time when the captured screens no longer matched is determined to correspond to the portion of a program that should be executed.

By creating a model of the above operation through machine learning or the like, the portions of a program that cause problems can be detected.

The above operation is used to determine which portions of the original data 200 are actually the portions of a program that need to be executed for a single user terminal 101.

A program for achieving the above operation is saved in the control unit 1512 of the data acquisition and processing unit D. By executing the program saved in the control unit 1512 of the data acquisition and processing unit D, the above operation is performed automatically.

The preliminary test is actually performed in advance by repeating the above operation on the basis of the information about user terminals 101 written in the model information file 126. The creation of a model by a trained model is also performed through the preliminary test. From the results of the preliminary test, model creation, or the like, information about the portions of a program to be executed and the portions of a program not to be executed for each user terminal 101 is specified for all of the user terminals 101. The specified information is saved together with identification information in the settings file storage unit 1523 of the data acquisition and processing unit D, in association with the model information file 126.

Next, a step of determining the execution order of the portions of a program to be executed with priority and the portions of a program to be executed with a delay among the plurality of portions of a program to be executed that are specified for each user terminal 101 will be described.

As one example, a case will be described in which the display of portions of the web content 211 initially displayed on the screen of the user terminal 101, herein referred to as above the fold, is prioritized.

The content included in above the fold is the most important content when a user views a web page included in the web content 211.

The resources forming above the fold are delivered as quickly as possible, while all other resources not forming above the fold are delivered later or removed in some cases.

If data unrelated to the display of above the fold is selected from at least one selected from the group consisting of the application processing unit A and the data acquisition and processing unit D, and is transmitted to the user terminal 101 first, the display of above the fold on the user terminal 101 will be delayed because of the time taken to process the data unrelated to the display of above the fold on the user terminal 101.

To prevent this delay, for example, among the programs included in the HTML file 113, the CSS file 107, the script language file 108, and the like the execution of programs unrelated to the display of above the fold is deferred while the execution of program portions related to above the fold is prioritized. Moreover, the execution timings of the programs are also adjusted.

By changing the execution order and the execution timings of the programs in this way, the display of above the fold can be completed quickly, and user bounce from the web site can be reduced.

Note that the way in which the display of above the fold is achieved will be described in further detail in Embodiment 5 according to the present invention.

Next, the step of generating the processed data 210 will be described specifically.

The step of generating the processed data 210 is performed for each resource included in the original data, namely, one or more types of program data such as a markup language, a programming language, a style sheet, and a script language, and one or more types of binary data such as image files, audio files, and video files included in the original data.

As described above, the portions of a program included in the program data written in one or more types of languages such as a markup language, a programming language, a style sheet, and a script language included in the original data form respective objects of a program with identification information in the optimized HTML files 113z.

Similarly, reference portions related to one or more types of files such as image files, audio files, and video files included in the original data referenced by the portions of a program also form program objects with identification information in the optimized HTML file 113z.

Figure 16:
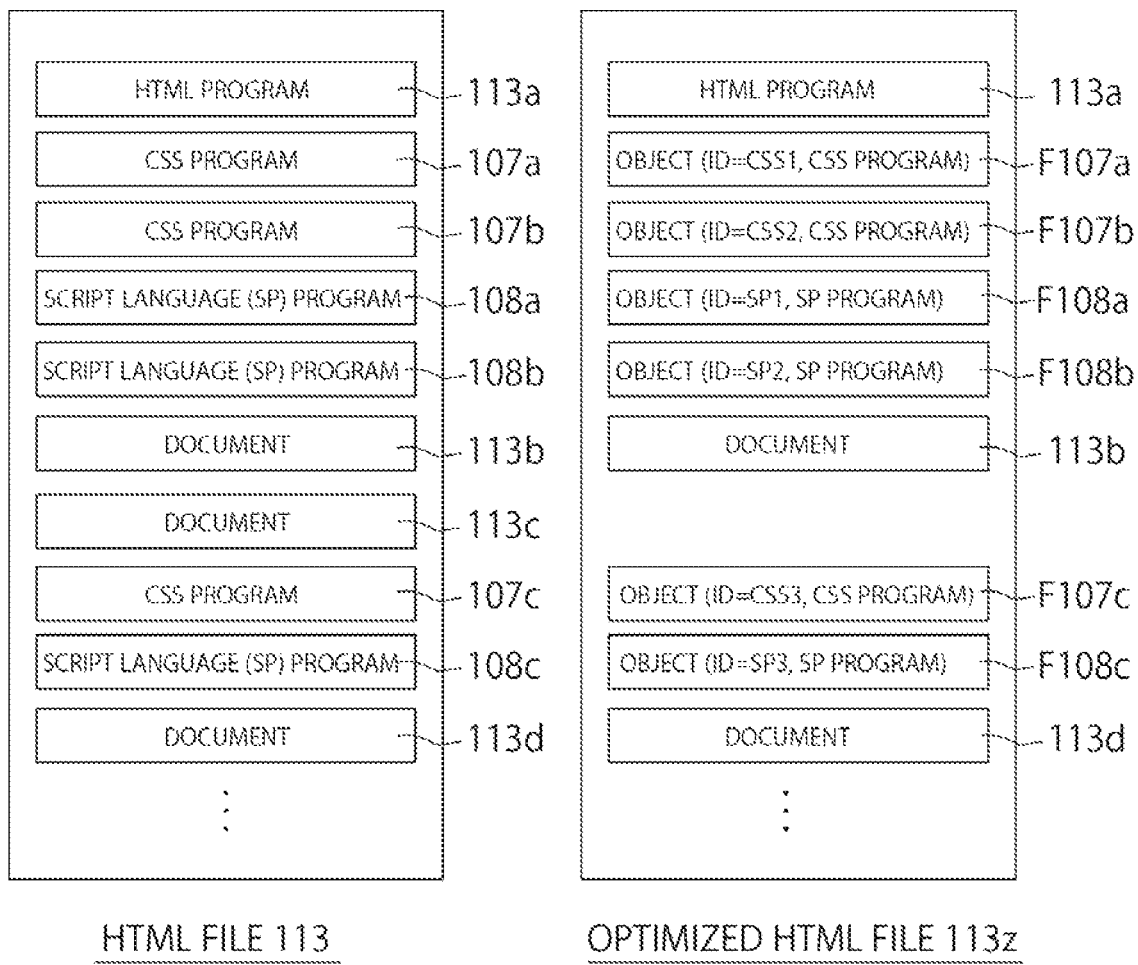
FIG. 16 is a conceptual diagram for explaining a correspondence relationship between an unprocessed HTML file and an optimized HTML file.

FIG. 16 is a conceptual diagram for explaining a correspondence relationship between an unprocessed HTML file and an optimized HTML file.

In FIG. 13 above, the reference portions such as program data and binary data written in the unprocessed HTML file 113 are described as being replaced with objects used in functions of the program.

FIG. 16 is used to explain specifically how the reference portions such as program data and binary data written in the unprocessed HTML file 113 are reflected in the optimized HTML file 113z.

In the disclosure of the present invention, by processing each of the resources included in the original data 200, a plurality of processed data 201 containing a plurality of processed resources is generated for each display environment of the user terminal 101.

In other words, a plurality of processed data 201 is generated for a single user terminal 101. The processed data 201 is generated by specifying identification information to call the respective portions of a program from among the objects defined by the program, and making alterations such as addition, relocation, removal, or modification of the called portions of the program.

As illustrated in FIG. 16, the HTML file 113 included in the original data 200 includes, for example, HTML code portions 113a, 113b, 113c, CSS code portions 107a, 107b, 107c, script language code portions 108a, 108b, 108c, and the like.

The CSS code portions 107a, 107b, 107c are respectively defined together with identification information as objects F107a, F107b, F107c and the like.

Similarly, the script language code portions 108a, 108b, 108c are respectively defined together with identification information as objects F108a, F108b, F108c and the like.

The step of generating the processed data 210 includes one or more steps such as a step of removing unnecessary portions from the program data, a step of compressing necessary portions, a step of changing the execution order, a step of changing the execution timing, or a step of shortening overlapping execution time, and also includes one or more steps such as a step of converting one or more properties of the binary data, such as the number of display pixels per unit area, the image or sound recording density per unit time, the data size, or the save format.

[Step of Removing Unnecessary Portions for Each User Terminal Display Environment]

Figure 17:
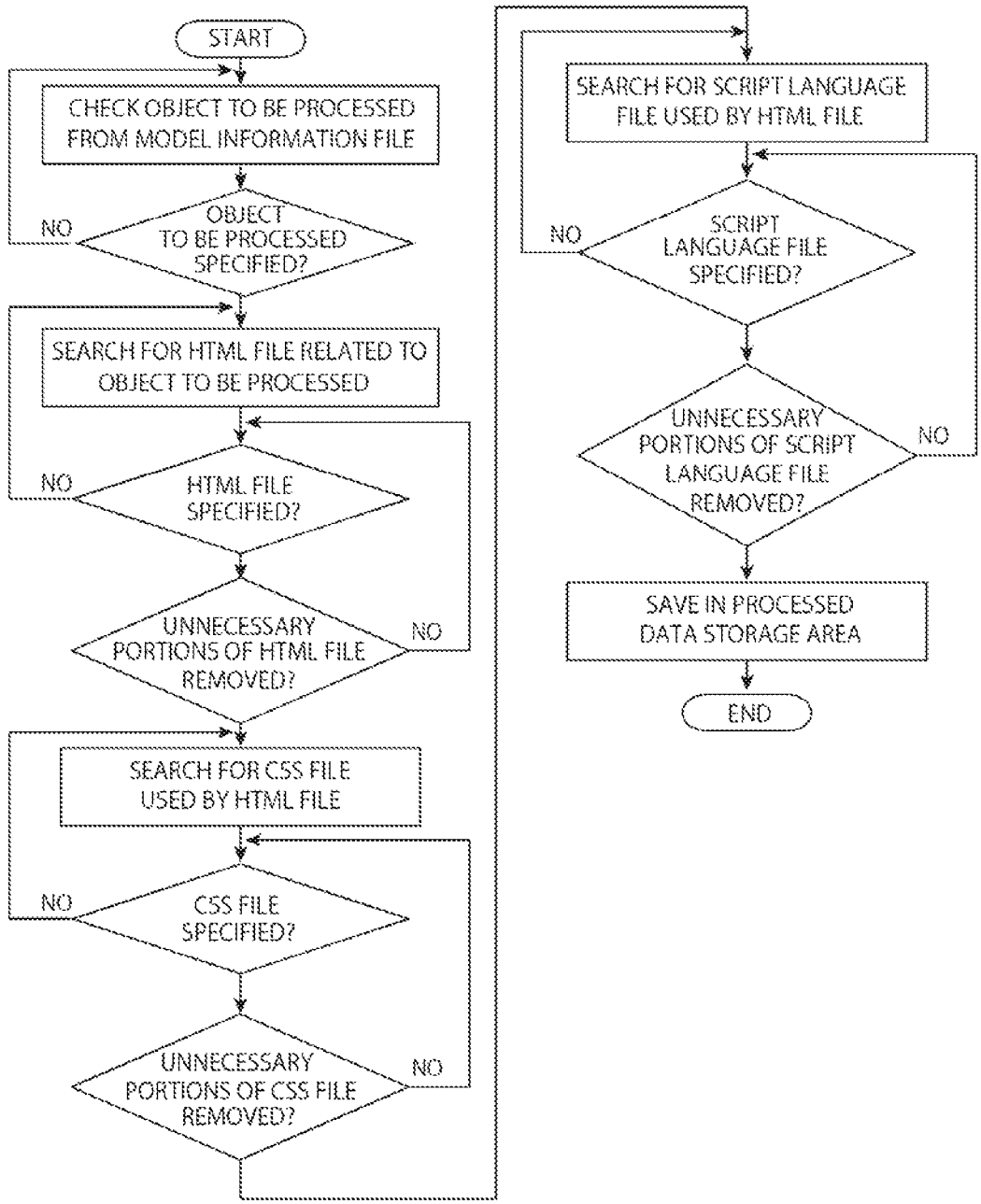
FIG. 17 is a flowchart for explaining a step in which unnecessary portions are removed for each user terminal display environment.

FIG. 17 is a flowchart for explaining a step in which unnecessary portions are removed for each user terminal display environment.

Note that in the case where a corresponding process is not executed successfully even after a certain number of attempts, the step is ended and the process in the next step is executed. The same applies to the steps hereinafter.

For each user terminal 101 specified on the basis of identification information in the model information file 126, the HTML file 113 to be used by the user terminal 101 and data such as the CSS file 107 and the script language file 108 referenced during the execution of the HTML file 113 are specified, for example. The above files are specified by designating the identification information for the objects illustrated in FIG. 15.

Additionally, for example, a portion 113x of the HTML file 113 not used by the user terminal 101, a portion 107x of the CSS file 107 not used by the user terminal 101, and a portion 108x of the script language file 108 not used by the user terminal 101 are specified from within the HTML file 113, the CSS file 107, and the script language file 108, respectively.

From these files, the portions 113x, 107x, and 108x not used by the user terminal 101 are removed.

For example, actual removal can be performed easily by not specifying anything as an object.

Specifically, for example, in the case where the user terminal 101 specified on the basis of identification information in the model information file 126 is a PC, the information of the portions corresponding to a mobile information terminal, an information display terminal, or the like that is not a PC included in any of the HTML file 113, the CSS file 107, the script language file 108, and the like is removed.

Conversely, for example, in the case where the user terminal 101 specified on the basis of identification information in the model information file 126 is a smartphone, the information of the portions not used for a smartphone from among the information included in any of the HTML file 113, the CSS file 107, and the script language file 108 is removed.

The HTML file 113 includes markup, that is, symbols for identifying paragraphs, headings, bullet points, and the like, for example.

By tracking which markup is specified among the markup included in the HTML file 113 and following the markup specified by the CSS file 107, the script language file 108, and the like, the respective portions of the HTML file 113 that are controlled by the CSS file 107, the script language file 108, and the like are ascertained.

The removal of unnecessary portions of the processed data is achieved by the control unit D300 of the data acquisition and processing unit D on the basis of the display environments of all user terminals 101 listed in the model information file 126 by causing the control unit D300 of the data acquisition and processing unit D to check which portions of the HTML file 113 are controlled by the CSS file 107, the script language file 108, and the like.

Next, the user does not view each of the HTML file 113, the CSS file 107, and the script language file 108 directly.

The user views the web content 211 generated by the HTML file 113 and the like through the browser of the user terminal 101.

On the other hand, the HTML file 113, the CSS file 107, the script language file 108, and the like each include display information tailored to be human-readable when the contents of these files are displayed in a CLI or the like, for example. The display information is information necessary for the administrator of the application execution server 103 or the like, but is not reflected in the web content 211, and therefore is unnecessary information to the user who uses the user terminal 101.

For example, some of the display information included in the HTML file 113, the CSS file 107, the script language file 108, and the like may be removed without affecting the display of the web content 211. Such display information is removed.

Examples of the display information to be removed include spaces, tabs, and line break information indicating line breaks or paragraph delimiters that do not affect the display of the web content 211, and text information such as warnings for maintenance and management written in each file.

The removal of unnecessary portions of the processed data is achieved on the basis of the display environments of all user terminals 101 listed in the model information file 126 by causing the control unit D300 of the data acquisition and processing unit D to analyze the display information included in the HTML file 113, the CSS file 107, the script language file 108, and the like.

Note that program objects are actually specified together with identification information inside the optimized HTML file 113z. Removal is achieved by specifying nothing (null) in the objects of the portions to be removed and executing the optimized HTML file 113z in the browser of the user terminal 101.

[Step of Compressing Necessary Portions for Each User Terminal Display Environment]

Figure 18:
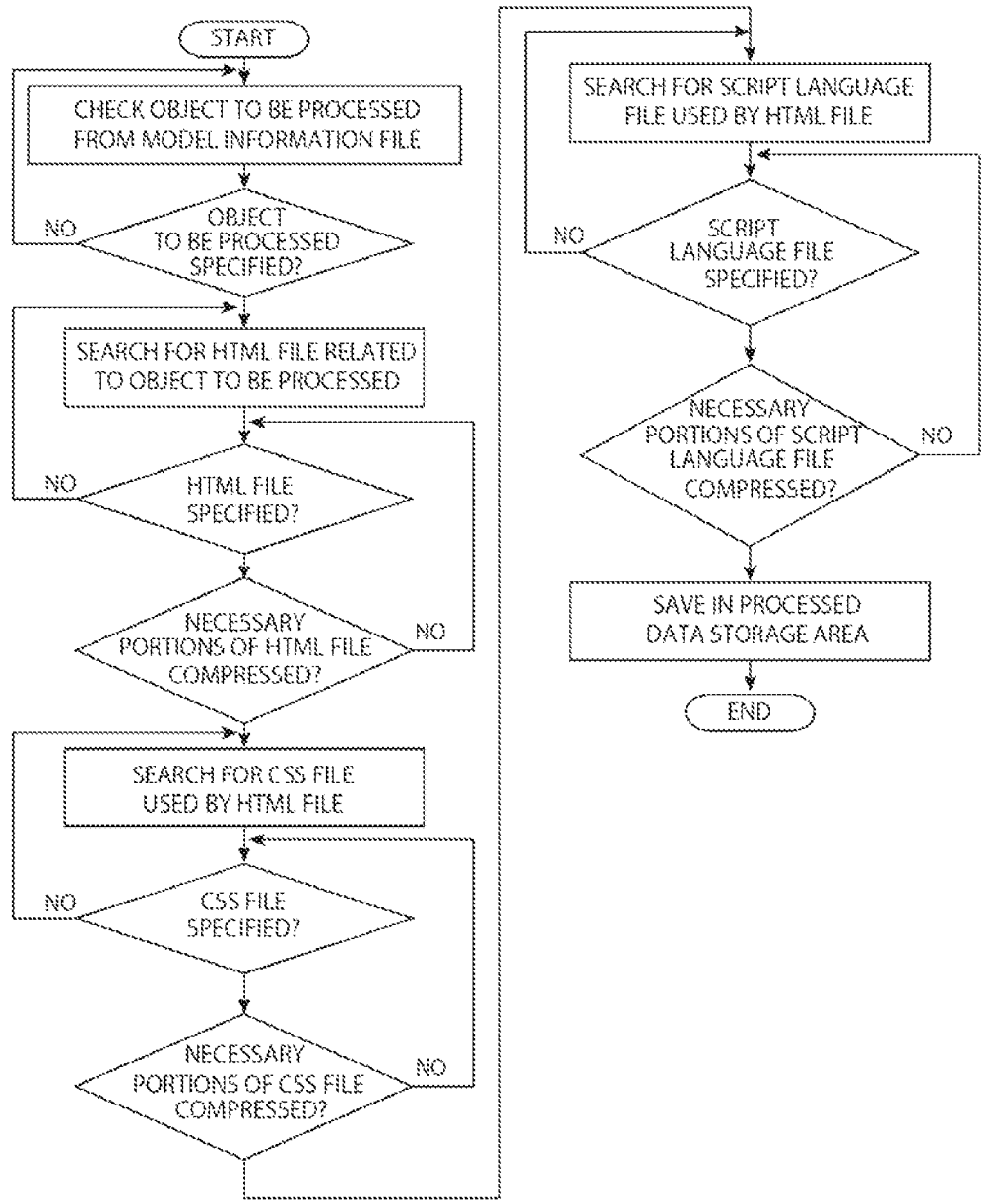
FIG. 18 is a flowchart for explaining a step in which necessary portions are compressed for each user terminal display environment.

FIG. 18 is a flowchart for explaining a step in which necessary portions are compressed for each user terminal display environment.

In general, there are multiple methods of expressing the same piece of information. For example, the notation "1,000,000" meaning the number one million can be denoted as "10E6", meaning ten to the sixth power. The former needs nine characters including the commas indicating digit grouping, whereas the latter can be expressed in four characters including the letter character.

The operation of converting the same piece of information into a different form of representation that can be processed more quickly by each unit such as the application processing unit A installed in the application execution server 103, the user terminal 101, and the like, is referred to as compression in the disclosure of the present invention.

Such a compression operation can be performed using one or more existing types of lossless compression technology such as LHA, ZIP, GZIP, or BROTLI, for example.

For example, the compression of necessary portions is achieved by the control unit 1512 of the data acquisition and processing unit D for one or more of program data such as the HTML file 113, the CSS file 107, the script language file 108, and the like or the processed data thereof.

Note that in the step of compressing the necessary portions, one or more types of compression formats can be used. Also, in the step of compressing the necessary portions, all of the necessary portions may be compressed or some of the necessary portions may be compressed. The same applies to the compression of binary data such as the image file 109.

[Step of Changing Execution Order]

Among the web content 211, the portions of a program related to the portions of the web content 211 initially displayed on the screen of the user terminal 101, referred to as above the fold, are executed first, for example. Next, among the web content 211, the portions of a program related to portions of the web content 211 other than the portions initially displayed on the screen of the user terminal 101, referred to as the, are executed later.

As described above, with regard to the execution order, the display of portions of the web content 211 initially displayed on the screen of the user terminal 101, also referred to as above the fold, is prioritized.

The program portions containing the one or more types of program data such as a markup language, a programming language, a style sheet, and a script language included in the original data are ordinarily performed respectively on the user terminal 101 side in the order in which the portions are written.

However, in the case where the portion of a program that should be executed first contains a reference to a portion of a program executed later, the portion of the program that should be executed first stands by until the execution of the portion of the program executed later is completed in the user terminal 101.

This standby time is usually short enough to be negligible for the program portions individually, and therefore is easily overlooked.

However, as the original data 200 increases in scale, the impact of the standby time tends to increase. If the impact of the standby time is ignored, the standby time may become one factor that induces user bounce from a web site. For this reason, the execution order is changed and processed so that unwanted standby time does not occur.

Specifically, in the case where the portion of a program references the portion of a program to be executed later before the portion of a program to be executed first, the portion of the program to be executed later is moved up and executed early.

Also, in some cases, the portion of a program references an element that cannot be executed, such as in the case of referencing a code portion or the like that existed in the past but does not currently exist, or in the case of referencing a variable that does not currently exist, for example. In such cases, the problematic code portion is skipped without being executed, for example, and later code portions are performed first.

For programs other than the portions of a program related to above the fold, the execution order is changed and execution is deferred.

Among the programs whose execution is deferred, factors such as whether to execute the programs synchronously, to execute the programs asynchronously, or to prioritize execution are controlled according to a program written in the control unit d300 installed in the data acquisition and processing unit D.

[Step of Changing Execution Timing]

With regard to the execution timing, for example, after the completion of executing the portions of a program related to the display of the portions of the web content 211 initially displayed on the screen of the user terminal 101, referred to as above the fold, the execution of programs related to the display of the portions of the web content 211 other than above the fold is started.

The execution timing is adjusted for actions such as forming the DOM, downloading content associated with the DOM tree structure to the user terminal 101, and downloading major resources such as image files, audio files, and video files.

For the portions of programs that affect each other, the execution timings of the portions of programs are adjusted synchronously such that the when the execution of the portion of one program ends, the execution of the portion of the next program begins.

Also, for the portions of programs that do not affect each other, the respective execution timings of the program portions are adjusted asynchronously. [Step of shortening overlapping execution time]

On the other hand, for example, the execution times of the programs whose program data is written in each of the HTML file 113, the CSS file 107, the script language file 108, and the like are also adjusted.

Figure 19:
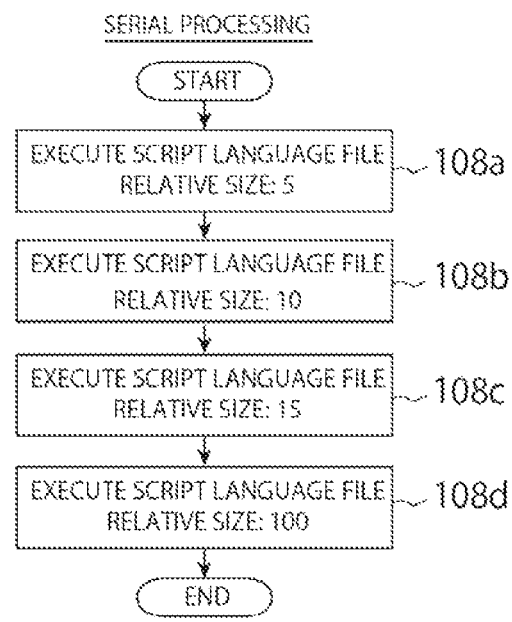
FIG. 19 is a diagram for explaining a step in which script language file portions 108*a* to 108*d* written in an HTML file 113 are executed serially.

FIG. 19 is a diagram for explaining a step in which script language file portions 108a to 108d referenced in the HTML file 113 are executed serially.

Reference information for the plurality of script language file portions 108a to 108d is written in the HTML file 113.

For example, when the HTML file 113 is executed by the user terminal 101, each of the script language file portions 108a to 108d is normally executed serially in the above order.

At this point, suppose for example that the display completion time of the script language file 108d has a relative value of 100, while the display completion times of the script language file portions 108a to 108c have relative values of 5, 10, and 15, respectively.

If the script language file portions 108a to 108d are executed in the above order, the process until the display on the user terminal 101 is completed demands a display completion time corresponding to 5+10+15+100=130 based on the relative values of the display completion times.

Figure 20:
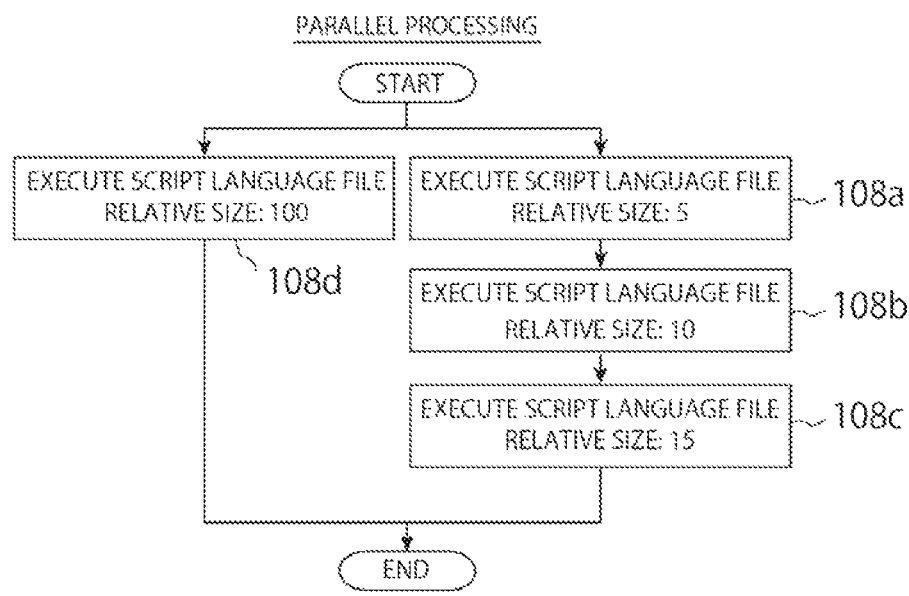
FIG. 20 is a diagram for explaining a step in which the script language file portions 108*a* to 108*c* are executed in parallel with the script language file 108*d* written in the HTML file 113.

FIG. 20 is a diagram for explaining a step in which the script language file portions 108a to 108c are executed in parallel with the script language file 108d written in the HTML file 113.

In this case, by reorganizing the execution order of the script language file 108, the time to generate the web content 211 can be shortened.

In the case of FIG. 20, for example, the HTML file 113 is processed such that the script language file portions 108a to 108c are processed at the same time in parallel with the execution of the script language file 108d.

Through this processing, while the process corresponding to a relative value of 100 for the display completion time of the script language file 108d is being executed, the processes with a display completion time corresponding to 5+10+15=30 based on the relative values of the display completion times can be completed.

With this arrangement, the display completion time of the script language file portions 108a to 108d can be reduced from 130 to 100 based on the relative values.

Figure 21:
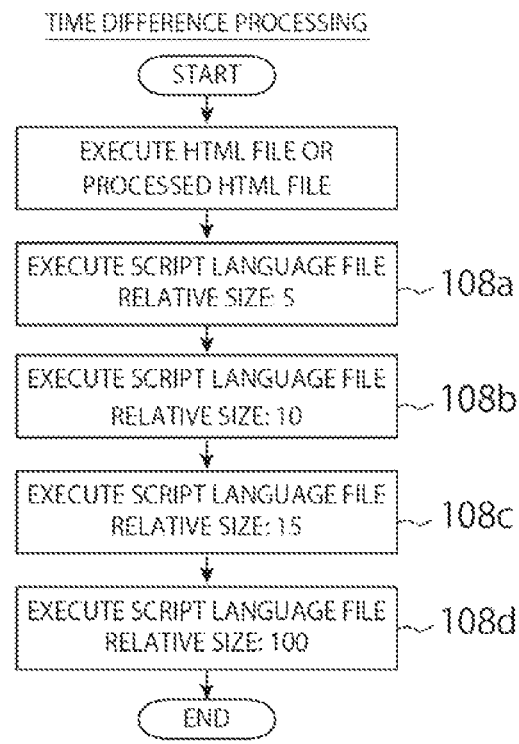
FIG. 21 is a diagram for explaining a step in which the execution of the script language file 108*d* written in the HTML file 113 is deferred.

FIG. 21 is a diagram for explaining a step in which the execution of the script language file 108d written in the HTML file 113 is deferred.

The HTML file 113 may also be processed such that information referencing only the script language file portions 108a to 108c is written in the HTML file 113 first, and the script language file 108d is referenced at the end of the HTML file 113.

By processing the HTML file 113 in this way, the execution of the other script language files 108a to 108c can be started without waiting for the processing of the script language file 108d having a relatively long execution time.

The question of which files should be processed in which order to achieve optimization can be determined by actually changing the order to measure and compare the display completion time of the web content 211 for each of the user terminals 101.

The step of generating the optimized HTML files 113z, processed CSS files 132, and processed script language files 133 is performed for all user terminals 101 listed in the model information file 126.

By tracking how and in what order the HTML file 113 processes the plurality of script language file portions 108a to 108c and the like, the generation of new processed data 210 is achieved by the control unit d300 of the data acquisition and processing unit D on the basis of the display environments of all user terminals 101 corresponding to the content written in the model information file 126.

Through the above step, data containing at least one selected from the group consisting of a markup language, a style sheet, and a script language included in the original data 200 can be processed.

[Step of Reducing Size of Binary Data by Converting One Selected from the Group Consisting of the Number of Display Pixels Per Unit Area, the Image or Sound Recording Density Per Unit Time, the Data Size, and the Save Format]

Next, for example, all of the image files 109 and the like referenced by the HTML file 113, the CSS file 107, and the script language file 108 are used to generate processed image files 134 having different display sizes, file sizes, and types for each user terminal 101 specified on the basis of identification information in the model information file 126.

The display size of an image file 109 is changed by generating a plurality of processed image files 134 having different heights and widths, without changing the aspect ratio of the width with respect to the height, for example.

The size of an image file 109 is changed by changing properties of the image file 109 such as the number of pixels per unit area or the image or sound recording density per unit time, for example.

The type of the image file 109 is changed by converting from a type such as PNG to a type such as JPEG, WEBP, or JPEG2000, for example.

The step of generating the processed image files 134 is performed for all user terminals 101 listed in the model information file 126.

Through the above step, processed data 210 including a plurality of new, converted binary data is generated.

In the case where the binary data is a video file, a sound file, or the like, processed data 210 including a plurality of new, converted binary data can be generated according to a similar procedure.

Figure 22:
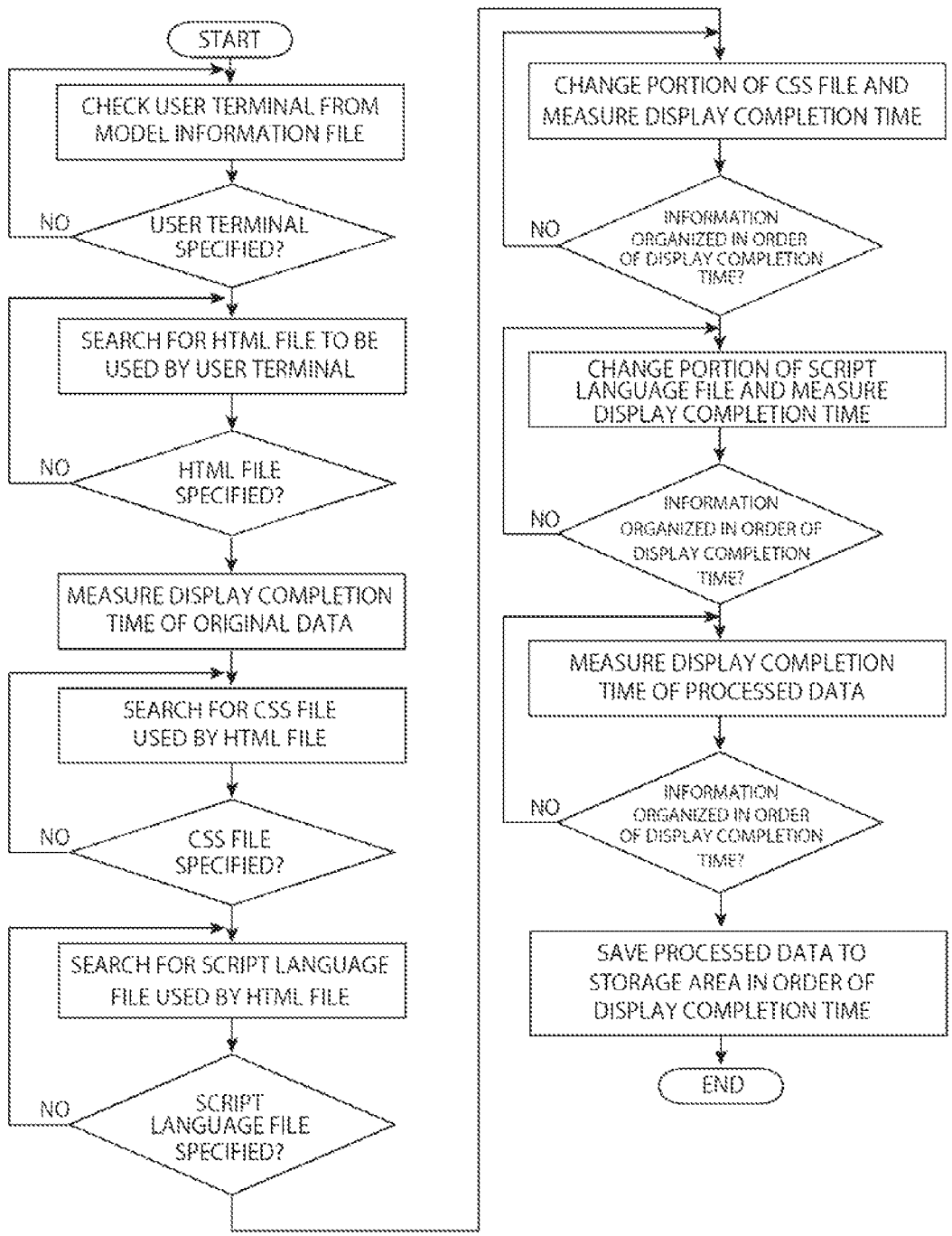
FIG. 22 is a flowchart for explaining a step in which processed data is generated.

FIG. 22 is a flowchart for explaining a step in which processed data is generated.

For example, in addition to measuring the display completion time of the original data, the display completion time is measured for each of the optimized HTML files 113z, the processed CSS files 132, the processed script language files 133, and the like.

For the plurality of optimized HTML files 113z of each web page or the like, if a referencing program object is changed, how long the display completion time takes for each user terminal 101 is measured in comparison to the unprocessed HTML file 113.

For the processed CSS files 132, how long the display completion time takes as an element is measured in comparison to the unprocessed CSS file 107.

For the plurality of processed script language files 133, how long the display completion time takes as an element is measured in comparison to the unprocessed script language file 108.

Likewise, for the binary data, how long the display completion time takes for an element is measured as a comparison between the plurality of processed image files or the like and the unprocessed image file or the like.

The above measurements are performed for each display environment of the user terminals 101 according to the information in the model information file 126 at a time at least one of before the application processing unit A receives a request from a user terminal 101 and immediately after the application processing unit A receives the request from the user terminal 101.

Note that although FIG. 22 illustrates an example of serial processing, the processes may also be performed in parallel.

According to the above step, the original data 200 and the plurality of processed data 201 are prepared for each of the user terminals 101.

Note that it is not necessarily the case that selecting the respective elements with the shortest display completion times included in the original data 200 and the plurality of processed data 201 will yield the shortest display completion time overall from among the original data 200 and the plurality of processed data 201.

This is because respective elements influence each other depending on the combination of elements, and the display completion time varies for each of the original data 200 and the plurality of processed data 201.

In the case where it is unclear which combination of the original data 200 and the plurality of processed data 210 will have the shortest display completion time, a determination is made by actually performing a preliminary test in advance for each user terminal 101.

Also, by creating a model through machine learning on the basis of the data from the preliminary test, it is determined which combination of the original data 200 and the plurality of processed data 210 will have the shortest display completion time.

[Updating Original Data 200 Used in Automatic Fast Display Control Method for Web Content]

Figure 23:
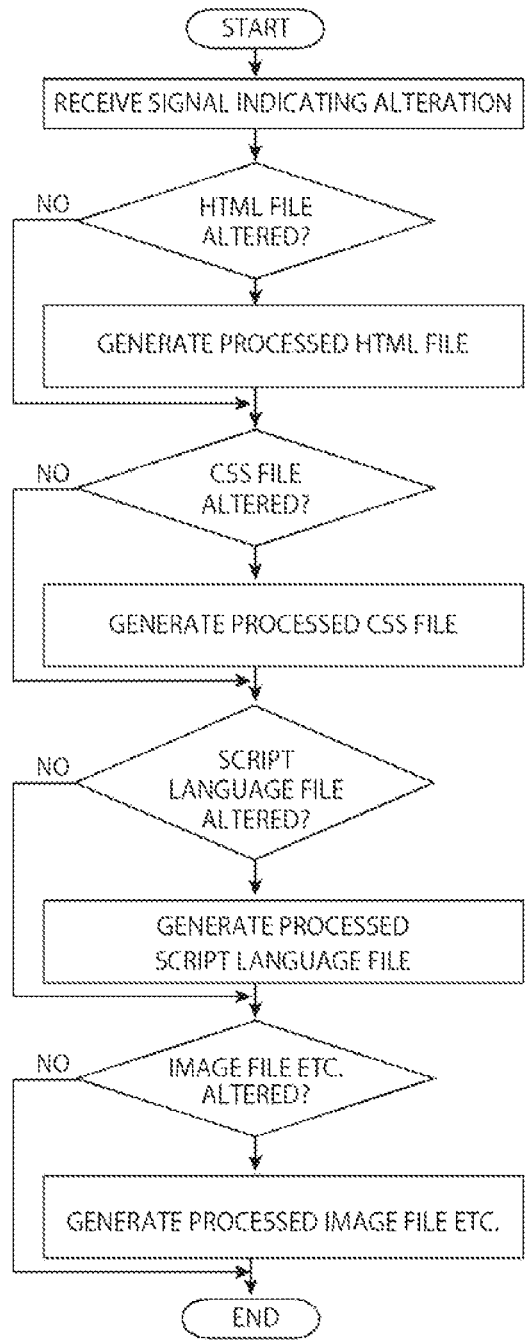
FIG. 23 is a flowchart for explaining a step in which a signal indicating that an alteration such as an addition, relocation, removal, or modification has been made on the original data 200 is transmitted to the operation control unit.

FIG. 23 is a flowchart for explaining a step in which a signal indicating that an alteration such as an addition, relocation, removal, or modification has been made on the original data 200 is transmitted to the operation control unit.

FIG. 23 is also a flowchart for explaining a step in which processed data is newly generated according to the signal indicating alteration of the original data 200.

The original data 200 is monitored, and upon detecting that an alteration such as an addition, relocation, removal, or modification has been made on the original data 200, processed data is newly generated.

The original data 200 used in the automatic fast display control method for the web content 211 that is initially saved in the original data storage area 104 in the storage device 1101 of the application processing unit A may continue to be used.

On the other hand, the user normally wants to obtain the most recent information in addition to old information. To accommodate this user desire, the server administrator normally performs work for updating the original data 200.

To detect that the original data 200 has been altered, it is sufficient to track whether a change has occurred in the original data 200 after a fixed time has elapsed.

The original data 200 is saved in the original data storage area 104 of the application processing unit A. In the case where the original data 200 is altered after a fixed time has elapsed, the altered content is saved in the original data storage area 104.

Additionally, the monitoring control unit 1115 of the application processing unit A respectively monitors the content saved earlier and the content saved later on the basis of a program or the like written in the control unit d300 installed in the data acquisition and processing unit D, for example. By comparing the content saved earlier to the content saved later, it is possible to detect which portions of the original data 200 are different with a program written in the monitoring control unit 1115 or the like illustrated in FIG. 7 and the like, for example.

By setting a short time interval for checking whether or not a difference exists, changes can be detected immediately.

In the case where the original data 200 has been altered, the monitoring control unit 1115 of the application processing unit A specifies the altered portions among the HTML file 113, the CSS file 107, the script language file 108, and the image file 109 included in the original data 200, for example.

Additionally, a signal indicating that an alteration has been made is transmitted from the monitoring control unit 1115 to the operation control unit 1116 and to the control unit d300 of the data acquisition and processing unit D.

The control unit d300 installed in the data acquisition and processing unit D receiving the signal indicating an alteration processes the processed data 201 according to the display environment of the user terminal 101 for the altered portions of the original data 200, and generates new processed data 202.

The data corresponding to the altered portions of the processed data 210 saved in the processed data storage area 114 of the application processing unit A is replaced by the processed data 202 by the control unit d300 installed in the data acquisition and processing unit D.

In the disclosure of the present invention, if information related to the most recent save time, also referred to as a timestamp, with respect to data related to the original data 200 is changed, the corresponding portions of the preexisting processed data 210 or the like may also be replaced by the dynamically generated processed data 202 without actually investigating whether or not the original data 200 or the like has been altered.

When the original data 200 is altered, an operation of replacing the processed data 210 generated earlier with the processed data 202 newly generated in association with the alteration of the original data 200 is performed continually at nearly the same time as the alteration.

A program written in the control unit d300 of the data acquisition and processing unit D runs, and the processed data 202 corresponding to the display environment of the user terminal 101 is extracted, processed, and saved in an operation control storage unit 1517.

Through the above step, the processed data 210 corresponding to the display environment of the user terminal is newly generated from the original data 200 saved in the storage area usable by the application processing unit A, before the application processing unit A receives a request from the user terminal 101.

[Step of Specifying Display Environment of User Terminal]

Next, the step in which the data acquisition and processing unit D specifies the display environment of the user terminal 101 after the request processing unit C receives a request from the user terminal 101 will be described.

When the user terminal 101 is connectible to the request processing unit C over the network 102, a request transmitted from the user terminal 101 is received by the request processing unit C through the network 102. Thereafter, the request is received by each of the units.

The request is issued through the browser installed in the user terminal 101.

The request received by the data acquisition and processing unit D includes information such as a user agent indicating model information about the user terminal 101, the type of browser, the type of OS, and the like, and a referrer indicating which page of a web site displayed in the browser of the user terminal 101 the request was transmitted from.

By using this information such as the user agent and the referrer, the data acquisition and processing unit D can specify the display environment of the user terminal 101 with an accept header, a cookie, or the like.

[Step of Generating Web Content Including Data Displayable in Display Environment of User Terminal]

Next, a step of generating the web content 211 including data displayable in the display environment of the user terminal 101 will be described.

According to the step described above, the web content 211 that can be displayed by each user terminal 101 already has been generated in advance. The web content 211 and the user terminals 101 are associated with each other.

When the request from the browser of the user terminal 101 is transmitted to the request processing unit C over the network 102, the request is transmitted to the application processing unit A and the artificial intelligence unit B. The request is received by a monitoring control unit 1415 of the artificial intelligence unit B.

Additionally, the request is transmitted from the monitoring control unit 1415 of the artificial intelligence unit B to the data acquisition and processing unit D.

The step of selecting the web content 211 including data displayable in the display environment of the user terminal 101 is performed after a request is transmitted from the browser of the user terminal 101 to the request processing unit C.

The control unit 1512 of the data acquisition and processing unit D detects that the request with respect to the data acquisition and processing unit D from the browser of the user terminal 101 has been transmitted to the request processing unit C.

The specification of the individual display environment of the user terminal 101 is achieved by cross-checking information such as an accept header or a cookie with the model information file 126 described above.

When the display environment of the user terminal 101 is specified, the original data 200 displayable using the display environment is specified. Specifically, information such as the HTML file 113, the CSS file 107, the script language file 108, and the image file 109 included in the original data 200 is specified.

Similarly, when the display environment of the user terminal 101 is specified, the processed data 210 displayable using the display environment is specified. Specifically, the optimized HTML files 113z, the processed CSS files 132, the processed script language files 133, the image file 109, and the processed image files 134 are specified.

In actuality, information such as respective code portions and file portions in the form of program objects defined in the optimized HTML files 113z is saved in the processed data storage area 130.

Approximately how long the display completion time takes in the case of using which objects is ascertained in advance with a preliminary test, or by investigation with a trained model or the like created through machine learning or the like using data from a preliminary test or the like.

For this reason, immediately after the request processing unit C receives the request from the user terminal 101, the web content 211 including data displayable in the display environment of the user terminal is selected by the control unit d300 of the data acquisition and processing unit D. At this stage, a plurality of pieces of web content 211 displayable on the user terminal 101 exist.

Additionally, the web content 211 to be displayed on each of the user terminals 101 is respectively determined by the control unit 1512 of the data acquisition and processing unit D on the basis of at least one of the order, by shortest display completion time, of the data to be displayed on the individual user terminals 101 ascertained in advance by the preliminary test, and learned data obtained by machine learning using the above data.

The processed data 201 treated as the program data for displaying the web content 211 on the user terminal 101 is transmitted from the control unit 1512 of the data acquisition and processing unit D to the application processing unit A. Thereafter, the content of the processed data 201 is applied to the optimized HTML file 113z instead of the HTML file 113 reflecting the content of the original data 200 placed in the application processing unit A.

The optimized HTML file 113z is downloaded through the application processing unit A and the request processing unit C over the network 102 to each of the user terminals 101 for all of the user terminals 101 for which the display environment is specified.

The optimized HTML file 113z is executed by the browser or the like of each user terminal 101 receiving the optimized HTML files 113z, and the web content 211 corresponding to each user terminal 101 is displayed in the browser or the like of each user terminal 101.

[Step of Ranking Optimal Resources Based on Display Completion Time]

Next, with regard to the original data 200 and the plurality of processed data 201, a description of how the web content 211 containing the original data 200 and the plurality of processed data 201 is actually selected for each user terminal 101 will be given.

To select which of the original data 200 and the plurality of the processed data 201 to use for displaying the web content 211, the display completion times of the web content 211 are measured and compared in advance through a preliminary test. Thereafter, data about the display completion times is used to perform machine learning and create a trained model.

The step of measuring or the like and comparing the display completion times of the web content 211 according to at least one of a preliminary test and trained model creation is performed by the data acquisition and processing unit D.

Through the step of measuring or the like and comparing the display completion times of the web content 211, information indicating which web content 211 is better with regard to the display completion time for the data of each of the original data 200 and the plurality of processed data 201 with respect to a single user terminal 101 is respectively saved in the original data storage area 104 of the data acquisition and processing unit D and the processed data storage area 130.

The display completion time of the web content 211 largely depends on the program portions included in the original data 200 and the plurality of processed data 201.

Program portions that have been reduced in size ordinarily have shorter display completion times than program portions that have not been reduced in size as much, and therefore are preferable.

However, it is not necessarily the case that all portions of small size have shorter display completion times. Furthermore, for binary data, it is likewise not necessarily the case that data of small size has shorter display completion times.

In some cases, there is also the possibility that the display of the original data 200 will be completed faster than any of the plurality of processed data 201.

Accordingly, in the disclosure of the present invention, the original data 200 and the plurality of processed data 201 is used to perform preliminary tests and the like in advance and measure the display completion times with respect to each user terminal 101, and thereby specify the data in the actual order of the shortest display completion time. In addition, the data can be used to perform machine learning and create a trained model. The trained model can be used to specify the data in the actual order of the shortest display completion time.

The original data 200 includes a plurality of HTML files 113 respectively corresponding to the plurality of web pages forming the web content 211, and also various program data and binary data referenced and/or executed from each of the plurality of HTML files 113.

Also, the processed data 201 includes a plurality of optimized HTML files 113z respectively corresponding to the plurality of web pages forming the web content 211, and also various processed program data and processed binary data referenced and executed from each of the plurality of optimized HTML files 113z.

The original data 200 and the processed data 201 are the respective resources necessary to display the web content 211.

Also, among these resources, the resources necessary to display the user terminal 101 for each user terminal 101 of the user are the optimal resources. A plurality of optimal resources exist for every single user terminal 101.

The processed data is generated for each display environment of the user terminal 101 of the user and for each of the resources necessary to display the web content 211.

Also, in the case where the optimal resources executable in each display environment of the user terminal 101 of the user are selected, there is not necessarily a single form of representation necessary to achieve the optimal resources, even if properties such as the sizes of the various files saved in the optimal resources and the extensions specifying the types of the various files are the same. For this reason, even if a plurality of optimal resources that appear to be the same optimal resources exist among the plurality of optimal resources, differences in the display completion times may occur in some cases when the optimal resources are actually executed.

Except for optimal resources having a display completion time that is clearly shorter than other optimal resources, information related to the display completion times among the optimal resources for a single user terminal 101 is determined by actually performing preliminary tests in advance, for example. The display completion times may also be determined relatively correctly by a method using model creation through machine learning or the like using data related to the display completion times obtained by a preliminary test or the like.

[Backing Up Data]

The storage device 1501 of the data acquisition and processing unit D described above may also be provided with a time execution control unit 1520.

In accordance with an execution program 1522 saved in the time execution storage unit 1521 connected to the time execution control unit 1520, after a certain time elapses, backup data of the data and programs necessary to perform the automatic fast display control method for web content according to Embodiment 1 of the present invention, such as the original data 200 and the processed data 210, 202 of the application processing unit A for example, is copied and saved in the time execution storage unit 1521 of the data acquisition and processing unit D.

Also, after a certain time elapses, the oldest data for which a certain period has elapsed from among the backup data is removed, for example.

The backup data saved in the time execution storage unit 1521 of the data acquisition and processing unit D may also be transferred over the network 102 and saved in an auxiliary storage unit 1105 of the application processing unit A in addition to the data acquisition and processing unit D.

Also, cases where the original data 200 is altered can be handled by monitoring the original data 200 in the application processing unit A described above.

In the disclosure of the present invention, the original data 200 can be monitored by the data acquisition and processing unit D, for example.

For example, if a portion of the original data 200 is altered, the altered portion of the original data 200 is specified, and the processed data 201 corresponding to the altered portion is generated.

The processed data 210 with the shortest display completion time is specified for each user terminal 101 from among information such as the original data 200 and the plurality of processed data 201 according to the preliminary test or the like described above.

Next, the processed data 210 selected from among the original data 200 and the plurality of processed data 201 that is displayable on the user terminal 101 is specified by the control unit d300 installed in the data acquisition and processing unit D.

Thereafter, the processed data 210 is transmitted sequentially from the data acquisition and processing unit D to the application processing unit A, and received by the user terminal 101 over the network 102.

The received processed data 210 is displayed in the browser of the user terminal 101.

Similarly, in the case where all of the original data 200 is altered, the processed data 202 displayable on the user terminal 101 is transmitted by the control unit d300 of the data acquisition and processing unit D from the data acquisition and processing unit D through the application processing unit A and received over the network 102 by the user terminal 101.

The received processed data 202 is displayed in the browser of the user terminal 101.

Also, if the original data 200 is subjected to an alteration such as a modification, addition, or removal, every time the request processing unit C receives a request from the user terminal 101, processed data 202 including updated web content 212 from among the web content 211 is transmitted to the user terminal 101 through the application processing unit A controlled by the control unit 1512 of the data acquisition and processing unit D.

For example, in the case where all of the original data 200 is altered, all of the web content 211 is replaced with the updated web content 212.

At the user terminal 101, the web content 211 including the updated web content 212 can be displayed.

According to the above series of steps, the user terminal 101 receiving the processed data 202 for displaying the web content 212 transmitted from the application processing unit A through the request processing unit C and over the network 102 can display the web content 212 in the browser installed in the user terminal 101 quickly from the first time.

In the disclosure of the present invention, for example, the optimized HTML file 113z is downloaded to each user terminal 101 by the application execution server 103, and the optimized HTML file 113z is executed by the browser or the like of the user terminal 101. Web content based on the optimized HTML file 113z is displayed in the browser or the like of the user terminal 101.

If the user initially transmits a request from the browser or the like of the user terminal 101 to the application execution server 103 over the network 102, the application execution server 103 can transmit the HTML file 113 and the like included in the original data 200 to the user terminal 101 as a response. On the other hand, the application execution server 103 also transmits the optimized HTML file 113z and the like.

The HTML file 113 and the optimized HTML file 113z may be saved and coexist with each other in the user terminal 101, but ordinarily, the optimized HTML file 113z of the HTML file 113 is downloaded to each user terminal 101.

If objects are selected so as to recreate the same content as the HTML file 113 as each of the objects of the programs included in the optimized HTML file 113z, the optimized HTML file 113z can also be used to recreate the HTML file 113 easily.

For example, in the optimized HTML file 113z downloaded to the user terminal 101, all of the resource information such as reference portions related to resources written directly into the optimized HTML file 113z and reference portions related to external resources referenced by the optimized HTML file 113z are converted into a format that can be handled entirely as program objects. Identification information is associated with each of the objects, and which objects are used in which portions of the optimized HTML file 113z can be managed by the database 1106 or the like of the data acquisition and processing unit D, for example.

The browser or the like of the user terminal 101 can receive objects for all of the resources referenced by the optimized HTML file 113z from the data acquisition and processing unit D through the request processing unit C and over the network 102 by following the strategic plan devised by the artificial intelligence unit B, or in other words the strategy file 1412.

By associating these resources with the respective objects in the optimized HTML file 113z, web content can be displayed instantly in the browser or the like of the user terminal 101. Furthermore, the downloading to each user terminal 101 of the resources used for display on the user terminal 101 are performed according to an order and timing based on the strategic plan devised by the artificial intelligence unit B.

[Step of Devising Strategic Plan by Artificial Intelligence Unit B]

Next, the step in which the artificial intelligence unit B devises a strategic plan for displaying web content on the user terminal 101 will be described.

The application processing unit A and the artificial intelligence unit B can communicate with each other through the request processing unit C.

Also, the artificial intelligence unit B and the data acquisition and processing unit D can communicate with each other.

The data acquisition and processing unit D that can communicate with the application processing unit A through the request processing unit C saves the original data 200 saved in the original data storage area 104 of the application processing unit A to the data acquisition and processing unit D, and processes the data. The processed data is saved in a processed data storage area 1540 of the data acquisition and processing unit D.

The original data 200 saved in the original data storage area 104 of the application processing unit A may also be processed while being read out, and the processed results may be saved in the processed data storage area 130 of the application processing unit A.

In actuality, the original data 200 saved in the application processing unit A is updated frequently or generated dynamically. In other words, the original data 200 changes over time.

Every time the original data 200 changes over time, the steps described above are performed, and new processed data 210 is generated.

Through this process, the artificial intelligence unit B learns in relation to respective data such as the relationship with time it takes to display web content on each of the user terminals 101, the possibility that an error will occur that has the effect of impeding the display of web content in the browser of the user terminal 101, and the completeness of the display regarding whether the web content is displayed in the browser of the user terminal 101 as expected.

Attributes shared in common by the above data are analyzed by statistical processing for example to find associations with the length of the display completion times of the web content.

For example, the HTML file 113 included in the original data 200 includes HTML code portions 113*a*, 113*b*, 113*c*, CSS code portions 107*a*, 107*b*, 107*c*, script language code portions 108*a*, 108*b*, 108*c*, and the like.

In Embodiment 1 of the present invention, at least one of the original data 200 and the plurality of processed data 210 includes at least one of program data and binary data.

Also, the program data includes a program written in one or more types of languages such as a markup language, a programming language, a style sheet, or a script language.

On the other hand, the binary data includes one or more types of files such as image files, audio files, and video files.

From this program data, binary data, and the like, the portions of a program to be executed and the portions of program not to be executed are respectively specified for each display environment of the user terminals 101.

For example, the original data 200 includes at least one of program data and binary data,
- the program data includes at least one statement selected from the group consisting of a markup language, a programming language, a style sheet, and a script language, and
- the binary data includes at least one of an image file, an audio file, and a video file.

The artificial intelligence unit B learns information such as:
- information 601 related to the data acquisition and processing unit D performing a step of removing an unnecessary portion for each display environment of the user terminal 101 from data containing at least one statement selected from the group consisting of a markup language, a programming language, a style sheet, and a script language included in the original data 200;
- information 602 related to the data acquisition and processing unit D performing a step of compressing a necessary portion for each user terminal display environment from at least one type of data selected from the group consisting of a markup language, a programming language, a style sheet, and a script language included in the original data 200;
- information 603 related to the data acquisition and processing unit D performing a step of changing an execution order for each user terminal display environment from at least one type of data selected from the group consisting of a markup language, a programming language, a style sheet, and a script language included in the original data 200;
- information 604 related to the data acquisition and processing unit D performing a step of changing an execution timing for each user terminal display environment from at least one type of data selected from the group consisting of a markup language, a programming language, a style sheet, and a script language included in the original data 200;
- information 605 related to the data acquisition and processing unit D performing a step of converting one selected from the group consisting of a number of display pixels per unit area, an image or sound recording density per unit time, a data size, and a save format from the binary data included in the original data 200;
- information 606 related to which data from among the original data 200 and the plurality of processed data is combined to generate the processed data 210;
- information 607 related to the processed data 210 containing at least one selected from the group consisting of the original data 200 and the plurality of processed data, and the time it takes until the processed data 210 is ready to accept input on the user terminal 101; and
- information 608 about each user terminal 101 related to whether data is transmitted to the user terminal 101 from the application processing unit A, the data acquisition and processing unit D, or a cloud delivery server 608.

Through the preliminary test, information is already obtained regarding which data acquisition and processing unit D was responsible for which steps, what kind of processed data 201 was generated as a result, and for the processed data 210 generated by combining the original data 200 and the plurality of processed data 201, how long the display completion time would be until web content based on the processed data 210 is ready to accept input on the user terminal 101 if a hypothetical request were transmitted from the user terminal 101 to the request processing unit C, and information about the user location estimated from the IP address of the user terminal 101.

On the basis of the above information, if a request is transmitted from the user terminal 101 to the request processing unit C over the network 102, the artificial intelligence unit B learns correlations between the time until web content based on the processed data 210 is ready to accept input on the user terminal 101 and steps taken for each, and creates a trained model. When creating the trained model, the artificial intelligence unit B preferably learns by focusing on attributes shared in common among processed data for displaying web content more quickly on each user terminal 101.

If the original data 200 needed for displaying information on a certain user terminal 101 is specified on the basis of the correlations learned by the artificial intelligence unit B, it is possible to predict how the data acquisition and processing unit D should process the markup language, programming language, style sheet, script language, and the like included in the original data 200 to minimize the time it takes until the web content based on the processed data 210 is ready to accept input on the user terminal 101.

Similarly, if the original data 200 needed for displaying information on a certain user terminal 101 is specified on the basis of the correlations learned by the artificial intelligence unit B, it is possible to predict how the data acquisition and processing unit D should process the binary data and the like included in the original data 200 to minimize the time it takes until the web content based on the processed data 210 is ready to accept input on the user terminal 101.

Additionally, on the basis of the correlations learned by the artificial intelligence unit B, it is possible to predict which data from among the original data 200 and the plurality of processed data 201 processed by the data acquisition and processing unit D should be combined to minimize the time it takes until the web content based on the processed data 210 is ready to accept input on the user terminal 101.

Furthermore, on the basis of the correlations learned by the artificial intelligence unit B, it is possible to predict whether the processed data 210 generated by the data acquisition and processing unit should be downloaded to the user terminal 101 and then executed in the browser or the like of each user terminal 101, or whether the processed data 210 generated by the data acquisition and processing unit should be executed on the application execution server 103 side over the network 102 from the browser of each user terminal 101.

Moreover, through a preliminary test using an emulator such as a headless browser capable of reproducing an environment similar to the browser environment installed in the user terminal 101, it is possible to investigate whether a prediction obtained as a result of the artificial intelligence unit B learning the above information is actually correct or not. For example, the emulator may be installed in the control unit 1512 of the data acquisition and processing unit D.

If the result of the preliminary test indicates that the time until the web content based on the processed data 210 is ready to accept input on the user terminal 101 can be shortened as predicted, points are added. Conversely, if the result indicates that the time until the web content based on the processed data 210 is ready to accept input on the user terminal 101 would be delayed, points are subtracted.

Information about the addition or subtraction of points is fed back to the artificial intelligence control unit 1410 of the artificial intelligence unit B. On the basis of the feedback information, the artificial intelligence unit B can apply the result to the strategic plan devised by the artificial intelligence unit B. By repeating this step, the trained model is created.

The method of learning by the artificial intelligence unit B is not particularly limited. A known method related to artificial intelligence may be selected and adopted as appropriate.

Examples of such methods utilizing artificial intelligence include machine learning and deep learning. In the disclosure of the present invention, a neural network, model creation and prediction through reinforcement learning, prediction according to Bayesian estimation, DBSCAN clustering, or the like is used. If necessary, an artificial intelligence algorithm such as KNN, a decision tree, or MT may also be used jointly.

[Specific Example of Generating Processed Data 201 from Original Data 200]

As illustrated in FIG. 16 described above, for example, the HTML file 113 included in the original data 200 includes HTML code portions 113a, 113b, 113c, CSS code portions 107a, 107b, 107c, script language code portions 108a, 108b, 108c, and the like.

According to the strategic plan devised by the artificial intelligence unit B, respective style sheets $F107a_1$, $F107b_1$, and $F107c_1$ are substituted as objects instead of the CSS code portions 107a, 107b, and 107c included in the HTML file 113.

These CSS code portions $F107a_1$, $F107b_1$, $F107c_1$, and the like are saved in the data acquisition and processing unit D, for example.

When a request is initially transmitted from the user terminal 101 to the application execution server 103, the data of these code portions such as the style sheets $F107a_1$, $F107b_1$, and $F107c_1$ is downloaded from the application execution server 103 to the user terminal 101 over the network 102 and saved.

When the optimized HTML file 113z is executed in the browser or the like of the user terminal 101, the content of the CSS code portions $F107a_1$, $F107b_1$, $F107c_1$, and the like is executed.

The CSS code portions $F107a_1$, $F107b_1$, $F107c_1$, and the like may be downloaded to the user terminal 101 and then executed, or code portions saved in the application execution server 103 or the like may be used and executed over the network 102 from the browser or the like installed in the user terminal 101.

The script language code portions are also similar to the case of the CSS code portions.

According to the strategic plan devised by the artificial intelligence unit B, respective script language programs $F108a_1$, $F108b_1$, and $F108c_1$ are substituted as objects instead of the script language code portions 108a, 108b, and 108c included in the HTML file 113.

The script language programs $F108a_1$, $F108b_1$, $F108c_1$, and the like are saved in the data acquisition and processing unit D, for example.

These code portions of the script language programs may be downloaded to the user terminal 101 and then executed, or code portions saved in the application execution server 103 or the like may be used and executed over the network 102 from the browser or the like installed in the user terminal 101.

For the respective style sheets $F107a_1$, $F107b_1$, $F107c_1$, and the like treated as objects included in the optimized HTML file 113z and the respective script language programs $F108a_1$, $F108b_1$, $F108c_1$, and the like treated as objects included in the optimized HTML file 113z, the steps of downloading the objects to the user terminal 101 and then executing the objects or saving the objects in the data acquisition and processing unit D or the like and executing the objects over the network 102 from the browser of the user terminal 101 are performed according to the strategic plan devised by the artificial intelligence unit B.

Embodiment 1 according to the present invention can accommodate cases where there is a change in the HTML file 113 included in the original data 200, and also cases where the HTML file 113 is generated dynamically with content that changes over time.

The relationship between the HTML file 113 and the optimized HTML file 113z in FIG. 16 described above may be understood as a state extracted at a certain instant.

The relationship between the HTML file 113 and the optimized HTML file 113z is associated together with identification information as an object.

When there is a change in the HTML file 113, the content of the current HTML file 113 will be different from the content of the previous HTML file 113. For example, the application processing unit A is provided with a function that, if there is a change in the HTML file 113, outputs the difference of the changed content for which the timestamp has changed. This function can be used to specify, with the identification information, an object in the optimized HTML file 113z that corresponds to the changed portion of the HTML file 113.

Processed data is prepared by the data acquisition and processing unit D and associated with identification information with respect to each changed object. Each object is substituted into the optimized HTML file 113z.

Specifically, which objects are reflected in optimized HTML file 113z and in what way are determined according to the strategic plan devised by the artificial intelligence unit B, similarly to the case described above.

Through the steps described above, the data acquisition and processing unit D can save a history of the processing of the original data 200 saved in the application processing unit A.

A plurality of processed data 201 that is individually displayable by each of all the user terminals 101 anticipated to transmit a request to the application processing unit A is generated, and the processed data 210 for which the web content will be ready to accept input on the user terminal 101 in the shortest time is specified in advance from among the original data 200 and the plurality of processed data 201 according to a preliminary test, trained model, or the like.

From knowledge such as how the original data 200 saved in the application processing unit A was processed by the data acquisition and processing unit D and how the obtained processed data 201 and the like were combined until the processed data 210 was specified, data related to correlations indicating which attributes to focus on in the processed data 210 for which the web content will be ready to accept input on the user terminal 101 in the shortest time is accumulated in a database 1406 of the artificial intelligence unit B.

By analyzing the correlations related to the processing of the original data 200 and the like saved in the application processing unit A, statistical indicators related to the above attributes are obtained.

By causing the attributes to be reflected in the strategic plan devised by the artificial intelligence unit B, even if a situation occurs in which the data acquisition and processing unit D attempts to test all cases and but it is not possible to apply the exact same data as the processed data 210 for which the web content will be ready to accept input on the user terminal 101 in the shortest time, the strategic plan by the artificial intelligence unit B can be used to create new data to handle the situation.

According to the automatic fast display control method for web content of Embodiment 1 of the present invention, by installing the request processing unit C capable of accessing the application processing unit A where the original data 200 for displaying web content on the user terminal 101 is saved, the preparations for carrying out the automatic fast display control method for web content according to Embodiment 1 of the present invention are completed.

Since it is not necessary to make any particular changes to the specifications of the application processing unit A, the automatic fast display control method for web content according to the present invention can be carried out easily.

If there is an actual request from the user terminal 101 to the application processing unit A, the original data 200 is processed by each unit, replaced by the processed data 210, and transmitted to the user terminal 101 in a shorter time than the times it takes until the original data 200 is transmitted to the user terminal 101 over the network 102 in response to each request, web content based on the original data 200 is displayed in the browser or the like of the user terminal 101, and the web content is ready to accept input on the user terminal 101.

Additionally, by the time it takes until the web content based on the original data 200 is displayed on each user terminal 101 and ready to accept input on the user terminal 101, the web content based on the processed data 210 can be displayed on the user terminal 101 and be ready to accept input on the user terminal 101.

In the case of the automatic fast display control method for web content according to Embodiment 1 of the present invention, the application execution server 103 that can receive a request by a user from the user terminal 101 over the network 102 is used, the application execution server 103 being provided with a function of transmitting the original data 200 corresponding to the request to the user terminal 101 over the network 102 as a response, and causing web content based on the original data 200 to be displayed on the user terminal 101.

The application execution server 103 provided with the above function can achieve the functions of the application processing unit A.

The automatic fast display control method for web content according to Embodiment 1 of the present invention can be implemented in a server for displaying web content that is already in operation, for example. In this case, the method can be carried out by performing a migration such as a change of the operating environment of the application execution server 103.

In the case of Embodiment 1 of the present invention, the original data 200 can be optimized and processed data 201 containing optimized resources with a short display completion time can be used to display web content quickly in the browser or the like of each user terminal 101 in a shorter display completion time compared to the case of using the original data 200.

Embodiment 2: Reverse Proxy Type

Figure 24:
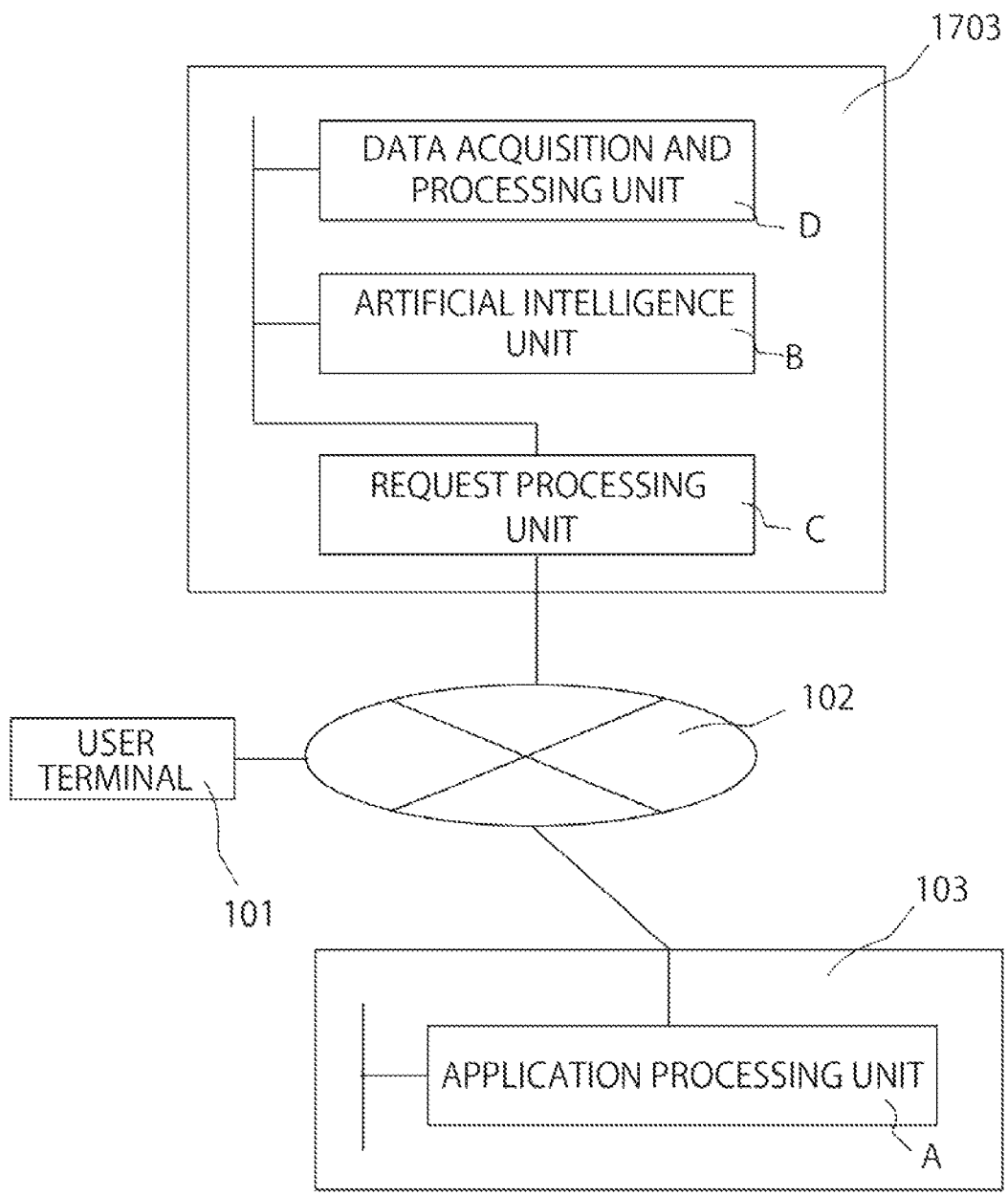
FIG. 24 is a schematic diagram illustrating a configuration of an automatic fast display control system of the reverse proxy type for carrying out an automatic fast display control method for web content according to Embodiment 2 of the present invention.

FIG. 24 is a schematic diagram illustrating a configuration of an automatic fast display control system of the reverse proxy type for carrying out an automatic fast display control method for web content according to Embodiment 2 of the present invention.

Compared to the all-in-one type of Embodiment 1 described above, the reverse proxy type of Embodiment 2 of the present invention is similar to the case of the all-in-one type of Embodiment 1 except that a reverse proxy server 1703 is used in addition to the application execution server 103, and the artificial intelligence unit B, the request processing unit C, and the data acquisition and processing unit D are installed in the reverse proxy server 1703.

The application execution server 103 and the reverse proxy server 1703 can exchange data with each other over the network 102. The application execution server 103 and the reverse proxy server 1703 are provided with the communication interface 1102 and a communication interface 1702, respectively, and can transmit and receive data over the network 102.

Hereinafter, the points that differ from the all-in-one type of Embodiment 1 will be described primarily.

The hardware configuration of the reverse proxy server 1703 is the same as the case of the application execution server 103 used in Embodiment 1.

In the case of Embodiment 2 of the present invention, like the case of the application execution server 103 used in Embodiment 1, at least one execution environment selected from the group consisting of one or more physical machines, one or more virtual machines, and one or more containers may also be adopted for the reverse proxy server 1703.

Figure 25:
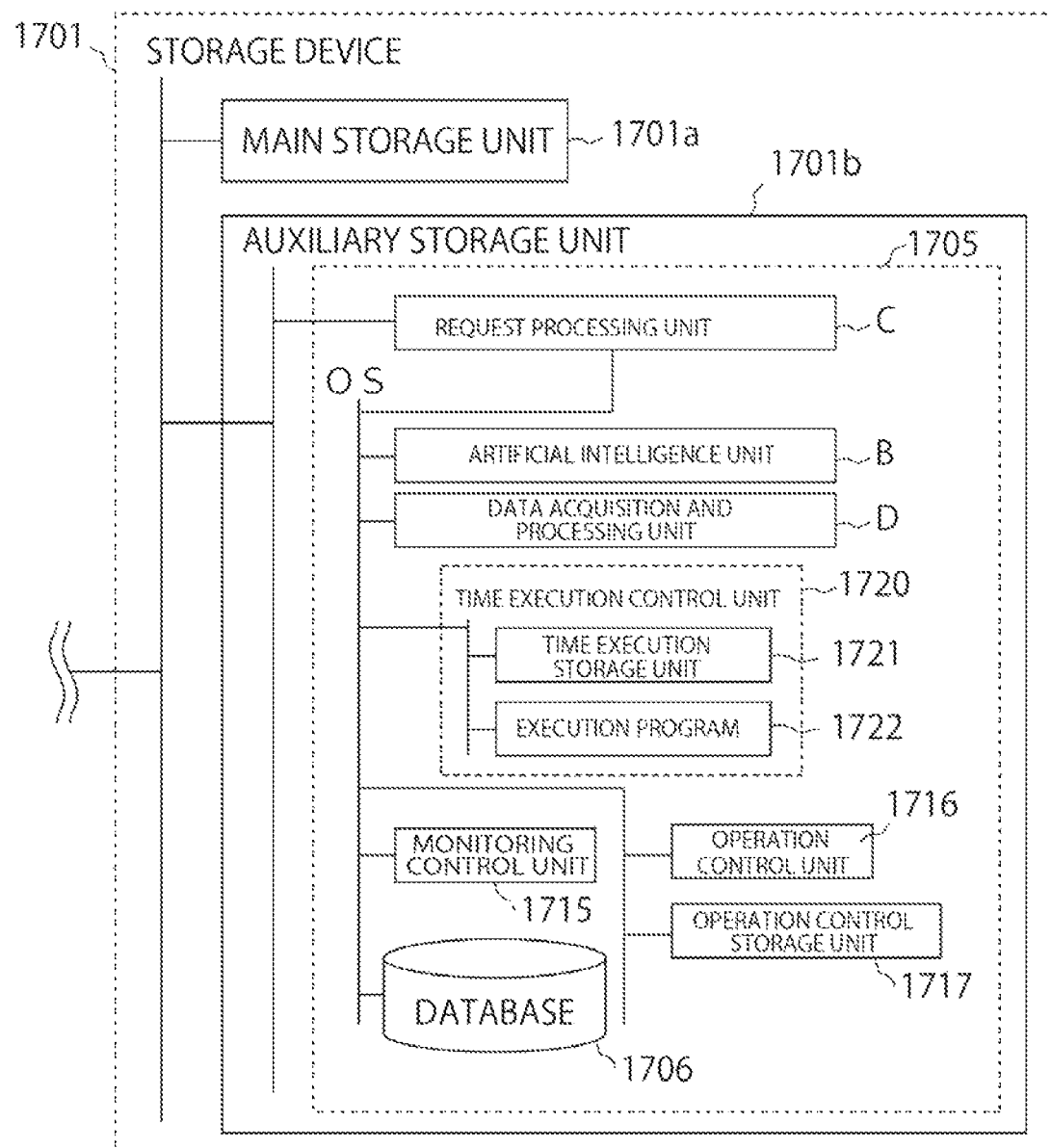
FIG. 25 is a diagram for explaining details of a hardware configuration included in a storage device 1701 of a reverse proxy server 1703 used in the automatic fast display control method for web content according to Embodiment 2 of the present invention.

FIG. 25 is a diagram for explaining details of a hardware configuration included in a storage device 1701 of the reverse proxy server 1703 used in the automatic fast display control method for web content according to Embodiment 2 of the present invention.

An operating system (OS) 1705 is installed in the storage device 1701 and is capable of controlling a central processing unit 1700, the storage areas and programs in the storage device 1701, and the like.

As illustrated in FIG. 25, the artificial intelligence unit B, the request processing unit C, the data acquisition and processing unit D, and a database 1706 are installed in the storage device 1701 of the reverse proxy server 1703.

Also, the application processing unit A, the original data storage area 104, and the database 1106 are provided in the storage device 1101 of the application execution server 103. Original data 200 to be displayed on the user terminal 101 is saved in the original data storage area 104.

Other than the above, the hardware configuration is similar to the case of the all-in-one type of Embodiment 1.

[Flow of Processes by Reverse Proxy Type in Response to Request from User]

Figure 26:
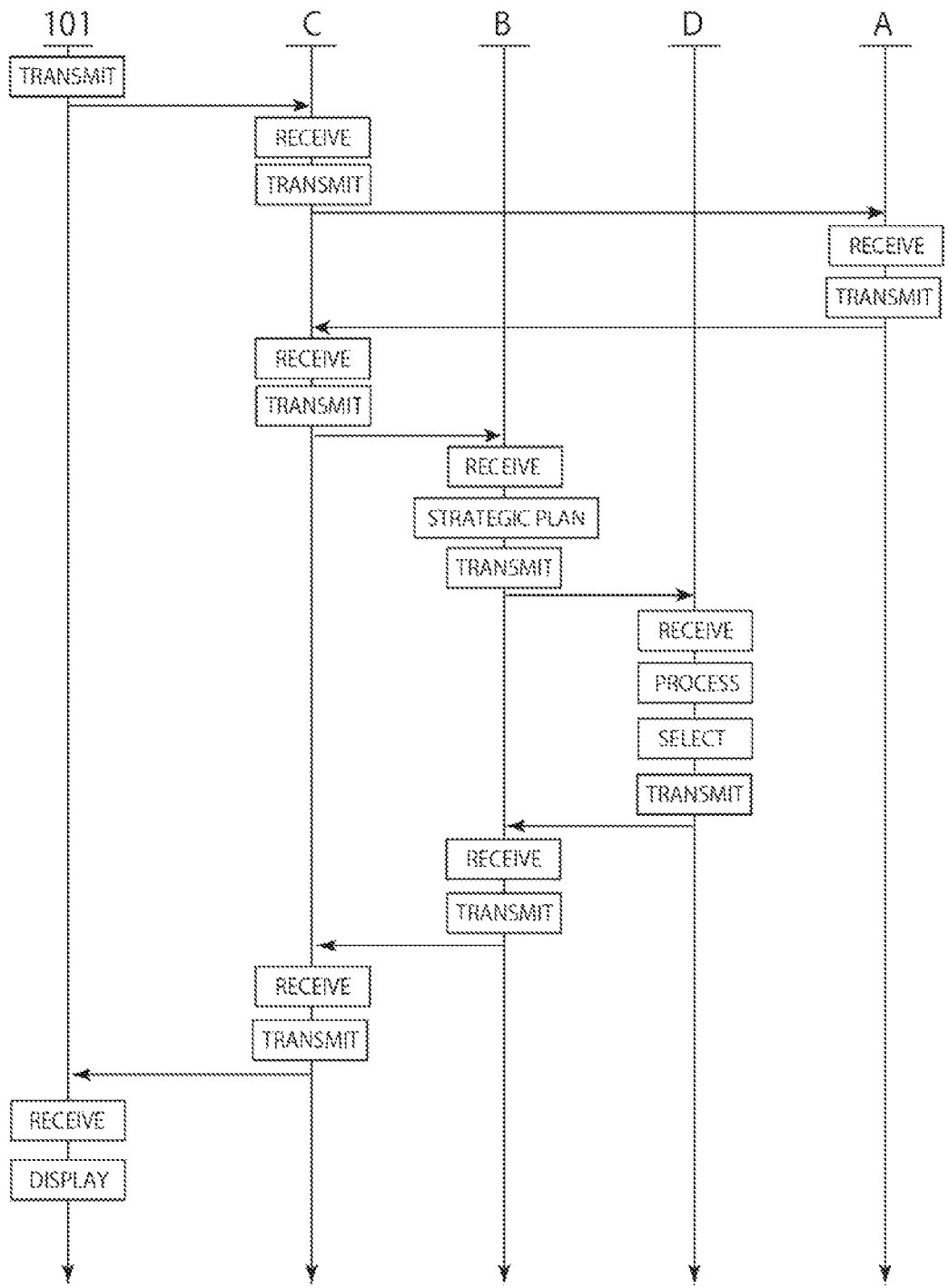
FIG. 26 is a schematic diagram for explaining how a request from a user is processed.
Figure 27:
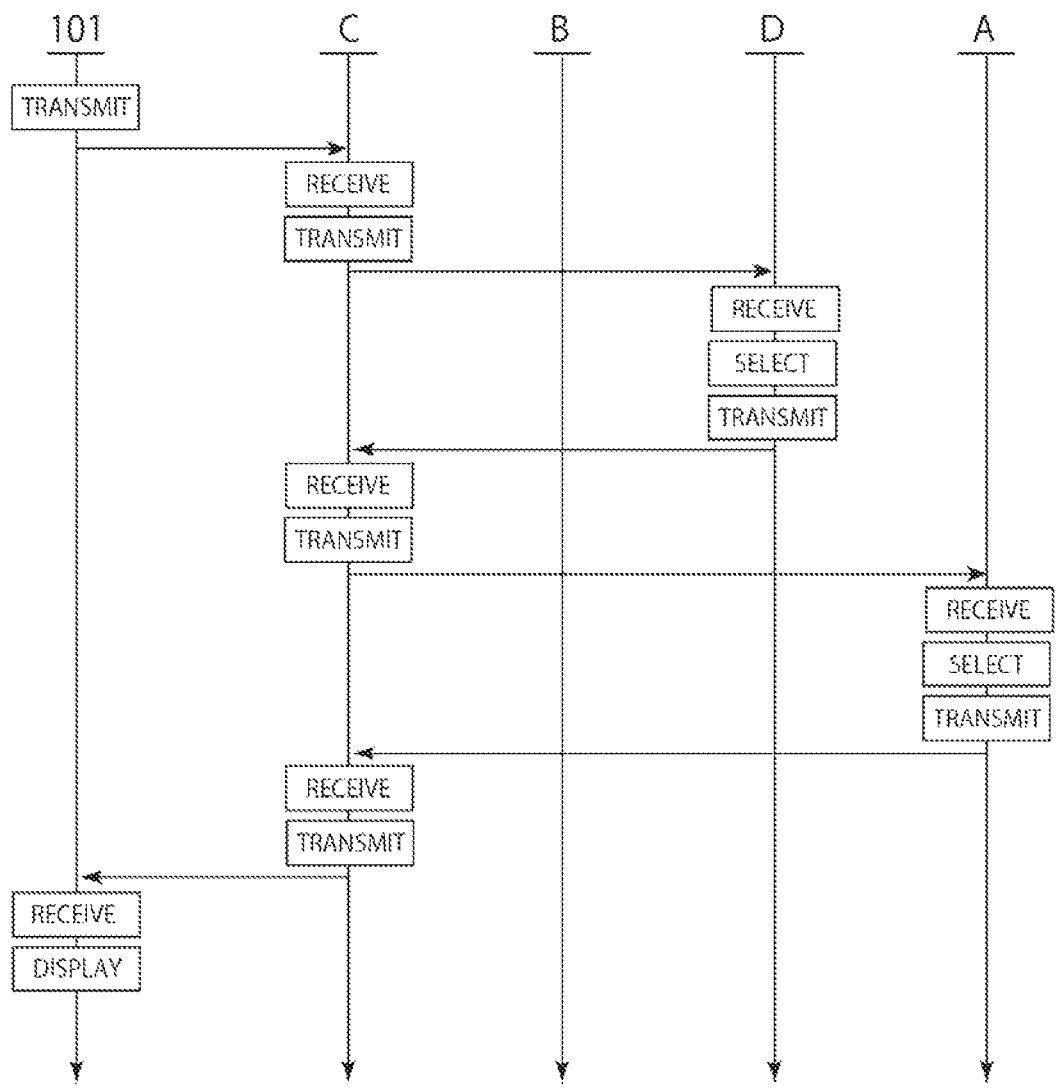
FIG. 27 is a schematic diagram for explaining how a request from a user is processed.
Figure 28:
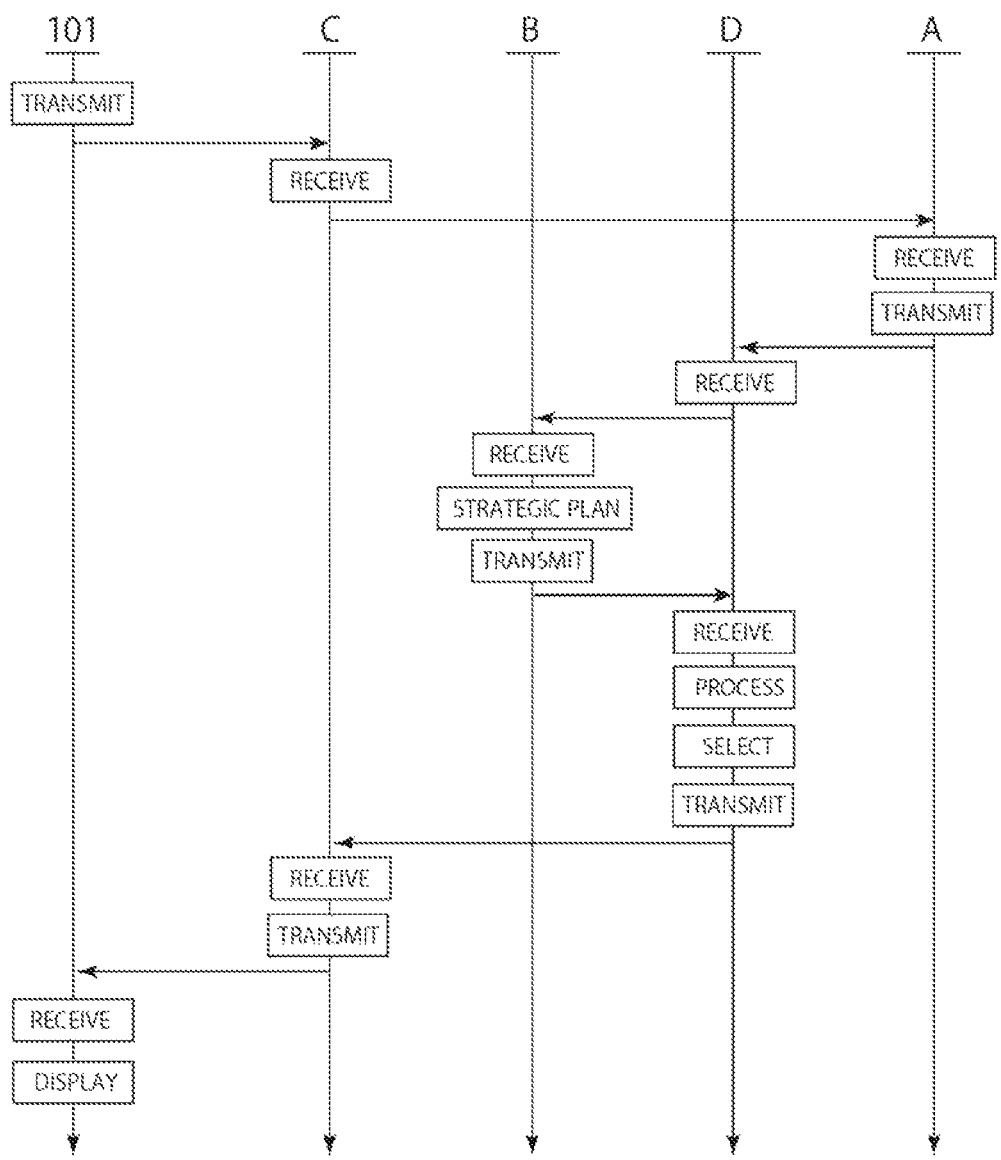
FIG. 28 is a schematic diagram for explaining how a request from a user is processed.

Each of FIGS. 26 to 28 is a schematic diagram for explaining how a request from a user is processed.

A request transmitted from the browser or the like of the user terminal 101 operated by a user is received by the request processing unit C of the reverse proxy server 1703 over the network 102.

The request is transmitted from the request processing unit C to the application processing unit A of the application execution server 103.

The application processing unit A receiving the request transmits the original data 200 such as the HTML file 113 to the request processing unit C as a response, for example. The original data 200 such as the HTML file 113 is successively transmitted through the request processing unit C to the artificial intelligence unit B and the data acquisition and processing unit D.

The data acquisition and processing unit D optimizes the original data 200 such as the HTML file 113 on the basis of a strategic plan devised by the artificial intelligence unit B.

The processed data 201 such as the optimized HTML file 113z is transmitted to the user terminal 101 of the user over the network 102 through the data acquisition and processing unit D and the request processing unit C.

Objects referenced by the HTML file 113z and the like for displaying web content in the browser or the like of the user terminal 101 are written in the processed data 201 such as the optimized HTML file 113z.

As illustrated in FIG. 27, the optimized HTML file 113z and the like are executed in the browser or the like of the user terminal 101. In this case, optimized resources associated with the identification information of the objects can be selected on the basis of the objects written in the optimized HTML file 113z and the like. The optimized resources are acquired from the data acquisition and processing unit D and transmitted from the request processing unit C to the user terminal 101.

As illustrated in FIG. 27, if optimized resources do not exist, the request processing unit C acquires corresponding resources from the original data 200. The acquired resources are transmitted from the request processing unit C to the user terminal 101. In the case where optimized resources do not exist, optimized resources are generated in the background by the data acquisition and processing unit D and used to replace the resources from the original data.

In this case, the generation of optimized resources by the data acquisition and processing unit D proceeds in the background. When the optimized resources are generated, the resources from the original data are replaced with the optimized resources.

Also, as illustrated in FIG. 28, the crawler unit d200 installed in the data acquisition and processing unit D crawls the original data 200 and the like saved in the application execution server 103 at a time when the user terminal 101 and the reverse proxy server 1703 are not communicating with each other, such as before a user transmits a request from the browser or the like installed in the user terminal 101 to the reverse proxy server 1703, for example.

Optimized resources are generated by the optimization unit d100 installed in the data acquisition and processing unit D on the basis of the crawled original data 200 and the like, and the optimized resources are stored in the database 1706 of the reverse proxy server 1703.

The crawler unit d200 installed in the data acquisition and processing unit D periodically crawls the original data 200 saved in the application processing unit A, and a step of automatically generating and storing optimized resources in the database 1706 is performed. Also, the original data 200 is monitored, and if there is a change in the original data 200, the original data 200 is crawled and optimized resources are generated automatically and utilized as optimized resources for the user terminal 101, similarly to the case of Embodiment 1 described above.

Which optimized resources should be selected for each user terminal 101 is determined on the basis of a strategic plan devised 7 by the artificial intelligence unit B, similarly to the case of Embodiment 1 described above.

In the case where the automatic fast display control method for web content according to Embodiment 2 of the present invention is not performed, the application processing unit A receiving a request transmitted to the application execution server 103 through the request processing unit C of the reverse proxy server 1703 transmits the original data 200 for displaying web content on the user terminal 101 of a user as a response. The response is received by the user terminal 101 over the network 102 through the request processing unit C of the reverse proxy server 1703. Additionally, web content based on the original data 200 is displayed on the user terminal 101 by the browser or the like installed in the user terminal 101.

According to the automatic fast display control method for web content according to Embodiment 2 of the present invention, the reverse proxy type of Embodiment 2 can be carried out by newly introducing the reverse proxy server 1703 while also running the application execution server 103 that includes the application processing unit A where the original data 200 for displaying web content on the user terminal 101 is saved.

With the reverse proxy type of Embodiment 2, a migration of the original data 200 and the like is not necessary. In addition, the automatic fast display control method for web content according to Embodiment 2 of the present invention can be carried out easily by changing the DNS of the application execution server 103 to the reverse proxy server 1703.

In the case of Embodiment 2 of the present invention, like the case of Embodiment 1 described above, the original data 200 can be optimized and processed data 201 containing optimized resources with a short display completion time can be used to display web content quickly in the browser or the like of each user terminal 101 in a shorter display completion time compared to the case of using the original data 200.

Embodiment 3: Nano-Agent Type

Figure 29:
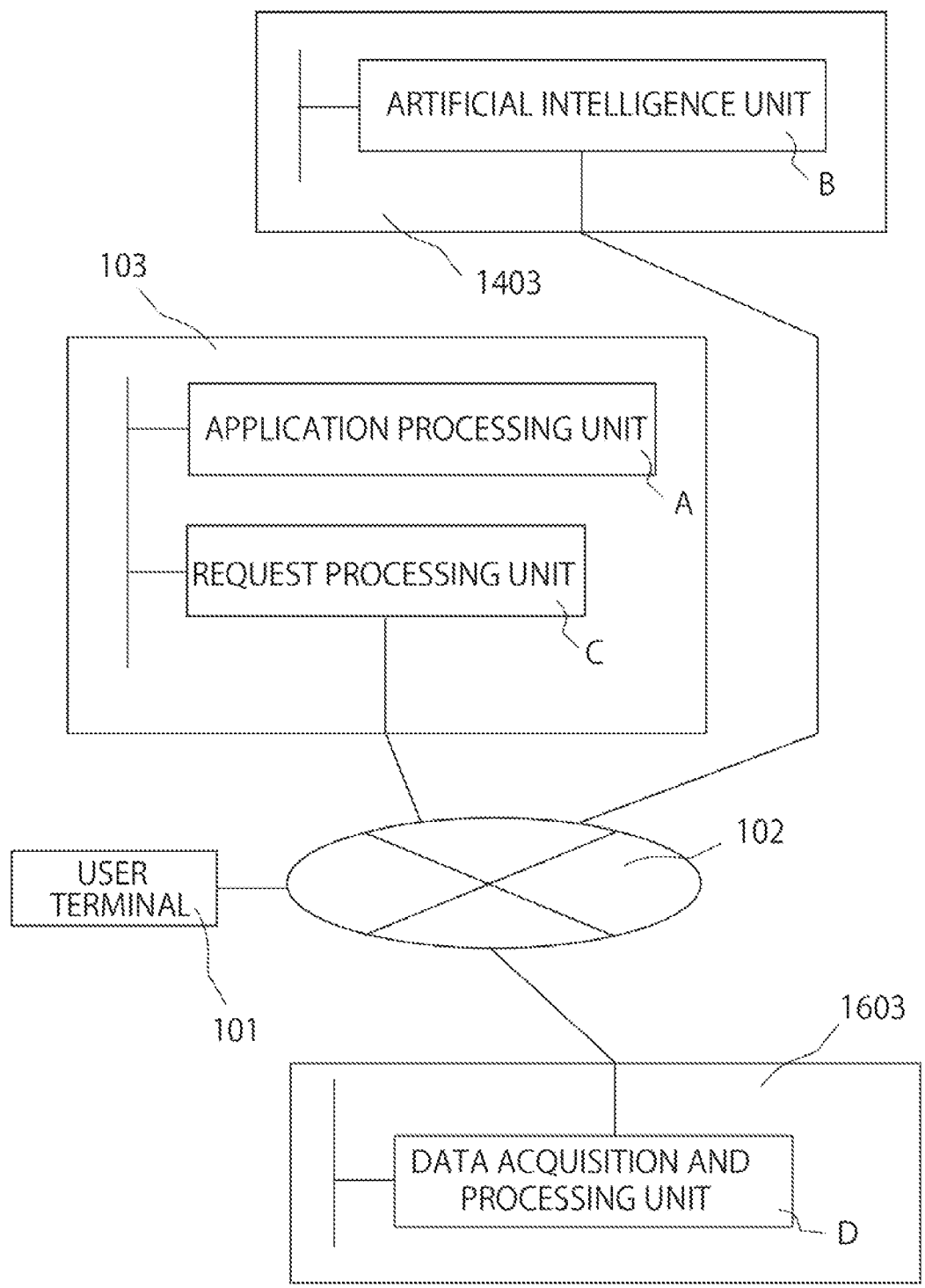
FIG. 29 is a schematic diagram illustrating a configuration of an automatic fast display control system of the nano-agent type for carrying out an automatic fast display control method for web content according to Embodiment 3 of the present invention.

FIG. 29 is a schematic diagram illustrating a configuration of an automatic fast display control system of the nano-agent type for carrying out an automatic fast display control method for web content according to Embodiment 3 of the present invention.

Compared to the all-in-one type of Embodiment 1 described above, the nano-agent type according to Embodiment 3 of the present invention is different in that an artificial intelligence server 1403 and a data acquisition server 1603 are used in addition to the application execution server 103.

Another difference is that the application processing unit A and the request processing unit C are installed in the application execution server 103.

Other differences are that the artificial intelligence unit B is installed in the artificial intelligence server 1403 and the data acquisition and processing unit D is installed in the data acquisition server 1603.

The hardware configuration of each of the artificial intelligence server 1403 and the data acquisition server 1603 is similar to the case of the application execution server 103 used in the all-in-one type of Embodiment 1 described above.

The application execution server 103, the artificial intelligence server 1403, and the data acquisition server 1603 can exchange data with each other over the network 102. The application execution server 103, the artificial intelligence server 1403, and the data acquisition server 1603 are provided with communication interfaces 1102, 1402, and 1602, respectively, and can exchange data with each other over the network 102.

Hereinafter, the points that differ from the all-in-one type of Embodiment 1 will be described primarily.

In the case of Embodiment 3 of the present invention, like the case of the application execution server 103 used in Embodiment 1, at least one execution environment selected from the group consisting of a physical machine, a virtual machine, and a container may also be used and executed for each of the artificial intelligence server 1403 and the data acquisition server 1603.

[Flow of Processes by Nano-Agent Type in Response to Request from User]

Figure 30:
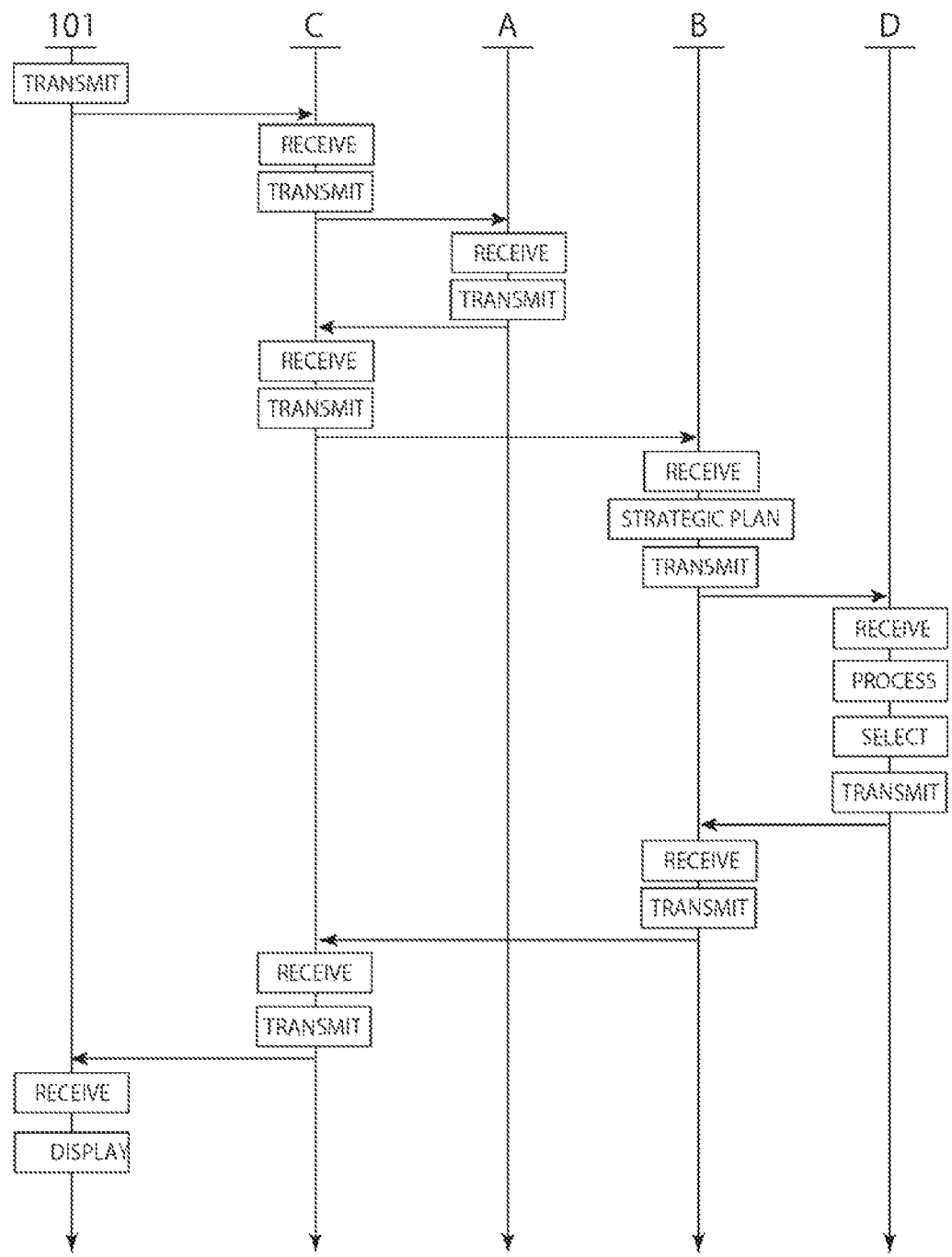
FIG. 30 is a schematic diagram for explaining how a request from a user is processed.
Figure 31:
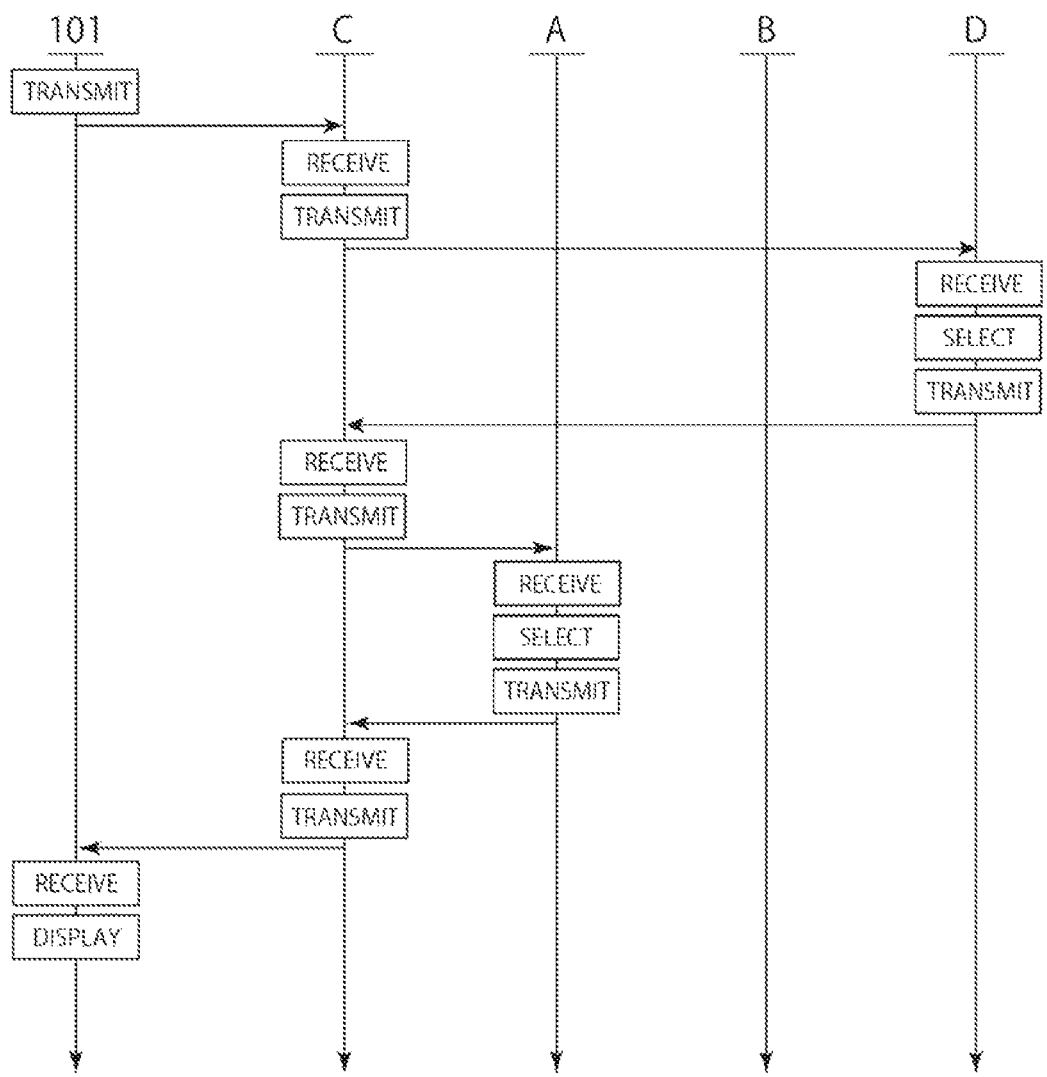
FIG. 31 is a schematic diagram for explaining how a request from a user is processed.
Figure 32:
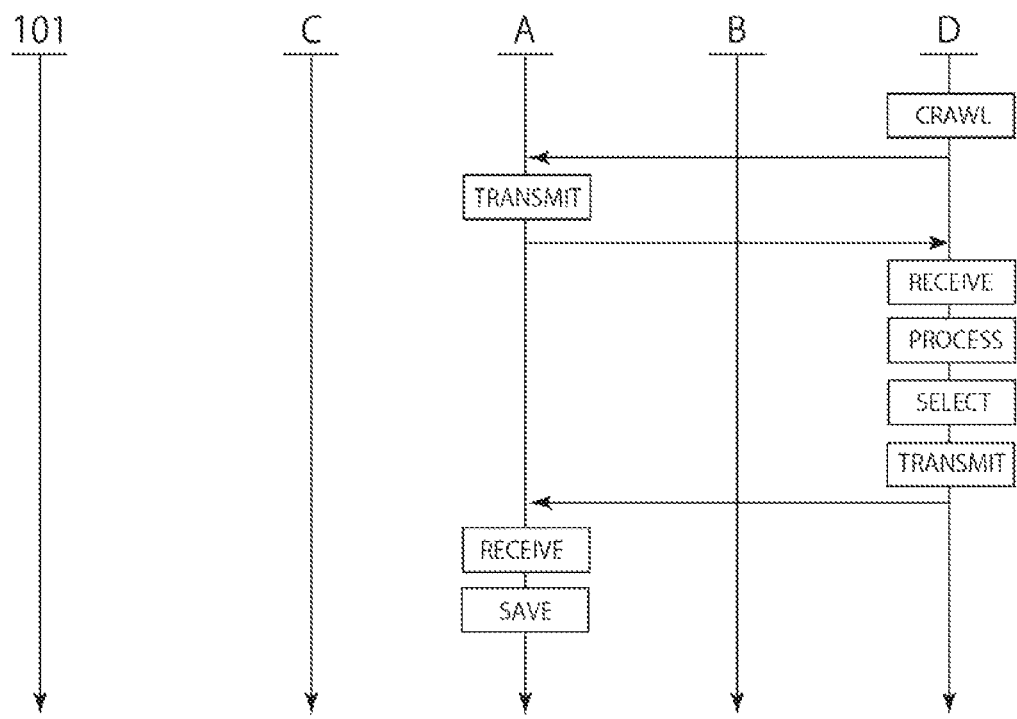
FIG. 32 is a schematic diagram for explaining how a request from a user is processed.

Each of FIGS. 30 to 32 is a schematic diagram for explaining how a request from a user is processed.

A request transmitted from the browser or the like of the user terminal 101 operated by a user is successively transmitted to the request processing unit C and the application processing unit A over the network 102.

In the case where the automatic fast display control method for web content according to Embodiment 3 of the present invention is not performed, requests transmitted from each user terminal 101 to the application execution server 103 over the network 102 are successively received by the request processing unit C and then the application processing unit A. The application processing unit A transmits the original data 200 for displaying web content on the user terminal 101 of the user through the request processing unit C as a response. The response is received by the user terminal 101 over the network 102. Additionally, web content based on the original data 200 is displayed on the user terminal 101 by the browser or the like installed in the user terminal 101.

In the case of the automatic fast display control method for web content according to Embodiment 3 of the present invention, the HTML file 113 generated by the application processing unit A may also be transmitted to the user terminal 101.

On the other hand, the request processing unit C interrupts the process of executing a response from the application processing unit A to the user terminal 101 over the network 102, and acquires the original data 200 such as the HTML file 113.

On the basis of the acquired original data 200 such as the HTML file 113, the request from the request processing unit C is successively transmitted to the artificial intelligence unit B of the artificial intelligence server 1403 and the data acquisition and processing unit D of the data acquisition server 1603 over the network 102. The data acquisition and processing unit D of the data acquisition server 1603 optimizes the original data 200 such as the HTML file 113 on the basis of a strategic plan devised by the artificial intelligence unit B of the artificial intelligence server 1403.

The processed data 201 such as the optimized HTML file 113z is transmitted through the data acquisition server 1603 in which the data acquisition and processing unit D is installed and the artificial intelligence server 1403 to the request processing unit C of the application execution server 103, and then the user terminal 101 of the user over the network 102.

Objects referenced by the HTML file 113z and the like for displaying web content in the browser or the like of the user terminal 101 are written in the processed data 201 such as the optimized HTML file 113z, for example.

On the basis of reference information from program objects written in the optimized HTML file 113z and the like, the request processing unit C acquires optimized resources from the data acquisition and processing unit D, and transmits the optimized resources to the user terminal 101 over the network 102 through the data acquisition server 1603, the artificial intelligence server 1403, and the application execution server 103.

In the case where optimized resources do not exist, the application processing unit A of the application execution server 103 acquires corresponding resources from the original data 200. The acquired resources are transmitted from the request processing unit C of the application execution server 103 to the user terminal 101 over the network 102. In the case where optimized resources do not exist, optimized resources are generated in the background by the data acquisition and processing unit D and used to replace the resources from the original data.

As another example, the crawler unit d200 installed in the data acquisition and processing unit D of the data acquisition server 1603 crawls the original data 200 and the like saved in the application execution server 103 at a time when the user terminal 101 and the application execution server 103 are not communicating with each other, such as before a user transmits a request from the browser or the like installed in the user terminal 101 to the application execution server 10.

Optimized resources are generated by the optimization unit d100 installed in the data acquisition and processing unit D of the data acquisition server 1603 on the basis of the crawled original data 200 and the like, and the optimized resources are stored in a database 1606. Also, the original data 200 is monitored, and if there is a change in the original data 200, the original data 200 is crawled and optimized resources are generated automatically and utilized as optimized resources for the user terminal 101, similarly to the case of Embodiment 1 described above.

According to the automatic fast display control method for web content of Embodiment 3 of the present invention, by installing the request processing unit C in the application execution server 103 that includes the application processing unit A where the original data 200 for displaying web content on the user terminal 101 is saved, one or more of each of the artificial intelligence server 1403 and the data acquisition server 1603 distributed all over the world and usable over the network 102 can be used.

With the nano-agent type of Embodiment 3, a migration of the original data 200 and the like is not necessary. In addition, since it is also unnecessary to change the DNS of the application execution server 103, the automatic fast display control method for web content according to Embodiment 3 of the present invention can be carried out easily.

Also, if necessary, a server provided with the same unit as the data acquisition and processing unit D of the data acquisition server 1603 may be additionally installed a short distance away from the application execution server 103, and by having the server perform the same process as the data acquisition and processing unit D of the data acquisition server 1603, for example, a reduction in communication speed may also be prevented.

The nano-agent type according to Embodiment 3 of the present invention does not need any particular migration or DNS change, and therefore can be applied easily to a system already in production that delivers web content.

In the case of Embodiment 3 of the present invention, like the case of Embodiment 1 described above, the original data 200 can be optimized and processed data 201 containing optimized resources with a short display completion time can be used to display web content quickly in the browser or the like of each user terminal 101 in a shorter display completion time compared to the case of using the original data 200.

Embodiment 4: SaaS Type

Figure 33:
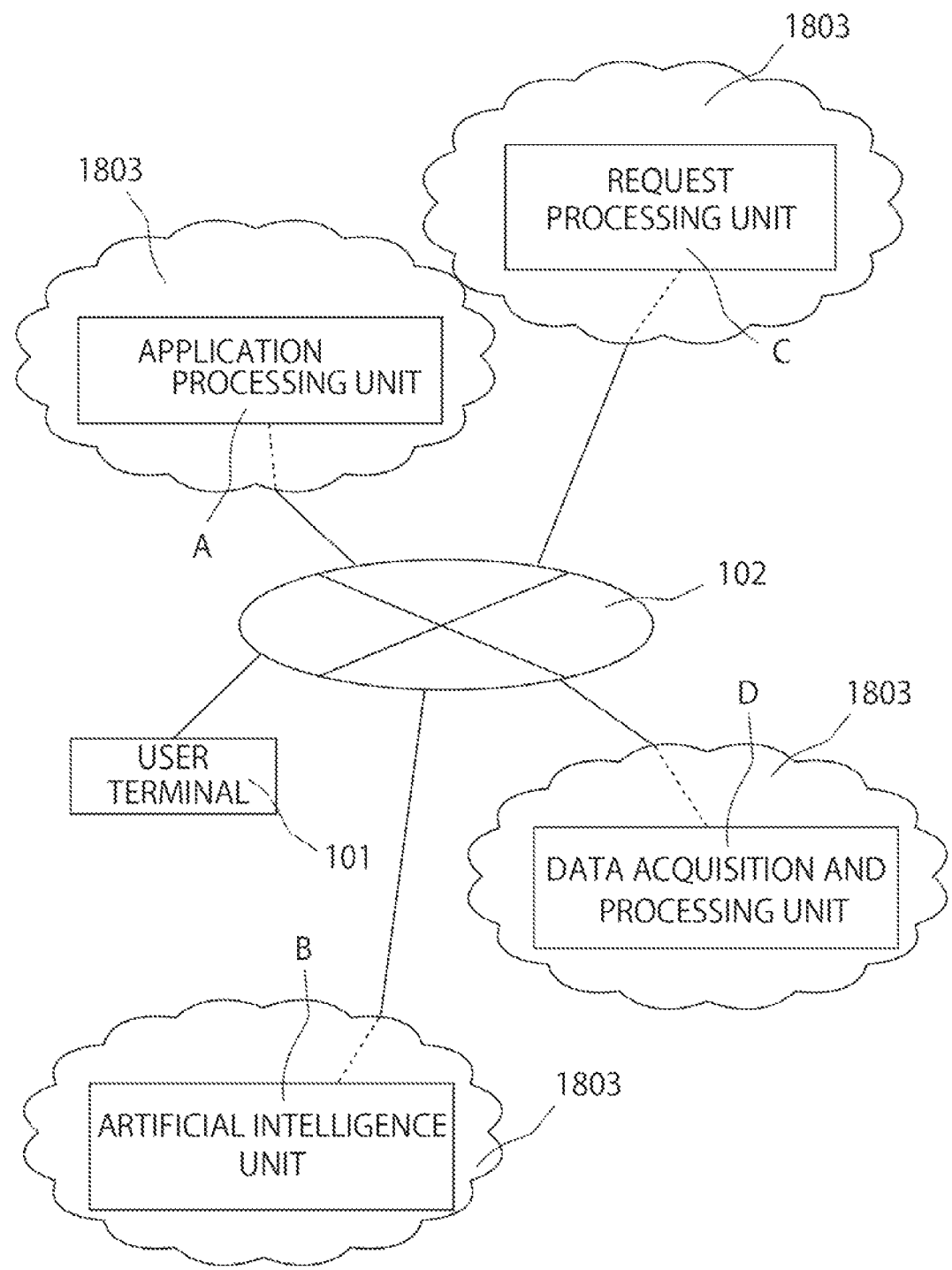
FIG. 33 is a schematic diagram illustrating a configuration of an automatic fast display control system of the SaaS type for carrying out an automatic fast display control method for web content according to Embodiment 4 of the present invention.

FIG. 33 is a schematic diagram illustrating a configuration of an automatic fast display control system of the SaaS type for carrying out an automatic fast display control method for web content according to Embodiment 4 of the present invention.

Compared to the all-in-one type of Embodiment 1 described above, the software as a service (Saas) type according to Embodiment 4 of the present invention is different in that the application processing unit A, the artificial intelligence unit B, the request processing unit C, and the data acquisition and processing unit D are each installed in a cloud 1803.

In the case of the all-in-one type of Embodiment 1 above, the respective units A to D can communicate with each other within a single execution environment.

In contrast, in the case of the SaaS type of Embodiment 4, the respective units A to D can communicate with each other over the network 102.

Otherwise, the configuration is similar to the case of Embodiment 1.

In a cloud environment, an execution environment including at least one selected from the group consisting of one or more physical machines, one or more virtual machines, and one or more containers that can communicate over the network 102 can be set up on the network 102.

The automatic fast display control method for web content according to Embodiment 4 of the present invention may also be set up in a cloud environment. The configuration setup in a cloud environment is the SaaS type.

In the case of Embodiment 4 of the present invention, the execution environment can be selected and set up irrespectively of differences such as the type of cloud platform to be used, differences between providing companies, or whether a data center for executing the cloud environment is located in one's own country or a foreign country.

[Flow of Processes by SaaS Type in Response to Request from User]

Figure 34:
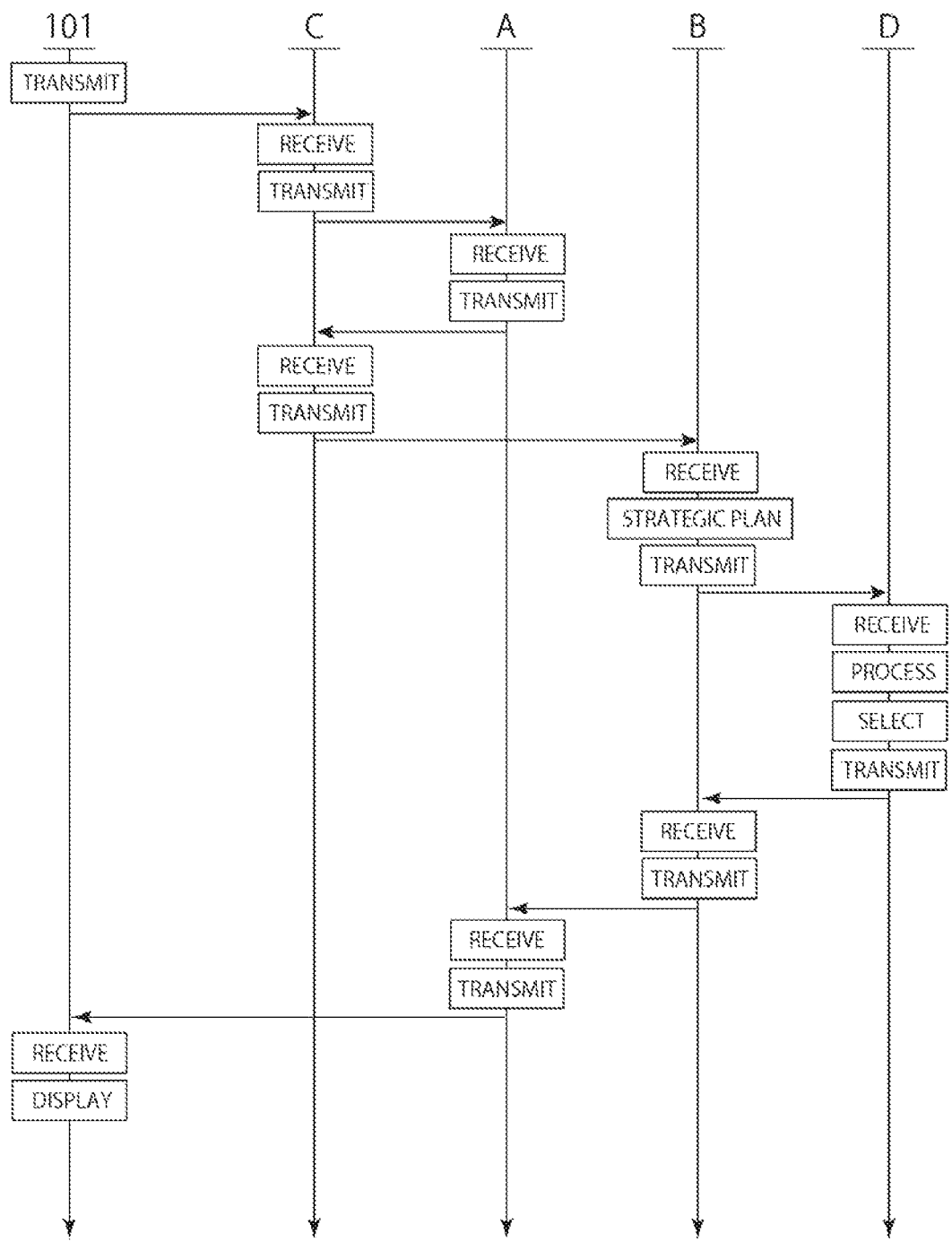
FIG. 34 is a schematic diagram for explaining how a request from a user is processed.
Figure 35:
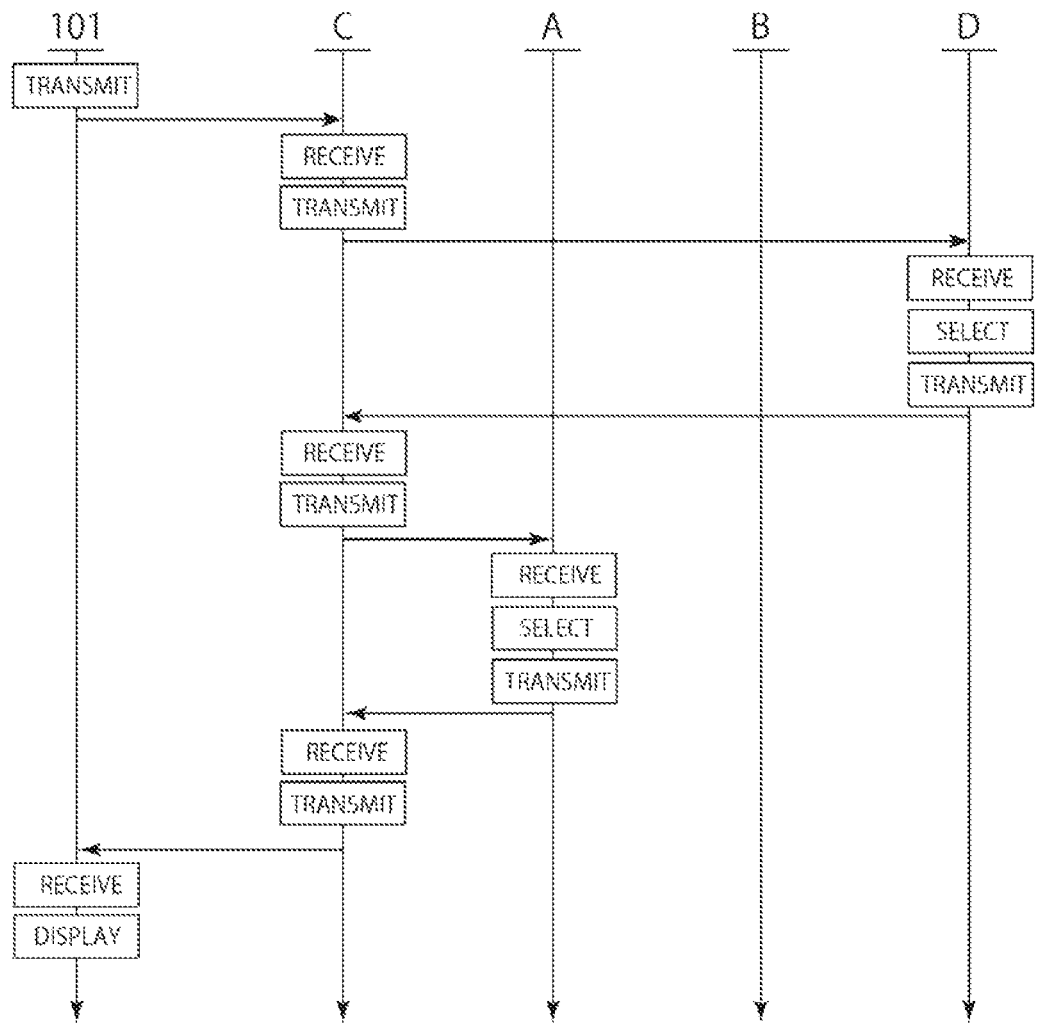
FIG. 35 is a schematic diagram for explaining how a request from a user is processed.
Figure 36:
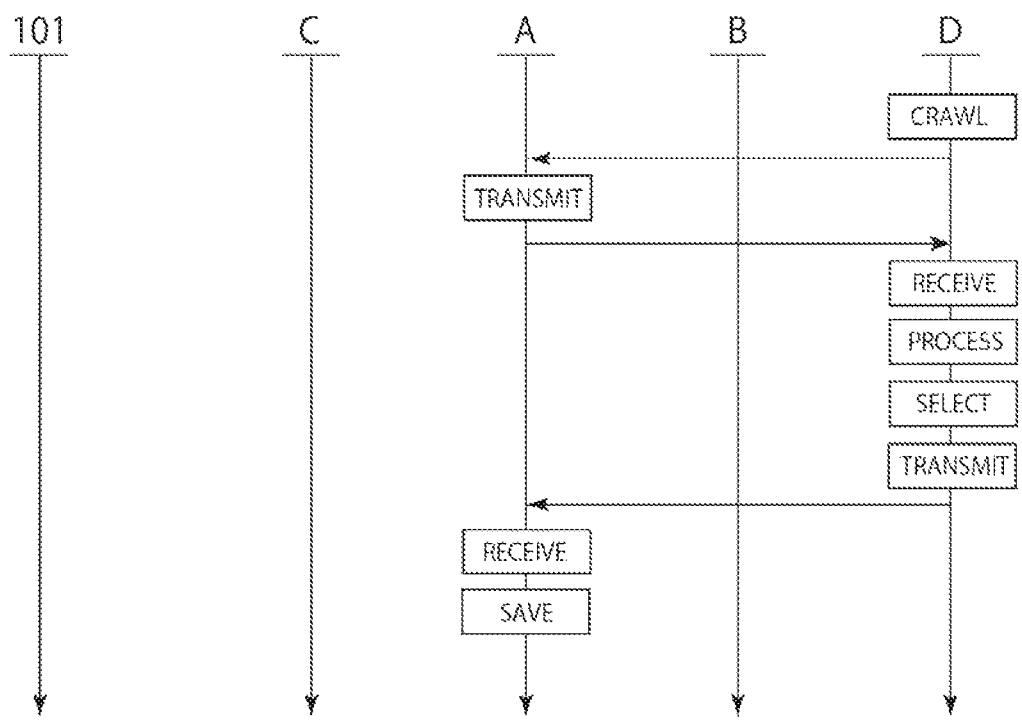
FIG. 36 is a schematic diagram for explaining how a request from a user is processed.

Each of FIGS. 34 to 36 is a schematic diagram for explaining how a request from a user is processed.

A request transmitted from the browser or the like of the user terminal 101 operated by a user is transmitted to the request processing unit C over the network 102.

In the case where the automatic fast display control method for web content according to Embodiment 4 of the present invention is not performed, the request processing unit C receiving a request transmitted to the cloud 1803 transmits the original data 200 for displaying web content on the user terminal 101 of a user through the application processing unit A as a response. The response is received by the user terminal 101 over the network 102. Additionally, original content is displayed on the user terminal 101 by the browser or the like installed in the user terminal 101.

In the case of the automatic fast display control method for web content according to Embodiment 4 of the present invention, for example, original data such as an HTML file 113 dynamically generated and saved in the application processing unit A may also be transmitted to the user terminal 101.

On the other hand, as illustrated in FIG. 34, the request processing unit C interrupts the process of executing a response from the application processing unit A to the user terminal 101 over the network 102, and acquires the HTML file 113 and the like.

For example, on the basis of the acquired HTML file 113 and the like, a request is transmitted from the request processing unit C to the artificial intelligence unit B and the data acquisition and processing unit D over the network 102. The data acquisition and processing unit D optimizes the HTML file 113 or the like on the basis of a strategic plan devised by the artificial intelligence unit B.

For example, the optimized HTML file 113z is transmitted to the user terminal 101 of the user over the network 102 through the data acquisition and processing unit D, the artificial intelligence unit B, and the request processing unit C.

Objects for displaying web content in the browser or the like of the user terminal 101 referenced by objects defined by programs written in the HTML file 113z are written in the optimized HTML file 113z and the like.

On the basis of reference information designated by each of the objects written in the optimized HTML file 113z and the like, the request processing unit C acquires optimized resources from the data acquisition and processing unit D, and transmits the optimized resources to the user terminal 101 through the artificial intelligence unit B.

As illustrated in FIG. 35, if optimized resources do not exist, the request processing unit C acquires corresponding resources from the original data 200. The acquired resources are transmitted from the application processing unit A to the user terminal 101 through the request processing unit C. In the case where optimized resources do not exist, optimized resources are generated in the background by the data acquisition and processing unit D and used to replace the resources from the original data.

Also, as illustrated in FIG. 36, the crawler unit d200 installed in the data acquisition and processing unit D crawls the original data 200 and the like saved in the application processing unit A at a time when the user terminal 101 and the request processing unit C are not communicating with each other, such as before a user transmits a request from the browser or the like installed in the user terminal 101 to the request processing unit C, for example.

Optimized resources are generated by the optimization unit d100 installed in the data acquisition and processing unit D on the basis of the crawled original data 200 and the like, and the optimized resources are stored in a database 1706 installed in the cloud 1803.

The crawler unit d200 installed in the data acquisition and processing unit D periodically crawls the original data 200 usable by the application processing unit A, and a step of automatically generating and storing optimized resources in the database 1706 is performed. Also, the original data 200 is monitored, and if there is a change in the original data 200, the original data 200 is crawled and optimized resources are generated automatically and utilized as optimized resources for the user terminal 101, similarly to the case of Embodiment 1 described above.

To carry out the automatic fast display control method for web content according to Embodiment 4 of the present invention, the original data 200 or the like and the environment or the like for displaying the original data 200 or the like on a user terminal is migrated to a cloud environment, separately from a conventional server that is operated to display web content on the user terminal 101.

Also, the DNS of the conventional server that is operated to display web content on the user terminal 101 is changed to the cloud 1803.

By simply performing the migration and DNS change in this way, the SaaS type of Embodiment 4 can be carried out in the cloud without making further changes to the environment of the conventional server that is operated to display web content on the user terminal 101.

In the case of Embodiment 4 of the present invention, like the case of Embodiment 1 described above, the original data 200 can be optimized and processed data 201 containing optimized resources with a short display completion time can be used to display web content quickly in the browser or the like of each user terminal 101 in a shorter display completion time compared to the case of using the original data 200.

Embodiment 5

Next, an automatic fast display control method for web content according to Embodiment 5 of the present invention will be described.

The steps necessary for achieving the automatic fast display control method for web content according to Embodiment 5 can be performed according to the steps described below, even in the case of any of Embodiments 1 to 4 of the present invention described above. Here, the case of the all-in-one type of Embodiment 1 described above is described as one example. The hardware configuration of the all-in-one type used in Embodiment 5 is similar to the case of Embodiment 1 described above.

Hereinafter, the differences from Embodiment 1 above will be described primarily.

In Embodiment 5 of the present invention, a smartphone is adopted as one example of the user terminal 101. The step of generating the web content 211 described below is similar to the case of Embodiment 1 of the present invention.

Figure 37:
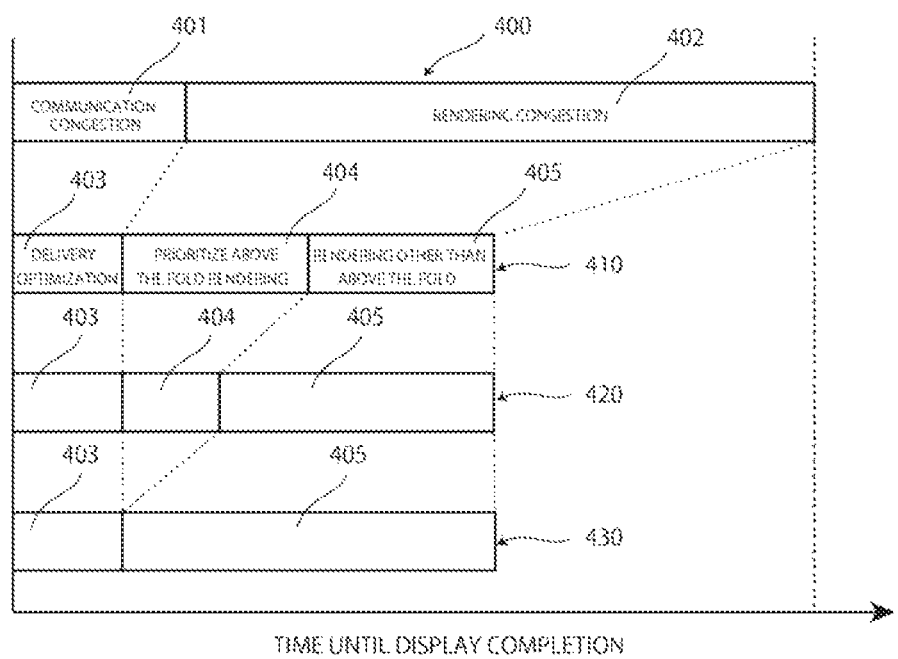
FIG. 37 is a conceptual diagram for explaining a mechanism by which web content 211 is displayed quickly on the user terminal 101.

FIG. 37 is a conceptual diagram for explaining a mechanism by which web content 211 is displayed quickly on the user terminal 101.

In general, there are two factors that impede the fast display of the web content 211 on the user terminal 101.

One factor is communication congestion 401, and the other factor is rendering congestion 402.

Ordinarily, the original data 200 (reference sign 400 in FIG. 37) also contains data that is unnecessary depending on the individual user terminal 101. For this reason, if the original data 200 is transmitted to the user terminal 101 as-is, it will take extra time to complete the transmission of the original data to the user terminal 101.

The case of Embodiment 1 above mainly relates to delivery optimization (reference sign 403 in FIG. 37) for improving the communication congestion 401 in FIG. 37.

The case of Embodiment 5 resolves rendering congestion 402 in addition to communication congestion 401.

In the disclosure of the present invention, rendering refers to displaying the web content 211 and the like on the user terminal 101.

One reason why the rendering congestion 402 illustrated in FIG. 37 occurs is that an attempt is made to transmit a large amount of miscellaneous information from the request processing unit C to the user terminal 101 all at once.

In the case of Embodiment 5 according to the present invention, the rendering of the portion corresponding to above the fold is prioritized as the information to be transmitted first to the user terminal 101 from among the resources needed to display the web content 211 (reference sign 404 in FIG. 37).

Next, communication is regulated to prioritize the transition to a state enabling the user terminal 101 to accept input from the user (reference sign 404 in FIG. 37).

Next, communication is regulated such that the portions of the resources needed to display the web content 211 other than the portion corresponding to above the fold are organized and transmitted to the user terminal 101 (reference sign 405 in FIG. 37).

Here, transitioning to a state enabling the user terminal 101 to accept input from the user refers to reaching a state in which the user terminal 101 can accept screen operations such as scrolling, tapping, clicking, and dragging, and input operations such as inputting various text, inputting sound, and inputting images performed by the user.

Also, organizing and transmitting the portions of the resources necessary for displaying the web content 211 other than the portion corresponding to above the fold to the user terminal 101 means performing an action like the following in the case where there are two or more program portions necessary for rendering the portions other than the portion corresponding above the fold. For example, if the program portions interfere with each other, synchronous execution is performed such that one of the portions is prioritized and the execution of the next program portion proceeds after waiting for the completion of the prioritized program portion. If the program portions do not interfere with each other, asynchronous execution is performed such that the execution of one program portion is started without waiting for the completion of the other program portion.

Next, Embodiment 5 according to the present invention will be described in detail.

Before a request is transmitted to the request processing unit C from the browser or the like installed in the user terminal 101, all of the respective original data 200 saved in the application processing unit A is processed by the data acquisition and processing unit D, and a plurality of processed data 201 is generated.

The plurality of processed data 201 is generated automatically in correspondence with all of the user terminals 101 anticipated to access the request processing unit C, before a request is transmitted from the user terminal 101 to the application execution server 103.

The generated processed data 201 is divided into a plurality of processed data 201 corresponding to web content 211*a* referred to as above the fold, which corresponds to an initial display screen A in the browser of the user terminal 101, and a plurality of processed data 201 corresponding to web content 211*b* that is different from above the fold and does not correspond to the initial display screen A in the browser of the user terminal 101.

The processed data 210 corresponding to the web content to be displayed in above the fold is selected from among the original data 200 and the plurality of processed data 201 according to the shortest time from when a request is transmitted from the user terminal 101 to the application processing unit A until the web content 211*a* on the user terminal 101 is ready to accept input on the user terminal 101.

Through preliminary tests, the artificial intelligence unit B has already learned, for each user terminal 101, correlation information between information such as how data should be processed and how data should be combined by the data acquisition and processing unit D and the processed data 210 associated with the shortest time it takes until the web content 211*a* is ready to accept input on each user terminal 101.

By performing statistical processing using the data obtained from preliminary tests, the artificial intelligence unit B can devise a strategic plan for selecting optimal processed data 210.

Even in the case where the original data 200 saved in the application processing unit A is generated dynamically or changed, when there is a change in the original data 200, new processed data 210 is generated on the basis of the strategic plan devised up to now by the artificial intelligence unit B.

When there is an actual request from the user terminal 101 to the request processing unit C, not all of the web content 211 is transmitted to the user terminal 101, but instead a minimal portion including the processed data 201 necessary for displaying the web content 211*a* referred to as above the fold corresponding to the initial display screen A in the browser of the user terminal 101 is split off and transmitted first.

When a request is transmitted from the browser or the like installed in the user terminal 101 to the request processing unit C, the request is transmitted from the request processing unit C receiving the request to the application processing unit A and the artificial intelligence unit B. Also, the request is transmitted over the network 102 to the data acquisition and processing unit D, either through the artificial intelligence unit B or directly without going through the artificial intelligence unit B.

[Step of Specifying Data Corresponding to Initial Display Screen of User Terminal 101]

The display environment of the user terminal 101 can be specified by cross-checking information such as a user agent or a referrer included in the signal transmitted from the user terminal 101 to the application processing unit A with the model information file 126 saved in the settings file storage unit 1523 of the data acquisition and processing unit D.

In actuality, preliminary tests performed in advance or a trained model created by machine learning using data obtained from preliminary tests can be used to determine which portion of the web content 211 corresponds to above the fold for each user terminal 101.

The display environment of the initial display screen A in the browser of the user terminal 101 can be specified on the basis of the information written in the model information file 126.

Which portions of the HTML file 113, the CSS file 107, the script language file 108, the optimized HTML files 113*z*, the processed CSS files 132, the processed script language files 133, the image file 109, the processed image files 134, and the like are displayed on the initial display screen A corresponding to above the fold in the browser of the user terminal 101 are specified from information about the program data such as letters, numerals, and symbols written in the HTML file 113 and the optimized HTML files 113*z*, information about properties such as the size of the program data and information about properties such as the size and layout of the image file 109 and the processed image files 134 written in the CSS file 107 and the processed CSS files 132 described above with reference to FIG. 16, for example.

When the display environment of the user terminal 101 is specified, the HTML file 113, the CSS file 107, the script language file 108, the optimized HTML files 113*z*, the processed CSS files 132, the processed script language files 133, the image file 109, the processed image files 134, and the like respectively corresponding to above the fold that can be displayed using the display environment are specified.

The above are specified by a program written in the control unit d300 installed in the data acquisition and processing unit D.

[Step of Specifying Data Corresponding to Portions Other than Initial Display Screen of User Terminal]

If the data to be displayed on the initial display screen A in the browser of the user terminal 101 is specified, the data corresponding to the portions other than the initial display screen A corresponding to above the fold of the user terminal 101 can be specified accordingly.

The data excluding the data to be displayed on the initial display screen A in the browser of the user terminal 101 from among the web content 211 and the web content 212 is the data corresponding to the portions other than the initial display screen A of the user terminal 101.

The above will be described in terms of a specific example.

For instance, the web content 211 includes web content 211*a* that corresponds to above the fold and web content 211*b* that does not correspond to above the fold.

Resources for displaying the web content 211 include HTML data 301 corresponding to above the fold in the HTML file 113 or the optimized HTML files 113*z*.

Also, the resources include CSS data 302 corresponding to above the fold in the CSS file 107 and the processed CSS files 132.

Script language data 303 corresponding to above the fold is included in the script language file 108 and the processed script language files 133.

Image data 304 corresponding to above the fold is included in the image file 109 and the processed image files 134.

The user terminal 101 receiving the resources for displaying the web content 211*a* corresponding to above the fold of the user terminal 101 can display the web content 211*a* in a short display completion time in the browser installed in the user terminal 101.

Next, from among the web content 211*b* not corresponding to above the fold, the code portion for enabling the user terminal 101 to accept input from the user is prioritized and transmitted to the user terminal 101 (reference sign 404 in FIG. 37).

Next, the steps after the web content 211*a* corresponding to above the fold is displayed on the user terminal 101 will be described by following user actions.

In the case where the user of the user terminal 101 expresses interest in the web content 211*a* displayed in the browser of the user terminal 101, the user performs an action causing the browser of the user terminal 101 to display additional information.

Conversely, in the case where the user of the user terminal 101 does not express interest in the web content 211*a* displayed in the browser of the user terminal 101, the user performs the action also referred to as bouncing.

Specific examples of the case where the user performs an action causing the browser of the user terminal 101 to display additional information when the user of the user terminal 101 expresses interest in the web content 211*a* corresponding to above the fold displayed in the browser of the user terminal 101 are as follows.

For example, the user of the user terminal 101 performs an action such as clicking a button or the like displayed in the browser of the user terminal 101, scrolling the browser of the user terminal 101 to see information that will be displayed by scrolling the initial display screen A in the browser of the user terminal 101, or continuing to read the displayed content without bouncing from the initial display screen A even though a certain time has elapsed since the initial display screen A was displayed in the browser of the user terminal 101.

When the user performs an action such as clicking or scrolling with respect to the user terminal 101, the browser installed in the user terminal 101 detects event information.

On the other hand, when the user initially transmits a request from the browser or the like of the user terminal 101, the optimized HTML file 113*z* or the like is initially downloaded to the user terminal 101 in response to the request, for example.

In the optimized HTML file 113*z* or the like, reference information for resources are written as objects treated as program functions.

Also, in the optimized HTML file 113*z* or the like, objects for inserting objects as program functions into the optimized HTML file 113*z* or the like are written.

In other words, the objects in the optimized HTML file 113*z* or the like can be used to add optional program code.

This mechanism makes it possible to write program code that runs when the browser installed in the user terminal 101 detects event information.

When the browser installed in the user terminal 101 detects event information, the remaining resources for displaying the remaining web content 211*b* are transmitted immediately to the user terminal 101 over the network 102 according to the program code added to the optimized HTML file 113*z* or the like.

In this way, by ranking, for each user terminal 101, the downloading of resources that are necessary for above the fold and resources that are unnecessary for above the fold in the browser or the like of each user terminal 101, rendering congestion in the browser or the like of each user terminal 101 can be avoided.

The user terminal 101 receiving the resources for displaying the web content 211*b* can display the web content 211*b* quickly in the browser installed in the user terminal 101.

Note that the resources for displaying the web content 211*b* may be transmitted to the user terminal 101 all at once, or the resources may be split up and transmitted.

In the transmission of the resources for displaying the web content 211*b*, if program portions related to the display of the web content 211*b* on the user terminal 101 interfere with each other, the program portions are executed synchronously such that after the execution of one program portion is completed, the next program portion is started.

Conversely, if program portions related to the display of the web content 211*b* on the user terminal 101 do not interfere with each other, the respective program portions are started asynchronously.

Also, the control of which programs should be prioritized and which should be deferred is achieved by a program written in the control unit d300 installed in the data acquisition and processing unit D according to the strategic plan devised by the artificial intelligence unit B. By causing the program to be reflected in the objects in the optimized HTML file 113*z* or the like, automatic fast display of web content is achieved.

In the case of Embodiment 5 according to the present invention, necessary data can be supplied to the user terminal 101 when necessary. Accordingly, congestion in data transmission to the individual user terminals 101, congestion in the data processing for displaying web content on the user terminal 101, and rendering congestion are resolved. With this arrangement, automatic fast display of web content is achieved.

When the optimized HTML file 113*z* or the like is downloaded to the user terminal 101 of the user, resources corresponding to objects defined in the optimized HTML file 113*z* are downloaded to the user terminal 101 or available for reference over the network 102.

Thereafter, the user can freely view web content in the browser or the like installed in the user terminal 101 of the user through operations performed on the browser of the user terminal 101.

Embodiment 6

Next, an automatic fast display control method for web content according to Embodiment 6 of the present invention will be described.

The steps necessary for achieving the automatic fast display control method for web content according to Embodiment 6 are similar to the case of Embodiment 5 of the present invention described above.

Hereinafter, the differences from Embodiment 5 above will be described primarily.

In Embodiment 6 of the present invention, a smartphone is adopted as one example of the user terminal 101. The step of generating the web content 211 described below is similar to the case of Embodiment 1 of the present invention.

When achieving automatic fast display of web content, there is a problem of not simply displaying web content on the user terminal 101 of each user quickly, but determining what to display quickly to each person.

In Embodiment 6 of the present invention, the step of achieving automatic fast display of web content changes on the basis of the user experience of the user viewing the web content and the engagement occurring between the user and the web site due to the user viewing the web content.

The "user experience" used in the disclosure of the present invention means what the user experiences when viewing web content displayed on a user terminal.

Specifically, for example, the user experience is one or more actions such as the user reading text information displayed in the web content, scrolling a browser installed in the user terminal to continue reading the text information further, clicking on a link associated with the web content to view the content at the link destination, playing back a video file, playing back a music file, or viewing an image file associated with the web content, inputting text information into a form field and transmitting the text information, and purchasing a product displayed in the web content.

Actual individual user experiences can be captured as event information by the browser or the like installed in each user terminal 101.

In the case where the user viewing the web content determines that he or she is not interested in the web content, or that the web content does not contain information that the user is seeking, the user performs an action referred to as bouncing.

If a user merely glances at the web content, leaves, and does not view the web content again, a score related to the user experience for that user is zero.

The display completion time that users are willing to tolerate with respect to one or a plurality of web pages included in the web content of the web site is said to be two seconds or less.

How long of a display completion time may be tolerated depends on the user's engagement with the web site.

For example, if the user trusts the web site and is confident that the web site contains needed information, the user is willing to tolerate a longer display completion time. In the opposite case, the user is unwilling to wait for even a second.

Conversely, the user experience increases in the case where the user does not bounce but instead performs an action such as continuing to read the web content displayed on the user terminal of the user.

Additionally, if the user executes all actions associated with the web content provided by the provider of the web content and the administrator of the web site displayed on the user terminal of the user, the user experience for the user at that point in time is maximized.

In the case where the user experience is maximized for a specified user, a score associated with the user experience may be set to a relative value of 100.

Also, the "engagement" used in the disclosure of the present invention means a trust relationship nurtured through web content between the user viewing the web content displayed on the user terminal and the operator of a web site.

In the disclosure of the present invention, this trust relationship is treated as being related to the user experience.

In other words, in the case where there is no engagement between the user and the operator of the web site, for example, the engagement corresponds to a relative value of 0 when the user is not viewing the web content.

However, after a request is transmitted from a user terminal 101 to the request processing unit C and the like even once, the user experience of the user accessing the web content is increased as an engagement score. For this reason, if a history of the user terminal 101 or the like accessing the request processing unit C and the like is saved, the engagement score related to the user terminal 101 is recorded as a value greater than zero.

On the other hand, in the case where the user experience is maximized for a certain user, a sufficient trust relationship is considered to be nurtured between the user and the operator of the web site, and therefore the engagement corresponds to a relative value of 100.

In other words, the value of the engagement based on the user experience for each user varies as a relative value from 0 to 100.

According to the findings from previous studies by the inventor, the value of the engagement tends to decrease for users with no interest in web content, whereas the value of the engagement tends to increase for users who express interest in web content.

The case of Embodiment 6 according to the present invention discloses a method that adjusts the process of displaying web content displayed on user terminals viewed by respective users according to the engagement score of each user, and thereby maximizes the satisfaction of the users viewing the web site.

First, the engagement score between the user and the web content is calculated.

The lowest engagement score is assigned as a relative value of 0 for the engagement score related to a user who has never transmitted a request to the request processing unit C and the like used in Embodiment 6 of the present invention.

With respect to the engagement score related to a user who has transmitted a request to the request processing unit C and the like at least once, the action of transmitting a request to the application processing unit A is one user experience, and therefore the engagement score is increased.

Additionally, the engagement score is increased every time a user performs an action with a rich user experience, such as visiting the web site many times, staying on the web site for a long time, revisiting the web site after a short interval, following a link established on the web site, clicking a button or the like many times, playing back a video file, audio file, or the like for a long time, or clicking a video file, audio file, or the like many times. As a result, a high engagement score is assigned to users with a rich user experience. For users with a maximized user experienced, the engagement score is assigned as a relative value of 100.

The engagement score varies as a relative value from 0 to 100.

First, the web content to be displayed on each user terminal 101 for each display environment of the user terminals 101 of the users is selected on the basis of the engagement score.

For example, for one type of user terminal 101, the web content 211 with the shortest display completion time is assigned to the users with the lowest engagement score. As another example, the web content 211 with rich content and the longest display completion time is assigned to the users with the highest engagement score.

[Step of Calculating Engagement Score for Each User Terminal]

Next, a step of calculating the engagement score for each user terminal 101 will be described.

The engagement score used in Embodiment 6 according to the present invention is calculated for each user terminal 101 on the basis of the user experience associated with the identification data specifying the user terminal 101 that has transmitted a request to the request processing unit C and history data for each user terminal associated with the identification data.

When the user terminal 101 transmits a request to the request processing unit C, data such as an accept header or a cookie specifying the user terminal 101 is recorded in a database 506 through a program written in the control unit 1512 of the data acquisition and processing unit D. This data acts as identification data for specifying the user terminal 101.

Also, actions such as clicking, scrolling, dragging, and the input of text performed by the user are saved as events in a cookie or the like for each user terminal 101 by the browser installed in the user terminal 101.

The engagement score can be managed on the basis of this information by a program added to the optimized HTML file 113z or the like downloaded to each user terminal 101, similarly to the case described in Embodiment 5 above.

The management of the engagement is performed by the user terminal 101, but the engagement score may also be managed on the execution environment side, such as in the application execution server 103, for example.

For example, data related to events may also be detected on the data acquisition and processing unit D side through the request processing unit C and the processing unit A. The event information may also be transmitted as a signal to the control unit 1512 installed in the data acquisition and processing unit D.

Event information transmitted to the data acquisition and processing unit D over the network 102 is analyzed in association with an event handler defined by the control unit d300 of the data acquisition and processing unit D illustrated in FIG. 4, for example. The event information is recorded as history data about each user terminal 101 in each user terminal 101, and also in the database 1106 if necessary.

Examples of the history data for each user terminal 101 include one or more of the number of user requests transmitted from the browser, the type of user request transmitted from the browser, the time the user stays on the web site, or the period between requests transmitted from the browser.

Specific examples of the history data are as follows.

Examples of the history data for each user terminal 101 include:
the time 301 taken for the user to read text information displayed in the web content 211,
a link 302 that the user views by clicking a link associated with the web content 211 and viewing the content at the link destination, and the number of times 303 that the link 302 is clicked,
a video file 304 that is played back from among video files associated with the web content 211, the number of times 305 that the video file 304 is played back, and the duration 305 of viewing the video file 304,
a music file 306 that is played back from among music files associated with the web content 211, the number of times 307 that the music file 306 is played back, and the duration 307 of viewing the music file 306,
text information 308 inputted into a form field associated with the web content 211 and the number of times 309 that the text information 308 is transmitted,
a product 310 purchased from among products displayed in the web content 211 and the number of times 311 that the product 310 is purchased,
a service 312 requested from among services displayed in the web content 211 and the number of times 313 the service 312 is requested,
the number of times 313 a request is transmitted to the application processing unit A,
the period 314 from when a request is first transmitted until a request is last transmitted to the application processing unit A,
the period 315 from when the previous request was transmitted until the current request was transmitted to the application processing unit A,
a number of times 316 such as the number of times the browser screen on the user terminal 101 is scrolled or touched, and
a distance 317 such as the distance that a mouse or the like moves on the browser screen of the user terminal 101.

One or more types of data can be selected and used as the history data for each user terminal 101.

The history data for each user terminal 101 saved in the database 1106 corresponds to the user experience for each user.

The step of calculating the engagement score for each user terminal 101 is performed as follows.

[Expression 1]

$$\sum_{i=1}^{k} a_i \times f_i \qquad (A)$$

Expression (A) is a formula for calculating the engagement score for each user terminal 101.

Here, fi represents functions corresponding to the history data for each user terminal 101, and ai represents a coefficient with respect to each function. Also, i is a natural number, and the values of i respectively correspond to each of the history data. Also, k is the total number of the history data.

The history data for each user terminal 101 is saved in the database 1106 as the variable i.

For example, the object Fi corresponding to i=1 corresponds to the ratio of the time 301 taken for a specific user to read text information per web site visit with respect to the average time taken for each user to read text information per web site visit.

As another example, i=2 corresponds to the ratio of the type of link 302 clicked by a specific user with respect to the total number of links present in the web content 211.

As another example, i=3 corresponds to the ratio of the number of times 303 that the link 302 is clicked by a specific user with respect to the average number of link clicks by each user per web site visit.

Similarly, ratios of individual user experiences with respect to average history data are associated using the variable fi.

Next, the web content 211 is viewed by the user terminal 101, but if for example a user bounces in less than two seconds and has no viewing history again thereafter, the engagement score is set to zero.

When the initial values of the coefficient ai of Expression (A) above are all set to 1, the value of Expression (A) above for the user expressing the largest value calculated according to Expression (A) is 100.

Note that the coefficient ai is an indicator of which items to place importance on. When changing these coefficients, the values are adjusted automatically on the basis of the strategic plan by the artificial intelligence unit B according to which combination of coefficients will raise the engagement scores of all users in the shortest time.

Through the above step, a relative value of 0 to 100 is obtained for each user terminal 101 used by all of the users who have transmitted a request to the server.

Each of these values is the engagement score up to the present time since the web content 211 was published.

The engagement score is increased every time a user views the web content 211. For this reason, the engagement score is not fixed for each user, but changes over time for each user.

[Step of Selecting Web Content According to Engagement Score]

Next, a step of selecting the web content 211 according to the engagement score will be described.

A combination of files usable in the display environment of each user terminal 101 can be specified on the basis of the history information for each user and the identification information of the user terminal 101 associated with the history information, and a plurality of pieces of web content 211 with different display completion times can be generated by the data acquisition and processing unit D for each user terminal 101.

At this point, the resources corresponding to the web content 211 with the shortest display completion time of the web content are selected for users having an engagement score that is less than a certain value.

In this case, for example, resources are selected from the respective types of the referring CSS file 107 and the processed CSS files 132, the script language file 108 and the processed script language files 133, the image file 109 and the processed image files 134 such that as many paragraphs of the text files as possible are removed without producing a problem in the display on the user terminal 101.

As another example, resources from which video files, links for playing back video files, and links for displaying ads such as ad files or ad links have been removed are selected.

Similarly, the files with the shortest display completion times are respectively specified from among the CSS file 107 and the processed CSS files 132, the script language file 108 and the processed script language files 133, and the image file 109 and the processed image files 134.

For example, for files such as the processed CSS files 132, the processed script language files 133, and the processed image files 134, resources in which the content related to data such as removed video files, links to video files, ad files, and ad links have been removed are specified.

The combination of data with the shortest display completion time is specified from among the plurality of processed data 210 and the original data 200 corresponding to the plurality of processed data 210.

The processing of the web content 211 to be displayed according to the combination of data with the shortest display completion time has been completed in advance, and therefore a display completion time within 0.2 seconds, preferably within 100 milliseconds, is actually achievable for the display environment of the user terminal 101 obtained by cross-checking the information such as a user agent or a referrer with the model information file 126.

According to the step described above, there is obtained web content 211 which is transmitted by the request processing unit C through the data acquisition and processing unit D and the like to users having an engagement score of a certain value or less and which is displayable in the display environment of the specified user terminal 101.

The resources for displaying the web content 211 with the shortest display completion time are selected according to preliminary tests performed in advance, a trained model created by machine learning based on data obtained from the preliminary tests, or the like, and therefore the time it takes to complete the transmission of the web content 211 from the request processing unit C to the user terminal 101 can be shortened.

Next, for users having an engagement score of a certain value or more, web content 211 that is not abbreviated or omitted while also being displayed quickly is selected.

Specifically, for example, resources from which video files, links for playing back video files or the like, and links for displaying ads such as ad files or ad links have not been removed are selected.

In this case, the resources for displaying the web content 211 presenting displayable information are selected from among the files usable in the display environment of the user terminal 101.

Specifically, from among the group of files usable in the display environment of the specified user terminal 101, a combination of files having a short display completion time and also no abbreviated or omitted information is extracted according to the type of each file.

For example, the HTML file 113 and the optimized HTML files 113z are compared, and a file with a short display completion time from among the files without abbreviated or omitted information is adopted.

Similarly, files with short display completion times from among the files without abbreviated or omitted information are respectively adopted from among the CSS file 107 and the processed CSS files 132, the script language file 108 and the processed script language files 133, and the image file 109 and the processed image files 134.

A combination of data with short display completion times from among the data without abbreviated or omitted information is specified from among the plurality of processed data that has been extracted and processed and the original data 200 corresponding to the plurality of processed data that has been extracted and processed.

Web content 211 including the combined data with short display completion times from among the data without abbreviated or omitted information is selected on the basis of the display environment of the user terminal 101 obtained by cross-checking the information such as a user agent or a referrer with the model information file 126, and is therefore compatible with the display screen of the user terminal 101.

Next, the way in which the step for achieving fast display of web content changes according to the engagement scores of individual users will be described.

FIG. 37 illustrates a schematic diagram for explaining a step in which the time from when a request is transmitted from the user terminal 101 to the application processing unit A until the web content 211 is ready to accept input on the user terminal 101 is adjusted according to the engagement scores of individual users.

As illustrated in FIG. 37, when the engagement score of the user is the lowest, the processed data 210 with the shortest time from when a request is transmitted from the user terminal 101 to the request processing unit C and the like until the web content 211 is ready to accept input on the user terminal 101 is selected.

Conversely, when the engagement score of the user is the highest, the processed data 210 with the longest time from when a request is transmitted from the user terminal 101 to the application processing unit A until the web content 211 is ready to accept input on the user terminal 101 is selected.

When the engagement score of the user is intermediate between the highest case and the lowest case, the processed data 210 with an intermediate time between the shortest time and the longest time from when a request is transmitted from the user terminal 101 to the application processing unit A until the web content 211 is ready to accept input on the user terminal 101 is selected.

Figure 38:
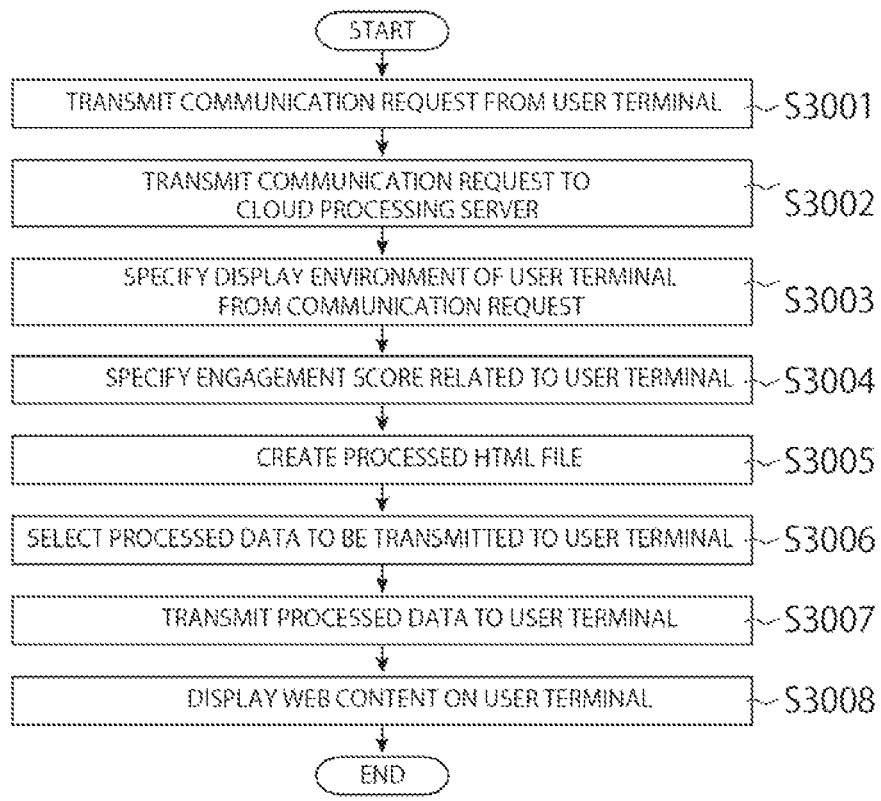
FIG. 38 is a flowchart for explaining how the user experience is reflected in a step of achieving an automatic fast display of web content.

FIG. 38 is a flowchart for explaining how the user experience is reflected in the step of achieving automatic fast display of web content.

First, the user transmits a request from the user terminal 101 to the application processing unit A (step S3001).

The request is transmitted from the request processing unit C and the application processing unit A to the artificial intelligence unit B and the data acquisition and processing unit D (step S3002).

The data acquisition and processing unit D specifies the display environment of the user terminal 101 from information such as an accept header or a cookie included in the request (step S3003).

Also, the engagement score up to now can be specified from information such as an accept header or a cookie on the basis of identification information associated with the user terminal 101 (step S3004).

The processed data 210 according to the obtained engagement score is selected, and objects corresponding to the processed data 210 are transmitted to the data acquisition and processing unit D, the artificial intelligence unit B, the application processing unit A, and the request processing unit C. Additionally, the resources of the processed data 210 are associated with objects in the optimized HTML file 113*z* (step S3005).

The optimized HTML file 113*z* is executed in the browser or the like of the user terminal 101. Thereafter, the web content 211 is displayed on the user terminal 101 (step S3008).

In step S3006 of FIG. 38, the processed data 210 to be transmitted to the user terminal 101 is selected according to the engagement score for the user associated with the user terminal 101.

For a user with a low engagement score, the rendering of above the fold is prioritized (see reference sign 410 in FIG. 37).

By prioritizing the rendering of above the fold, it is possible to prevent bounce by users with a low engagement score.

Conversely, for users with a high engagement score, rich content is delivered from the beginning, without delaying the time until the browser or the like of the user terminal 101 is ready to accept input (see reference sign 430 in FIG. 37).

In this way, the time until the user terminal 101 is ready to accept input can be changed to customize the delivered content according to the engagement score for each user terminal 101.

It is possible to determine whether the customization is correct or not according to whether users bounce off the user terminal 101 early.

For example, in the case where a user continues to perform operations for viewing the web content 211 without bouncing, the selection in step S3006 is understood to be correct. Conversely, in the case where a user bounces early without continuing operations for viewing the web content 211, the selection in step S3006 is understood to be incorrect.

The engagement score is increased in the case where the selection in step S3006 is correct, and decreased in the case where the selection in step S3006 is incorrect. Through this operation, user satisfaction with respect to the web content can be raised automatically in a more fine-grained way on the basis of the user experience.

INDUSTRIAL APPLICABILITY

The automatic fast display control method for web content according to the present invention can be installed easily in a system that displays web content over a network used in the related art. Furthermore, since the speed at which web content is displayed can be improved, the automatic fast display control method for web content according to the present invention can be applied widely in the field of communication that deals with web content using a network.

REFERENCE SIGNS LIST

101 user terminal
102 network
103 application execution server
A application processing unit
B artificial intelligence unit
C request processing unit
D data acquisition and processing unit
d100 optimization unit
d200 crawler unit
d300 control unit
1523 settings file storage unit
104 original data storage area
105 PHP file
107 CSS file
107*a, b, c* CSS code portion
107*x*, 108*x*, 113*x* portion not used by user terminal
F107*a* to F107*c*, F108*a* to F108*c* object
108 script language file
108*a* to 108*d* script language code portion
109 image file
113 HTML file
113*a* to 113*d* HTML code portion
113*o*1, 113*o*2 object
113*o*10, 113*o*20, 113*o*21 object
113*i* head
113*j* body
113*z* optimized HTML file
1115, 1715 monitoring control unit
1116, 1716 operation control unit
1117, 1717 operation control storage unit
1120, 1720 time execution control unit
1121, 1721 time execution storage unit
124 resource
125 settings file
126 model information file
130 processed data storage area
132 processed CSS file
133 processed script language file
134 processed image file
200 original data
201, 202 processed data
203 CLI
211, 212 web content
401 communication congestion
402 rendering congestion
403 delivery optimization
404 rendering of portion corresponding to first view
405 rendering of portions other than portion corresponding to first view
410 case of minimum engagement score
420 case of intermediate engagement score
430 case of maximum engagement score
1000, 1100 central processing unit
1001, 1101, 1701 storage device
1001*a*, 1101*a*, 1701*a* main storage unit
1001*b*, 1101*b*, 1701*b* auxiliary storage unit
1002, 1102 communication interface
1003, 1103 input device
1004, 1104 display device
1105, 1705 OS

1106, 1706 database
1403 artificial intelligence server
1410 artificial intelligence control unit
1412 strategy file
1430 artificial intelligence storage area
1510 communication data control unit
1603 data acquisition server
1703 reverse proxy server
1803 cloud

The invention claimed is:

1. An automatic display control method for web content comprising:
   receiving, by one or more servers, a request transmitted from a user terminal to the one or more servers over a network;
   obtaining, by the one or more servers, original data for displaying web content;
   based on the request transmitted from the user terminal, devising, by an artificial intelligence network, a plan for displaying the web content on each user terminal from among a plurality of user terminals, based on the plurality of user terminals being listed in a model information file stored in the one or more servers;
   processing, by the one or more servers, the original data based on the plan to generate a plurality of processed data;
   selecting processed data for displaying the web content on the user terminal from at least one resource from among the original data and the plurality of processed data; and
   transmitting, to the user terminal, the selected processed data, and displaying the web content on the user terminal,
   wherein the method is performed in a time period from when the request is transmitted from the user terminal to the one or more servers until the original data for displaying the web content on the user terminal is transmitted to the user terminal and the web content is ready to accept input on the user terminal,
   wherein the one or more servers include an execution environment of at least one from among one or more physical machines, one or more virtual machines, and one or more containers, and
   wherein the devising the plan comprises:
      learning, for each user terminal, an attribute shared by the processed data for displaying the web content more quickly on the user terminal from the at least one resource;
      analyzing the attribute to find associations with lengths of display completion times of the web content; and
   processing, by the one or more servers, the original data for each user terminal based on the attribute.

2. The automatic display control method for web content according to claim 1,
   wherein the at least one resource includes at least one type of data from among the original data and the plurality of processed data,
   wherein the processed data includes an object-replaced program, and
   wherein the method further comprises:
      generating the object-replaced program by replacing a resource-referencing portion included in the original data with a program object;
      associating the program object with each resource together with identification information; and
      based on the object-replaced program being executed for each user terminal by a browser installed in the user terminal, specifying the resource according to the identification information of the program object, and executing the resource.

3. The automatic display control method for web content according to claim 1,
   wherein the processing of the original data comprises selecting at least one of:
      a program to be executed from among programs included in the processed data;
      a prioritized program to be executed from among the programs included in the processed data;
      a deferred program for which execution is to be deferred from among the programs included in the processed data;
      an execution order of the program to be executed;
      an execution timing of the program to be executed; and
      processed data for displaying the web content on each user terminal from the at least one resource from among the original data and the plurality of processed data.

4. The automatic display control method for web content according to claim 1,
   wherein the original data includes at least one of program data and binary data,
   wherein the program data includes code containing at least one from among a markup language, a programming language, a style sheet, and a script language,
   wherein the binary data includes at least one of an image file, an audio file, and a video file, and
   wherein the generating the processed data includes at least one of:
      removing an unnecessary portion for each user terminal display environment from the code;
      compressing a necessary portion for each user terminal display environment from the code;
      changing an execution order for each user terminal display environment from the code;
      changing an execution timing for each user terminal display environment from the code; and
      converting at least one from among a number of display pixels per unit area, an image or sound recording density per unit time, a data size, and a save format included in the binary data, and
   wherein the displaying the web content comprises:
      transmitting the request from the user terminal to the one or more servers over the network;
      specifying a display environment for each user terminal based on the request received by the one or more servers; and
      transmitting a resource to the user terminal from at least one of the one or more servers after the request is transmitted from a browser installed in the user terminal to the one or more servers, and displaying the resource in a browser installed in the user terminal.

5. The automatic display control method for web content according to claim 1,
   wherein the generating the plurality of processed data comprises:
      generating the plurality of processed data based on model information data related to the user terminal saved in a storage area accessible by the one or more servers, and
   wherein the selecting the processed data comprises:
      specifying, for each user terminal, a display environment of a display screen of each user terminal based on the model information data;

specifying, for each user terminal, a portion of the web content that is to be displayed first in order to fit in the display environment of the display screen of each user terminal, and wherein the transmitting the processed data includes prioritizing transmission, to each user terminal, of processed data corresponding to the web content which is to be displayed first.

6. The automatic display control method for web content according to claim 1, wherein the displaying of the web content on each user terminal comprises:
transmitting, to the user terminal, data corresponding to a first portion of the web content, which is to be displayed first on a screen of the user terminal;
detecting, by at least one of the one or more servers and a browser installed in the user terminal, event information indicating that at least one of a certain time has elapsed since the first portion of the web content was displayed on the user terminal, and that a user has operated the user terminal to perform an action for causing additional information to be displayed on the user terminal; and
transmitting a resource for displaying at least some of a remaining portion of the web content to the user terminal over the network from at least one of the one or more servers after the event information is detected by at least one of the one or more servers.

7. The automatic display control method for web content according to claim 6, wherein the displaying the web content on each user terminal comprises:
transmitting, to each user terminal, a resource for displaying the first portion of the web content; and
extending or reducing a time until the first portion of the web content is ready to accept input.

8. The automatic display control method for web content according to claim 7, further comprising:
calculating an engagement score between the user and the web content based on a user experience of the user viewing the web content; and
extending or reducing the time until the first portion of the web content is ready to accept input for each user terminal based on the engagement score.

9. A non-transitory computer-readable medium comprising instructions which, when executed by at least one processor of a device for performing automatic display control for web content, cause the at least one processor to:
receive a request transmitted from a user terminal to each of one or more servers over a network;
obtain original data for displaying web content;
based on the request transmitted from the user terminal, devise, by an artificial intelligence network, a plan for displaying the web content on each user terminal from among a plurality of user terminals, based on the plurality of user terminals being listed in a model information file stored in the one or more servers;
process the original data based on the plan to generate a plurality of processed data;
select processed data for displaying the web content on the user terminal from at least one resource from among the original data and the plurality of processed data; and transmit the selected processed data to the user terminal,
wherein the instructions are executed by the at least one processor during a period from when the request is transmitted from the user terminal to the one or more servers until the original data for displaying the web content on the user terminal is transmitted to the user terminal and the web content is ready to accept input on the user terminal,
wherein the one or more servers include an execution environment of at least one from among one or more physical machines, one or more virtual machines, and one or more containers, and
wherein the devising of the plan comprises:
learning, for each user terminal, an attribute shared by the processed data for displaying the web content more quickly on the user terminal from the at least one resource;
analyzing the attribute to find associations with lengths of display completion times of the web content; and
processing the original data for each user terminal based on the attribute.

10. A system for performing automatic display control method for web content, the system comprising:
one or more servers configured to:
receive a request transmitted from a user terminal to the one or more servers over a network; and
obtain original data for displaying web content;
based on the request transmitted from the user terminal, devise, using an artificial intelligence network, a plan for displaying the web content on each user terminal from among a plurality of user terminals, based on the plurality of user terminals being listed in a model information file stored in the one or more servers;
process the original data based on the plan to generate a plurality of processed data;
select processed data for displaying the web content on the user terminal from at least one resource from among the original data and the plurality of processed data; and
transmit the selected processed data to the user terminal,
wherein based on the processed data being transmitted to the user terminal, the web content is displayed on the user terminal,
wherein operations above are performed in a period from when the request is transmitted from the user terminal to the one or more servers until the original data is transmitted to the user terminal and the web content is ready to accept input on the user terminal,
wherein the one or more servers include an execution environment of at least one from among one or more physical machines, one or more virtual machines, and one or more containers, and
wherein to devise the plan, the artificial intelligence network is configured to learn, for each user terminal, an attribute shared by the processed data for displaying the web content more quickly on the user terminal from the at least one resource, and analyze the attribute to find associations with lengths of display completion times of the web content, and the one or more servers are further configured to process the original data for each user terminal based on the attribute.

* * * * *